United States Patent
S et al.

(10) Patent No.: US 10,209,882 B2
(45) Date of Patent: Feb. 19, 2019

(54) METHOD OF PERFORMING ONE OR MORE OPERATIONS BASED ON A GESTURE

(71) Applicant: Samsung Electronics Co., Ltd., Suwon-si, Gyeonggi-do (KR)

(72) Inventors: Arjun Raj Kumar S, Salem (IN); Kollol Das, Bangalore (IN); Rajeev Verma, Bangalore (IN); Tanu Malhotra, New Delhi (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 395 days.

(21) Appl. No.: 14/887,900

(22) Filed: Oct. 20, 2015

(65) Prior Publication Data
US 2016/0110093 A1   Apr. 21, 2016

(30) Foreign Application Priority Data

Oct. 21, 2014 (IN) ............................ 5243/CHE/2014
Sep. 9, 2015 (IN) ............................ 5243/CHE/2014
Oct. 8, 2015 (KR) ........................ 10-2015-0141795

(51) Int. Cl.
*G06F 3/0484* (2013.01)
*G06F 3/0486* (2013.01)
*G06F 3/0488* (2013.01)

(52) U.S. Cl.
CPC ........ *G06F 3/04883* (2013.01); *G06F 3/0486* (2013.01); *G06F 3/04842* (2013.01); *G06F 3/04845* (2013.01)

(58) Field of Classification Search
CPC ..... G06F 3/0488; G06F 3/0484; G06F 3/0486
See application file for complete search history.

(56) References Cited

U.S. PATENT DOCUMENTS

| | | | |
|---|---|---|---|
| 2002/0158838 A1 | 10/2002 | Smith et al. | |
| 2006/0238517 A1* | 10/2006 | King | G06F 1/1626 345/173 |
| 2009/0256947 A1* | 10/2009 | Ciurea | G06F 3/0488 348/333.12 |
| 2011/0038114 A1* | 2/2011 | Pance | G06F 1/1616 361/679.4 |
| 2011/0234545 A1* | 9/2011 | Tanaka | G06F 3/0436 345/177 |
| 2012/0030566 A1 | 2/2012 | Victor | |
| 2013/0016129 A1 | 1/2013 | Gossweiler, III et al. | |
| 2013/0033434 A1 | 2/2013 | Richardson et al. | |

(Continued)

FOREIGN PATENT DOCUMENTS

| | | |
|---|---|---|
| WO | 2011/047338 A1 | 4/2011 |
| WO | 2013/009888 A1 | 1/2013 |

OTHER PUBLICATIONS

Merriam Webster Online Dictionary Definition for "edge", https://www.merriam-webster.com/dictionary/edge, retrieved Feb. 19, 2018.*

*Primary Examiner* — Shourjo Dasgupta
(74) *Attorney, Agent, or Firm* — Jefferson IP Law, LLP

(57) ABSTRACT

A method for performing an action in an electronic device is provided. The method includes detecting a gesture performed on a first edge and a second edge of the electronic device. Further, the method includes computing a length of a movement of the gesture, and performing an action corresponding to an item in the electronic device based on the length of the movement.

12 Claims, 83 Drawing Sheets

(56) References Cited

U.S. PATENT DOCUMENTS

| | | | |
|---|---|---|---|
| 2013/0076649 A1* | 3/2013 | Myers | H04M 1/0268 |
| | | | 345/173 |
| 2013/0093689 A1* | 4/2013 | Papakipos | G06F 1/1626 |
| | | | 345/173 |
| 2013/0162534 A1* | 6/2013 | Chen | G09B 29/106 |
| | | | 345/158 |
| 2014/0098037 A1 | 4/2014 | Lee | |
| 2014/0143712 A1 | 5/2014 | Nahm | |
| 2014/0181750 A1* | 6/2014 | Fujiwara | G06F 3/04817 |
| | | | 715/835 |
| 2014/0247405 A1 | 9/2014 | Jin et al. | |
| 2015/0029225 A1* | 1/2015 | Aigner | G09G 5/38 |
| | | | 345/650 |
| 2015/0262419 A1* | 9/2015 | Maa | G06T 17/00 |
| | | | 703/1 |

* cited by examiner

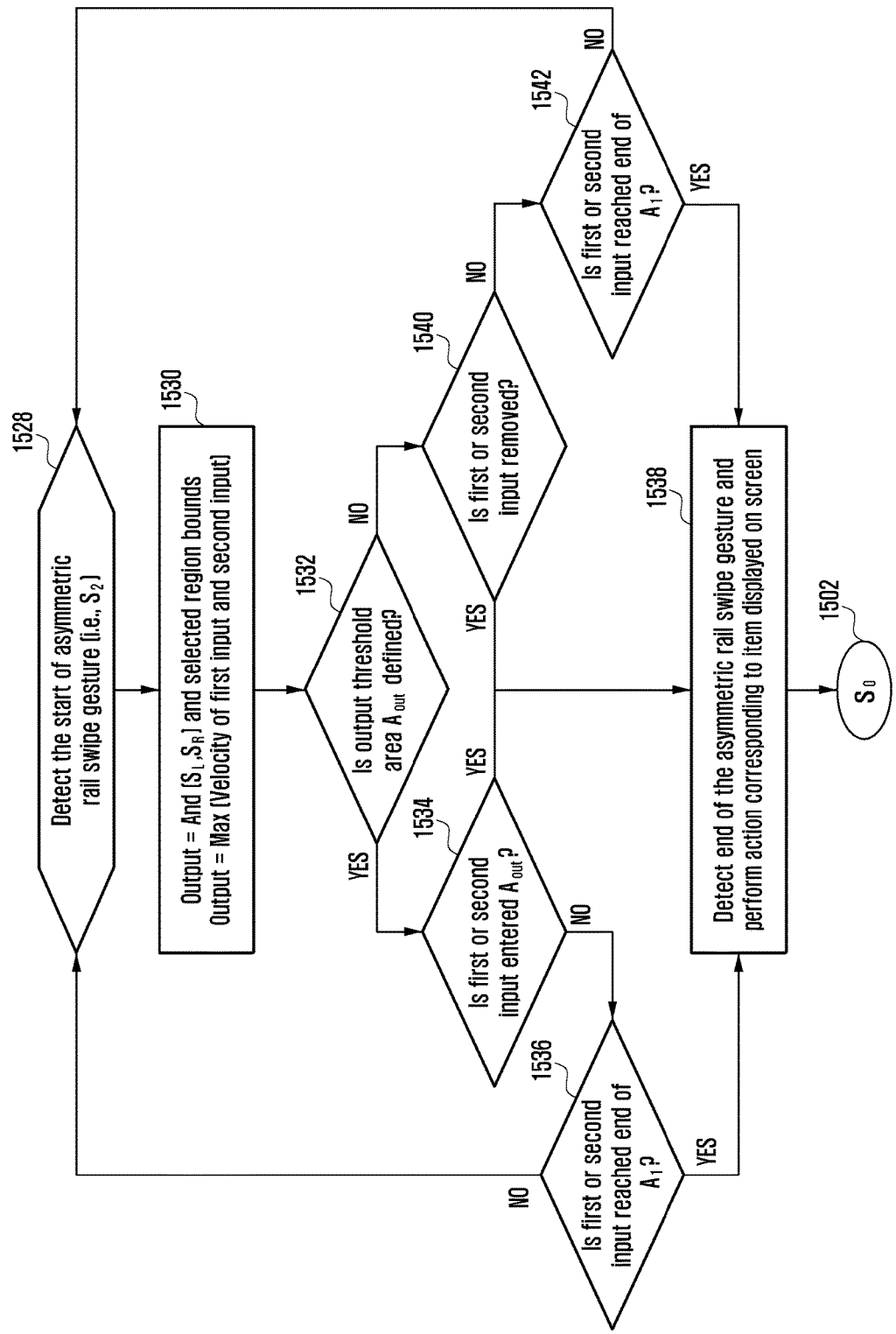

Releasing long press
exits the task manager

METHOD OF PERFORMING ONE OR MORE OPERATIONS BASED ON A GESTURE

CROSS-REFERENCE TO RELATED APPLICATION(S)

This application claims the benefit under 35 U.S.C. § 119(a) of an Indian provisional and non-provisional patent application filed on Oct. 21, 2014 and Sep. 9, 2015 in the Indian Patent Office and assigned Serial number 5243/CHE/2014, and Korean patent application filed on Oct. 8, 2015 in the Korean Intellectual Property Office and assigned Serial number 10-2015-0141795, the entire disclosure of each of which is hereby incorporated by reference.

TECHNICAL FIELD

The present disclosure relates to electronic devices. More particularly, the present disclosure relates to a mechanism for performing an action based on a gesture performed on edges of an electronic device.

BACKGROUND

Portable electronic devices, such as gaming devices, mobile telephones, portable media players, portable digital assistants (PDAs), electronic book (eBook) reader devices, or the like, are becoming increasingly popular. The electronic devices include an edge display screen thereby creating side display, for showing a plurality of display icons and the information such as weather and time.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide systems and methods, information related to various applications may be displayed on a main screen and the edge display screen may provide a tap access to the applications. Also, the edge display screen provides the one tap access to functions such as a flash light and a stopwatch.

Another aspect of the present disclosure is to provide systems and methods for a user may perform a swipe gesture originating from a top of a screen and extending to a bottom portion of the screen. After detecting the swipe gesture, a portion of a home screen is displayed extending from the top into an area of the screen.

The above information is presented as background information only to help the reader to understand the present disclosure. Applicants have made no determination and make no assertion as to whether any of the above might be applicable as prior art with regard to the present application.

Another aspect of the present disclosure is to provide a method for performing an action based on a gesture performed on edges of an electronic device.

Another aspect of the present disclosure is to provide a mechanism for performing the action based on the gesture performed on a first edge and a second edge of the electronic device.

Another aspect of the present disclosure is to provide a mechanism for detecting a start point of the gesture performed simultaneously on the first edge and the second edge.

Another aspect of the present disclosure is to provide a mechanism for computing a length of a movement of the gesture from the start point on the first edge and the second edge.

Another aspect of the present disclosure is to provide a mechanism for performing the action corresponding to an item based on the length of the movement of the gesture.

Another aspect of the present disclosure is to provide a mechanism for computing a speed of a movement of the gesture on the first edge and the second edge.

Another aspect of the present disclosure is to provide a mechanism for detecting a first input on the first edge and a second input on the second edge, wherein the first input and the second input is performed simultaneously.

In accordance with an aspect of the present disclosure, a method for performing an action in an electronic device is provided. The method includes detecting a gesture performed on a first edge and a second edge of the electronic device. Further, the method includes computing a length of a movement of the gesture; and performing an action corresponding to an item in the electronic device based on the length of the movement.

In accordance with another aspect of the present disclosure, an electronic device for performing an action is provided. The electronic device includes a control unit configured to detect a gesture performed on a first edge and a second edge of the electronic device. Further, the control unit is configured to compute a length of a movement of the gesture. Further, the control unit is configured to perform an action corresponding to an item in the electronic device based on the length of the movement.

In accordance with another aspect of the present disclosure, a computer program product is provided. The computer program product includes a computer executable program code recorded on a computer readable non-transitory storage medium. The computer executable program code, when executed, causes actions including detecting a gesture performed on a first edge and a second edge of an electronic device. Further, the computer executable program code, when executed, causes actions including computing a length of a movement of the gesture. Further, the computer executable program code, when executed, causes actions including performing an action corresponding to an item in the electronic device based on the length of the movement.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 15A, 15B, and 15C are a flow chart illustrating a method for performing the action in the electronic device based on the asymmetric swipe gesture performed simultaneously on the first edge and the second edge on the screen, according to various embodiments of the present disclosure;

Throughout the drawings, like reference numerals will be understood to refer to like parts, components, and structures.

DETAILED DESCRIPTION

Figure 1A:
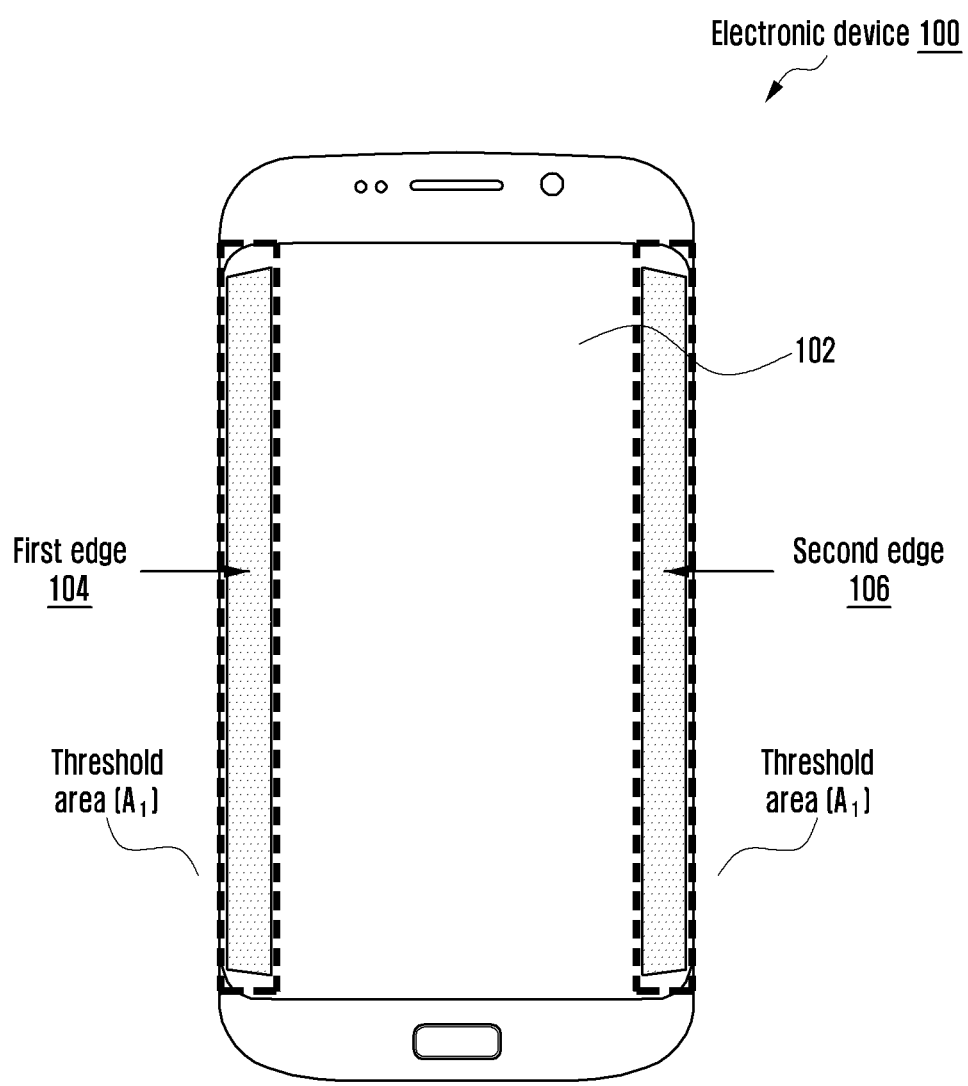
FIGS. 1A, 1B, 1C, 1D, 1E, and IF illustrate an electronic device with a screen having a plurality of edges, according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The labels "First" and "Second" are merely used for illustrative purpose and will not limit the scope of the disclosure.

The various embodiments of the present disclosure disclose a method for performing an action in an electronic device. The method includes detecting a gesture performed on a first edge and a second edge of the electronic device. Further, the method includes computing a length of a movement of the gesture. Further, the method includes performing an action corresponding to an item in the electronic device based on the length of the movement. In an embodiment of the present disclosure, the action is performed corresponding to the item displayed on a screen of the electronic device.

In an embodiment of the present disclosure, the method includes detecting a start point of the gesture performed on the first edge and the second edge of the electronic device. Further, the method includes computing the length of the movement of the gesture from the start point on the first edge and the second edge of the electronic device.

In an embodiment of the present disclosure, the method includes computing a speed of a movement of the gesture on the first edge and the second edge of the electronic device. Further, the method includes performing the action corresponding to the item in the electronic device based on the length of the movement of the gesture.

In an embodiment of the present disclosure, the action is performed on a background item available in the electronic device or a foreground item displayed on a screen of the electronic device.

In an embodiment of the present disclosure, the action comprises capturing a partial screen shot, resizing size of a displayed application window, selecting multiple items, or dragging and dropping the item.

In an embodiment of the present disclosure, the method includes detecting a first input on the first edge of the electronic device. Further, the method includes detecting a second input on the second edge of the electronic device, wherein the first input and the second input is performed simultaneously.

In an embodiment of the present disclosure, the action is dynamically defined based on the item currently displayed on the screen of the electronic device.

The proposed method allows the electronic device with the screen having a plurality of edges to perform the action corresponding to the item displayed on the screen. The electronic device performs the action whenever the gesture is detected on the plurality of edges. The gesture can be a rail swipe gesture, an asymmetric rail swipe gesture, a squeeze gesture, a lift and drop gesture, a long press hold on one edge and a vertical swipe on other edge, a long press hold on one edge and a horizontal swipe on other edge, a long press on both edges, or the like.

In an example, considering a scenario where the user needs to capture partial screen shot of a web page displayed on the screen, in order to capture the partial screen shot, the electronic device receives the partial rail swipe gesture performed simultaneously by the user on both edges of the screen. After receiving the partial rail swipe gesture, the electronic device captures the partial screen shot by copying a part of the displayed web page. In another example, considering a scenario where the user needs to capture a full screen shot of the web page displayed on the screen, in order to capture the full screen shot, the electronic device receives a complete rail swipe gesture performed simultaneously by the user on both edges of the screen. After receiving the complete rail swipe gesture, the electronic device captures the full screen shot by copying all of the displayed web page.

The proposed method provides an easy and natural way to move applications to the edge screen. Also, the proposed method provides benefit for the user to continue to work on the main application while using any secondary applications on the edge screen. The proposed method provides an easy and convenient mechanism for the user to capture the partial screen shot or the full screen shot of the web page displayed on the screen of the electronic device. Further, the proposed system and method can be implemented using existing infrastructure and may not require extensive hardware and instrumentation.

Referring now to the drawings, and more particularly to FIGS. 1 through 29, where similar reference characters denote corresponding features consistently throughout the figures, there are shown preferred various embodiments of the present disclosure.

FIGS. 1A to 1F illustrate an electronic device 100 with a screen having a plurality of edges, according to various embodiments of the present disclosure. The electronic device 100 can be, for example and not limited to a laptop, a desktop computer, a mobile phone, a smart phone, personal digital assistants (PDAs), a tablet, a phablet, a consumer electronic device, a server, a wearable device, or any other electronic device. In an embodiment of the present disclosure, the electronic device 100 includes the screen 102 to display information to a user. The screen 102 can be a component of the electronic device 100 or can be coupled external to the electronic device 100. Further, the screen 102 can include a touch screen capable to detect a single-touch and/or a multi-touch in accordance with various implementations.

Figure 1B:
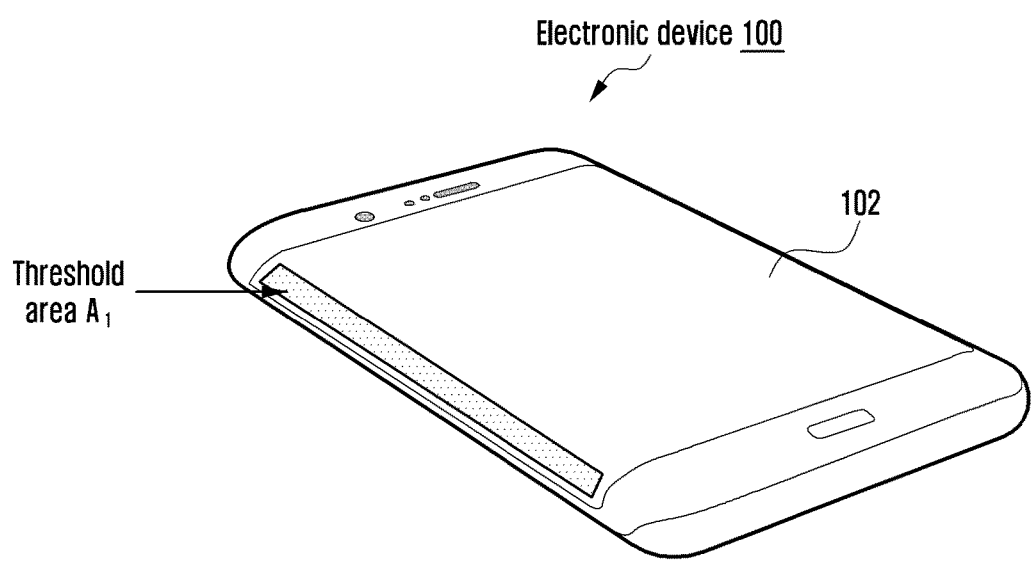

Referring to FIG. 1A, the screen 102 of the electronic device 100 can be configured to include a first edge 104 (i.e., left edge) and a second edge 106 (i.e., right edge). The first edge 104 and the second edge 106 include a threshold area ($A_1$). In an embodiment of the present disclosure, the threshold area ($A_1$) can be a logical part of the screen 102 or a physically different screen. The electronic device 100, in an initial state ($S_0$), can be configured to detect a first input anywhere across the threshold area ($A_1$) on both edges of the screen 102. The initial state ($S_0$), for example, non-exclusively refers to a state of the electronic device 100 ready to detect the touch inputs. The first input can be detected at an extreme top, extreme bottom, or at any portion of the threshold area ($A_1$) on the first edge 104 or the second edge 106. A perspective view of an electronic device 100 is shown in FIG. 1B. Further, a second input can be detected in a threshold area ($A_2$) being in front of the threshold area ($A_1$) (i.e., in parallel with the threshold area ($A_1$)) and on other side of the first input.

Figure 1C:
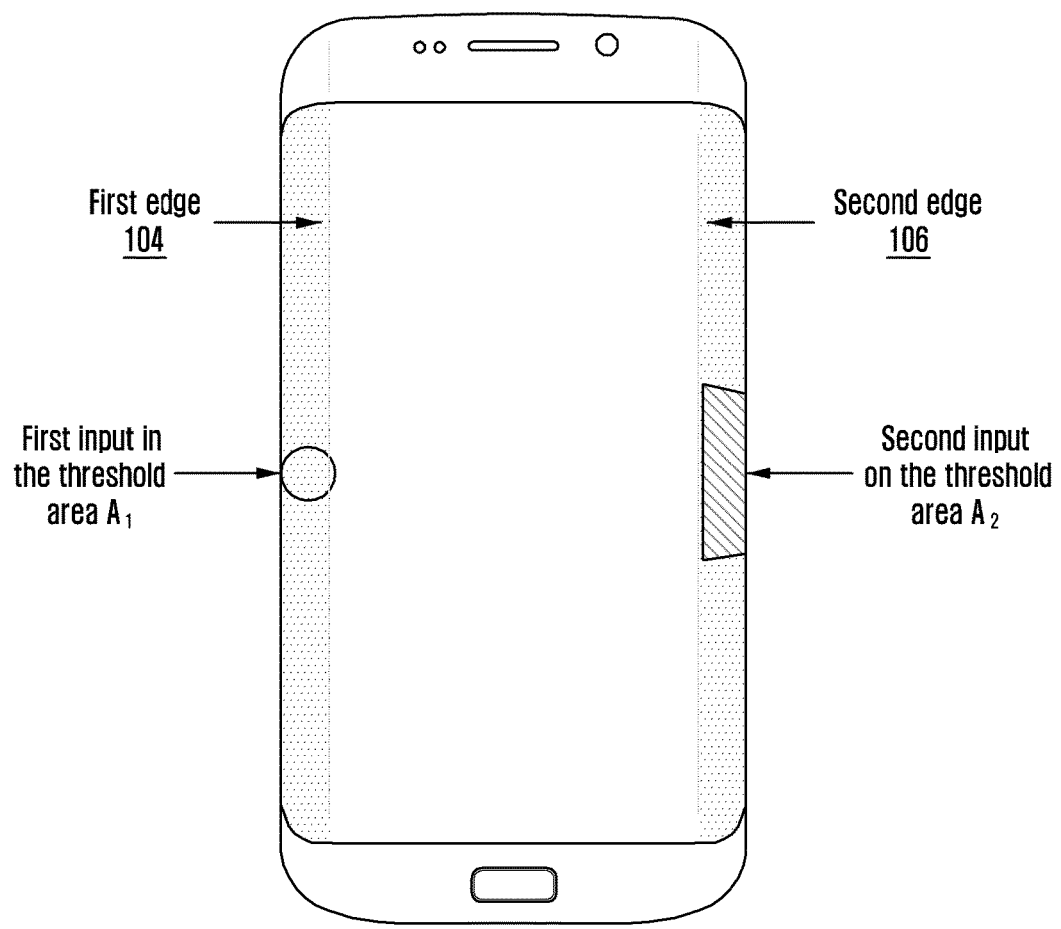

Referring to FIG. 1C, the electronic device 100, in the initial state ($S_0$), can be configured to receive the first input in the threshold area ($A_1$) on the first edge 104. Further, the electronic device 100, in the initial state ($S_0$), can be configured to receive a second input in the threshold area ($A_2$) in front (i.e., parallel) and other side of the first input (i.e., on the second edge 106).

Figure 1D:
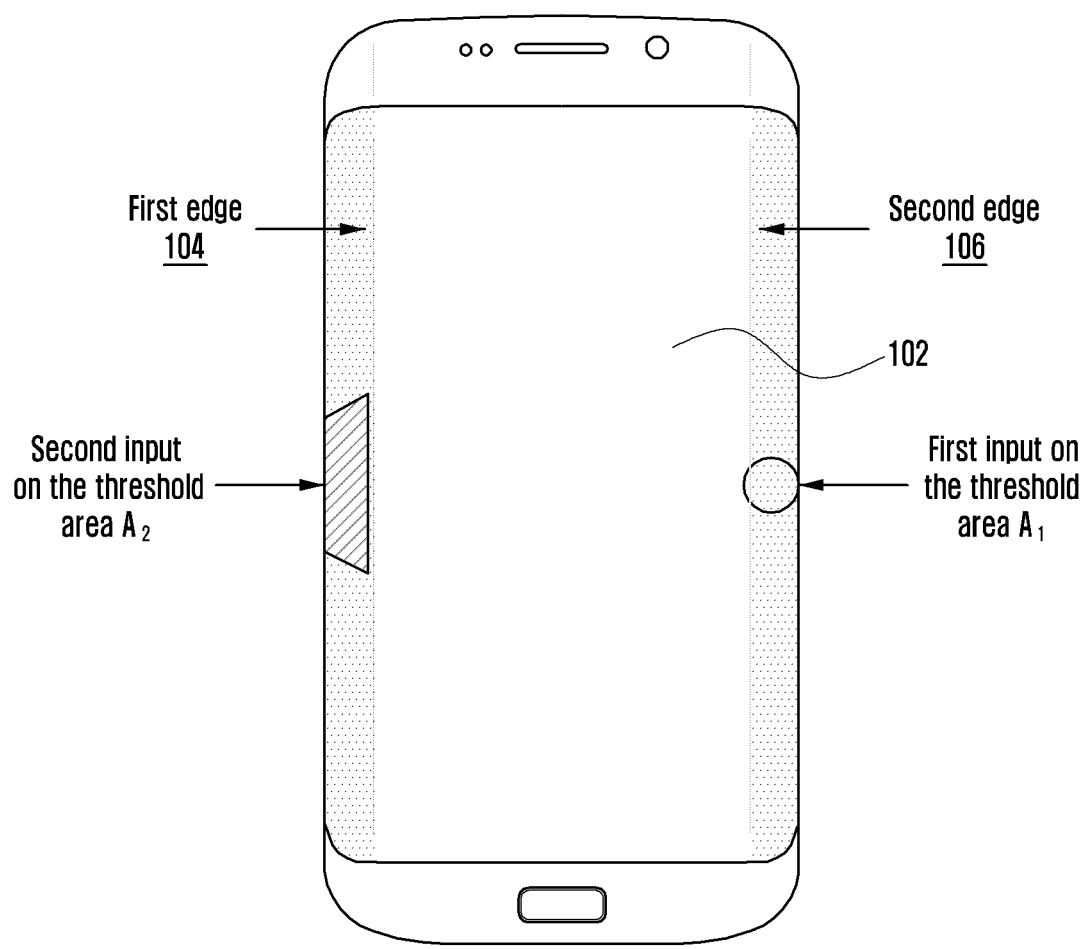

Similarly, the first input can be received in the threshold area ($A_1$) on the second edge 106 and the second input can be received in the threshold area ($A_2$) on the first edge 104 as shown in FIG. 1D.

Figure 1E:
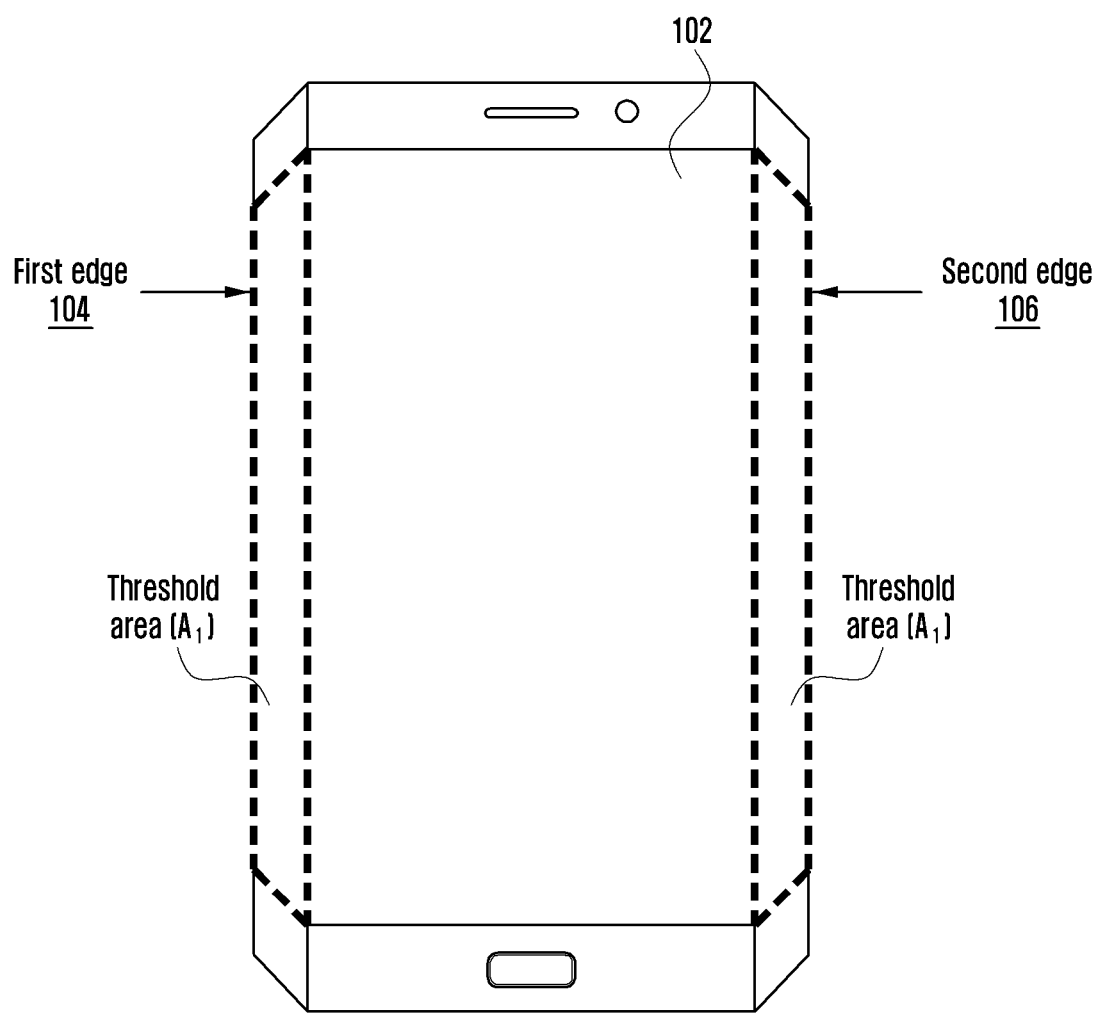

Referring to FIG. 1E, the electronic device 100 with the edges bent at an angle (i.e., chamfered) includes the first edge 104 and the second edge 106.

Figure 1F:
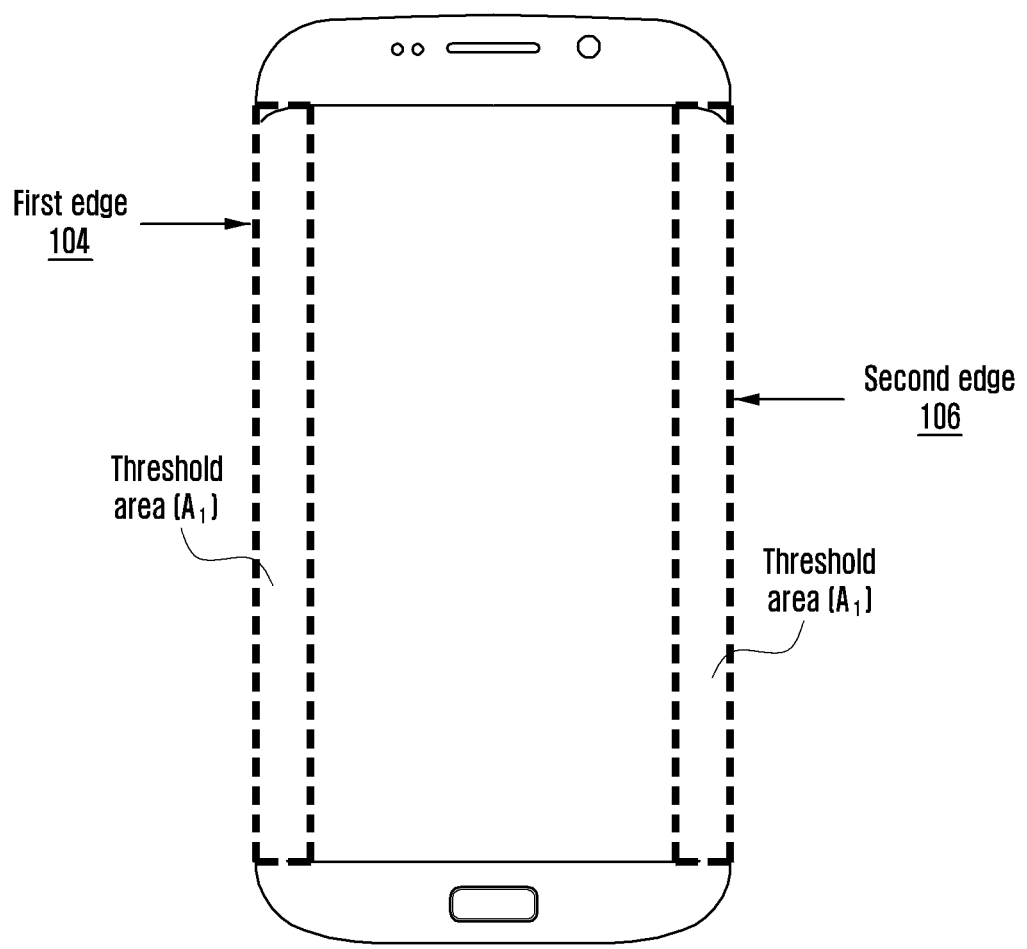

Referring to FIG. 1F, the electronic device 100 includes the edges which are defined by logical partition of the screen 102. The functionalities of the first edge 104 and the second edge 106 are explained above.

FIGS. 1A to 1F show a limited overview of the electronic device 100 but, it is to be understood that other embodiments of the present disclosure is not limited thereto. Further, the electronic device 100 can include other edges to perform the action.

Figure 2:
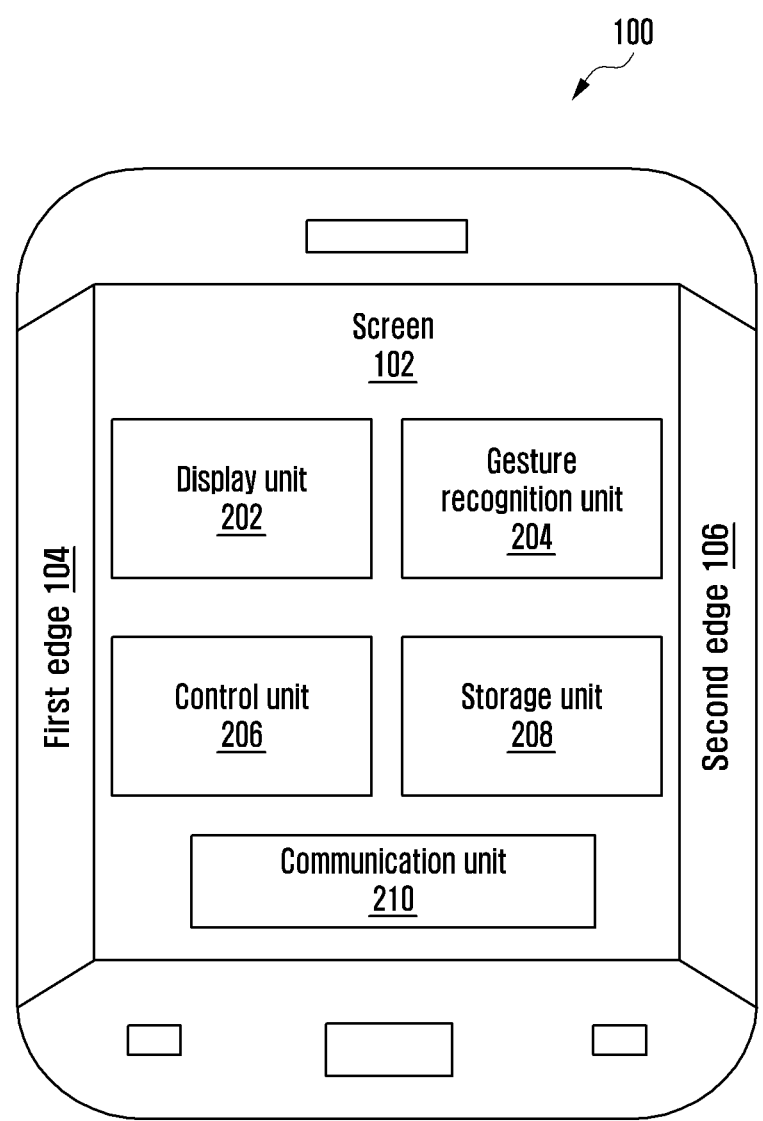
FIG. 2 illustrates various units of the electronic device for performing the action corresponding to the item, according to various embodiments of the present disclosure.

FIG. 2 illustrates various units of the electronic device 100 for performing the action corresponding to the item, according to various embodiments of the present disclosure. The electronic device 100 includes a display unit 202, a gesture detection unit 204, a control unit 206, a storage unit 208, and a communication unit 210.

Referring to FIG. 2 the display unit 202 includes the screen 102 and a touch unit for displaying information to the user. The touch unit receives an input of a location touched by using an input unit such as a finger or a stylus. Further, the display unit 202 displays information on the screen 102 inputted by the user or information provided to the user as well as various menu items of the electronic device 100. In an embodiment of the present disclosure, the display unit 202 can provide various screens according to the usage of the electronic device 100. In an example, the display unit 202 can provide a stand-by screen, a menu screen, a message writing screen, or a call screen. When the display unit 202 in the off-state is turned on, the display unit 202 can display predefined information such as time, data, and whether the user has an unread text message.

The display unit 202 can be multiple depending on the type of the electronic device 100. In an example, if the electronic device 100 is a folder type portable terminal, the display unit 202 can include a main display unit, which is viewable only when the folder is open, and a sub display unit, which is viewable whether the folder is open or closed. Further, the display unit 202 can be a liquid crystal display (LCD), an organic light emitted diode (OLED), Electronic-ink displays, or an active matrix OLED (AMOLED).

The gesture detection unit 204 can be configured to detect the first input on the first edge 104 by using a touch. Further, the gesture detection unit 204 can be configured to detect the second input on the second edge 106 after detecting the first input. The second input may be detected in front (i.e., parallel) and other side of the first input. The first input and the second input may be performed simultaneously to detect, by the gesture detection unit 204, a specific type of the gesture intended by the user. In an example, the first input is performed by the user in the threshold area ($A_1$) on the first edge 104 originating from a middle portion of the screen 102 and extending to a bottom portion of the screen 102. Simultaneously, along with the first input, if the second input is performed by the user in the threshold area ($A_2$) in front (i.e., parallel) and on the second edge 106, then the gesture recognition unit 204 can be configured to detect the type of the gesture intended by the user to be a rail swipe gesture. Further, the detailed explanation of the rail swipe gesture is explained in conjunction with the FIGS. 5A to 5C.

Further, based on the type of gesture intended by the user, in an embodiment of the present disclosure, the control unit 206 can be configured to detect a start point of the gesture performed simultaneously on the first edge 104 and the second edge 106. Further, the control unit 206 can be configured to compute a length of a movement of the gesture from the start point on the first edge 104 and the second edge 106. Further, the control unit 206 can be configured to perform the action corresponding to the item in the electronic device 100 based on the length of the movement of the gesture. In an example, the action is performed corresponding to the item displayed on the screen 102 of the electronic device 100. In another example, the action is performed corresponding to the item installed in the electronic device 100. In an example, the action includes capturing a partial screen shot, resizing size of a displayed application window, selecting multiple items, and dragging and dropping the item. In an embodiment of the present disclosure, the item can be, for example, icons, media items, folders, network strength, web page, applications, other form of user interface items, or the like. The applications can be, for example but not limited to, a message application, a call application, a music application, a calendar application, a Notepad application, a calculator application, a Wi-Fi application, a Bluetooth (BT) application, a reminder application, a camera application, a memo application, or any other applications. In an embodiment of the present disclosure, the action is dynamically defined based on the item currently displayed on the screen 102.

In an example, consider a scenario where the user performs the rail swipe gesture simultaneously on the first edge 104 and the second edge 106. If the rail swipe gesture is performed simultaneously on the first edge 104 and the second edge 106 origination from the top portion to the middle portion of the screen 102, then the control unit 206 is configured to perform the specific type of action (i.e., capturing the partial screen shot) corresponding to the web page currently displayed on the screen 102. Further, the example embodiment of the present disclosure of the rail swipe gesture is explained in conjunction with the FIGS. 7A to 7D.

In another embodiment of the present disclosure, the control unit 206 can be configured to compute a speed of a movement of the gesture on the first edge 104 and the second edge 106. Further, the control unit 206 can be configured to perform the action corresponding to the item displayed on the screen 102 based on the speed of the movement of the gesture. In an example, consider a scenario where the user is currently viewing a video on the screen 102. The user performs the rail swipe gesture simultaneously on the first edge 104 and the second edge 106 to fast forward the video. Based on the rail swipe gesture performed simultaneously, the control unit 206 computes the speed of the movement of the rail swipe gesture. Based on the computed speed, the control unit 206 performs the action (i.e., fast forwards the video). Further, the example embodiment of the present disclosure is explained in conjunction with the FIGS. 11A to 11D.

The storage unit 208 may include one or more computer-readable storage media. The storage unit 208 may include non-volatile storage elements. Examples of such non-volatile storage elements may include magnetic hard discs, optical discs, floppy discs, flash memories, or forms of electrically programmable read-only memories (EPROM) or electrically erasable and programmable ROM (EEPROM). In addition, the storage unit 208 may, in some examples, be considered a non-transitory storage medium. The term "non-transitory" may indicate that the storage medium is not embodied in a carrier wave or a propagated signal. However, the term "non-transitory" should not be interpreted to mean that the storage unit 208 is non-movable. In some examples, the storage unit 208 can be configured to store larger amounts of information than the memory. In certain examples, a non-transitory storage medium may store data that can, over time, change (e.g., in random access memory (RAM) or cache). The communication unit 210 can be configured for communicating with external devices via one or more networks, such as one or more wireless networks.

FIG. 2 shows various units of the electronic device 100 but, it is to be understood that another embodiment of the present disclosure is not limited thereto. The labels or names of the units are used only for illustrative purpose and does not limit the scope of the disclosure. Further, the electronic device 100 can include different units or sub-units communicating among each other along with other hardware or software components. Likewise, the functionalities of one or more units can be combined by a single unit or can be distributed among each other in a manner different than described herein without departing from the scope of the disclosure.

Figure 3:
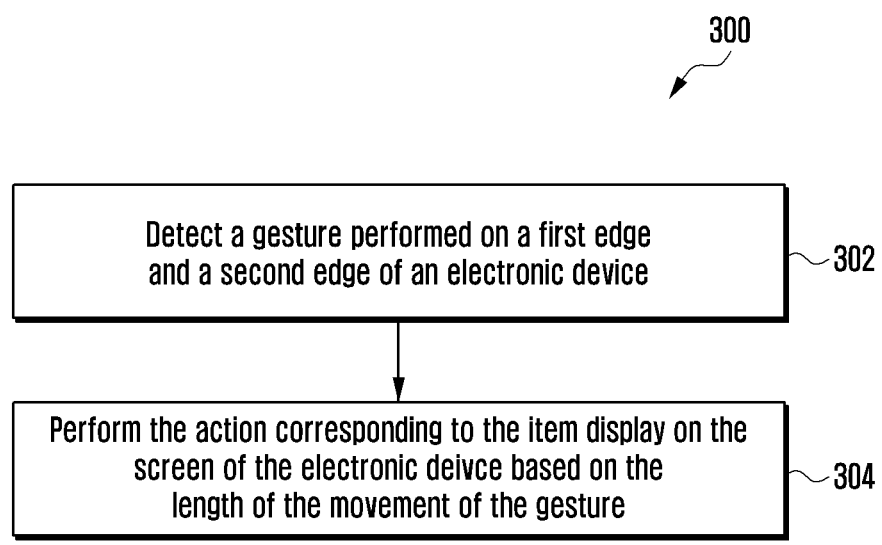
FIG. 3 is a flow chart illustrating a method for performing the action in the electronic device, according to various embodiments of the present disclosure.

FIG. 3 is a flow chart illustrating a method 300 for performing the action in the electronic device 100, according to various embodiments of the present disclosure.

Referring to FIG. 3, at operation 302, the method 300 includes detecting the gesture performed on the first edge 104 and the second edge 106 of the electronic device 100. The method 300 allows the gesture detection unit 204 to detect the gesture performed on the first edge 104 and the second edge 106 of the electronic device 100. The user may perform the first input on the first edge 104 and the second input on the second edge 106 to indicate the type of the gesture. The first input and the second input performed by the user indicates the type of gesture intended by the user.

In an example, consider a scenario where the first input is performed by the user in the threshold area ($A_1$) on the first edge 104 originating from the middle portion of the screen 102 and extending to the bottom portion of the screen 102. Simultaneously with the first input or within a predetermined time after the first input is performed by the user, if the second input is performed by the user in the threshold area ($A_2$) in front (i.e., parallel) and on the second edge 106 (i.e., originating from the middle portion of the screen 102 and extending to the top portion of the screen 102), then the gesture recognition unit 204 can be configured to detect the type of the gesture intended by the user to be an asymmetric rail swipe gesture. Further, the detailed explanation of the asymmetric rail swipe gesture is explained in conjunction with the FIGS. 15A to 15C.

In another example, consider a scenario where the first input is performed by the user in the threshold area ($A_1$) on the first edge 104. Simultaneously, along with the first input, if the second input is performed by the user in the threshold area ($A_2$) in front (i.e., parallel) and on the second edge 106 (i.e., originating from the middle portion of the screen 102 and extending to the bottom portion of the screen 102), then the gesture recognition unit 204 can be configured to detect the type of the gesture intended by the user to be a long press hold on the first edge 104 and a vertical swipe on the second edge 106. Further, the detailed explanation of the gesture (i.e., long press hold on the first edge 104 and a vertical swipe on the second edge 106) is explained in conjunction with the FIG. 20.

At operation 304, the method 300 includes performing the action corresponding to the item in the electronic device 100 based on the length of the movement of the gesture. The method 300 allows the control unit 204 to perform the action corresponding to the item in the electronic device 100 based on the length of the movement of the gesture. In an embodiment of the present disclosure, the action is dynamically defined based on the item currently displayed on the screen 102 of the electronic device 100. In an embodiment of the present disclosure, the item can be, for example but not limited to, icons, media items, folders, network strength, web page, applications, other form of user interface items, or the like. The applications can be, for example but not limited to, the message application, the call application, the music application, the calendar application, the notepad application, the calculator application, the Wi-Fi application, the BT application, the reminder application, the camera application, the memo application, or any other applications.

In an embodiment of the present disclosure, the start point of the gesture performed on the first edge 104 and the second edge 106 is detected. The length of the movement of the gesture from the start point on the first edge 104 and the second edge 106 is computed. The action corresponding to the item displayed on the screen 102 is performed based on the length of the movement of the gesture.

In an example, consider a scenario where the user performs the rail swipe gesture on the first edge 104 and the second edge 106. If the rail swipe gesture is performed on the first edge 104 and the second edge 106 origination from the top portion to the bottom portion of the screen 102, then the control unit 206 is configured to perform a specific type of action (i.e., capturing the full screen shot) corresponding to the web page currently displayed on the screen 102. Further, the example embodiment of the present disclosure of the rail swipe gesture is explained in conjunction with the FIGS. 8A to 8C.

In another example, consider a scenario where the user needs to move an image file among a list of image files. The user selects the image file by performing the long press in the threshold area ($A_1$) on the first edge 104 in front of the image file. At the same time, if the user performs a vertical swipe in the threshold area ($A_2$) on the second edge 104 starting from the front of the long press, then the control unit 206 performs moving the image file from a first location to a second location. Further, the example embodiment of the long press on the first edge 104 and the swipe on the second edge 106 is explained in conjunction with the FIGS. 25A to 25C.

In an embodiment of the present disclosure, the speed of the movement of the gesture on the first edge 104 and the second edge 106 is computed. The action corresponding to the item displayed on the screen 102 is performed based on the speed of the movement of the gesture. In an example, consider a scenario where the user currently viewing a video on the screen 102 of the electronic device 100. The user performs the rail swipe gesture simultaneously on the first edge 104 and the second edge 106 to fast forward the video. After detecting the rail swipe gesture, the control unit 206 computes the speed of the movement of the rail swipe gesture. Based on the computed speed, the control unit 206 performs the action (i.e., forwards the video). Further, the example embodiment of the present disclosure is explained in conjunction with the FIGS. 11A to 11D.

The various actions, acts, blocks, operations, or the like in the method 300 may be performed in the order presented, in a different order or simultaneously. Further, in various embodiments of the present disclosure, some of the actions, acts, blocks, operations, or the like may be omitted, added, modified, skipped, or the like without departing from the scope of the disclosure.

Figure 4A:
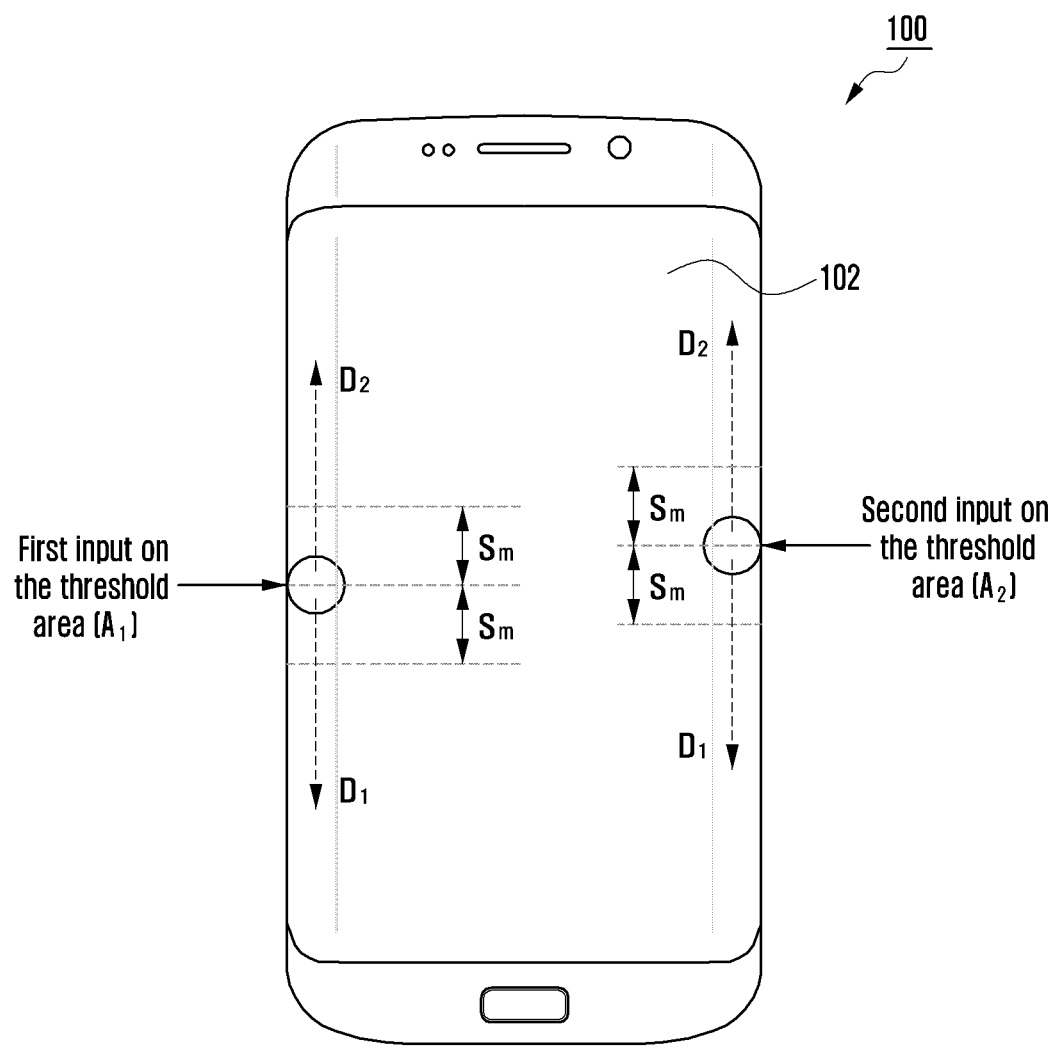
FIGS. 4A and 4B illustrate the electronic device with parameters defined to detect the rail swipe gesture, according to various embodiments of the present disclosure.
Figure 4B:
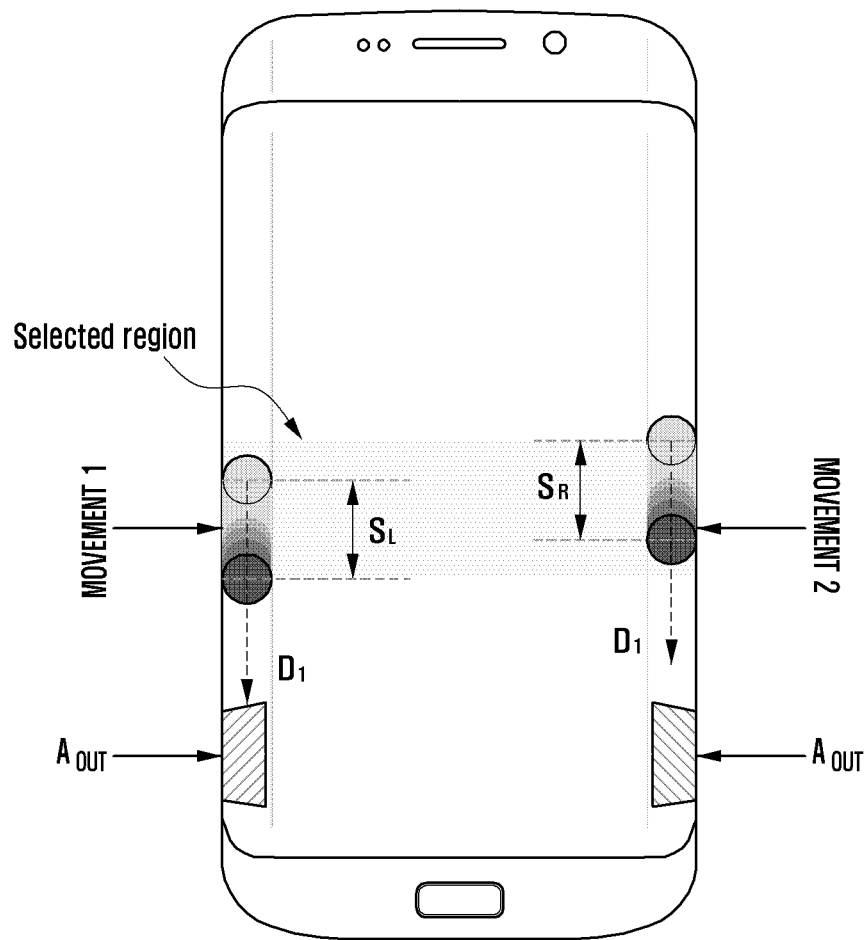

FIGS. 4A and 4B illustrate the electronic device 100 along with parameters defined to detect the rail swipe gesture, according to various embodiments of the present disclosure. In an embodiment of the present disclosure, the electronic device 100 includes an area to detect the rail swipe gesture. The rail swipe gesture is defined based on the parameters such as $D_1$, $D_2$, $S_M$, $S_L$, $S_R$, $T_0$, $A_{OUT}$, $S_0$, $S_1$, and $S_2$. Where, Referring to FIGS. 4A and 4B, $D_1$: Refers to a direction vector for the rail swipe gesture (i.e., option 1-swipe down)

$D_2$: Refers to a direction vector for rail swipe gesture (i.e., option 2-swipe up)

$S_M$: Refers to a minimum distance to detect the rail swipe gesture and to reject false triggers.

$S_L$: Refers to distance moved by "MOVEMENT-1" during the rail swipe gesture.

$S_R$: Refers to distance moved by "MOVEMENT-2" during the rail swipe gesture.

$T_0$: Refers to a threshold time between the first input and the second input to differentiate a single input and a dual input.

$A_{OUT}$: Refers to an output trigger area. i.e., user lifts his fingers in this area or cross extreme top or bottom portions of the threshold area ($A_1$).

$S_0$: Refers to an initial state of the electronic device 100 ready to detect the touch inputs (i.e., first input and the second input) performed on the first edge 104 and the second edge 106 of the screen 102.

$S_1$: Refers to detecting dual touch inputs and the electronic device 100 ready to detect the start of the rail swipe gesture.

$S_2$: Refers to a state where the electronic device 100 detects the start of the rail swipe gesture.

Further, in an embodiment of the present disclosure, the $S_L$ and $S_R$ together may be in the same direction. For example, the $S_L$ and $S_R$ together can be upwards or downwards based on the rail swipe gesture performed simultaneously upwards or downwards on the first edge 104 and the second edge 106 by the user.

Figure 5A:
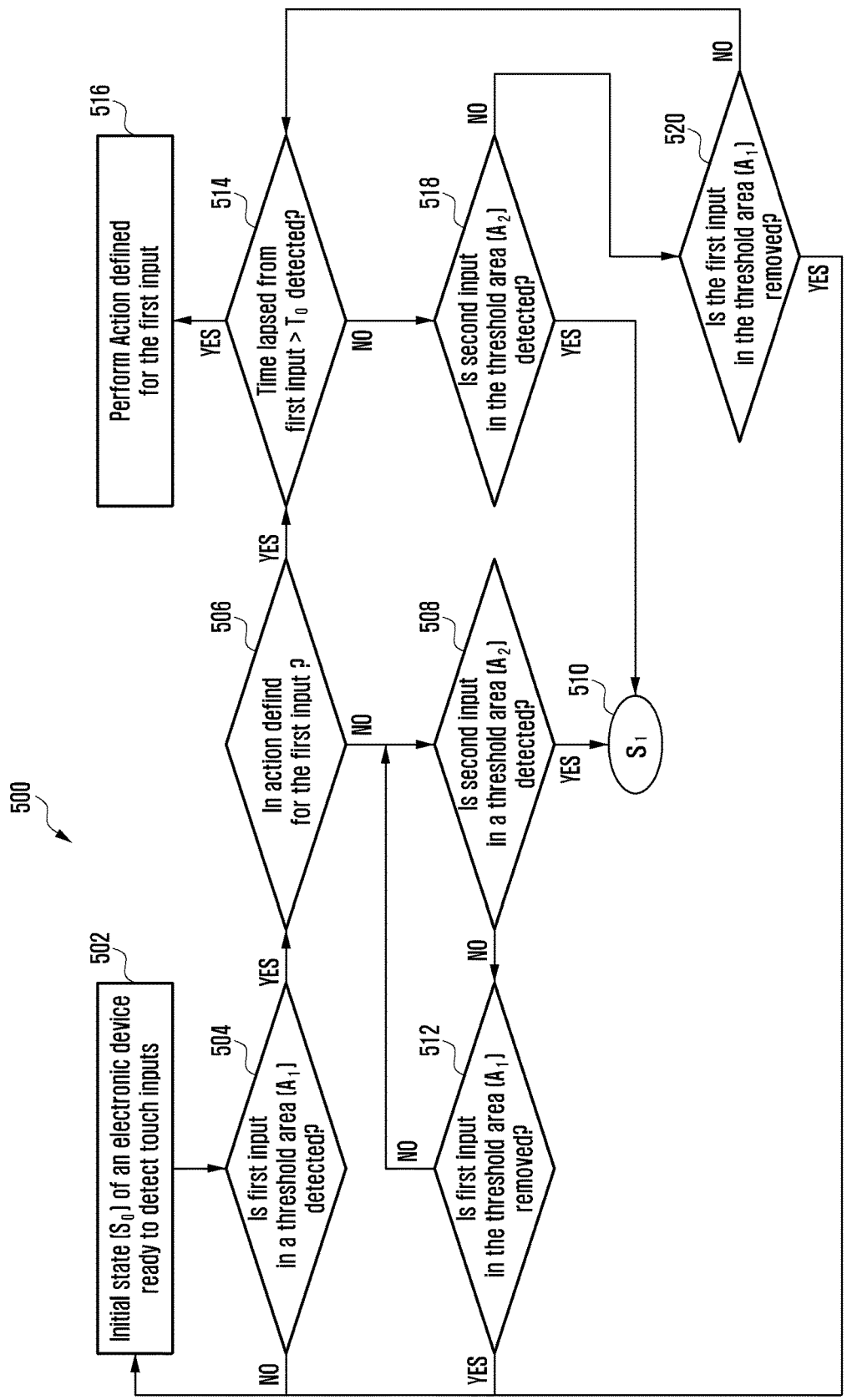
FIGS. 5A, 5B, and 5C are a flow diagram illustrating a method for performing the action in the electronic device based on the rail swipe gesture performed simultaneously on the first edge and the second edge, according to various embodiments of the present disclosure.
Figure 5B:
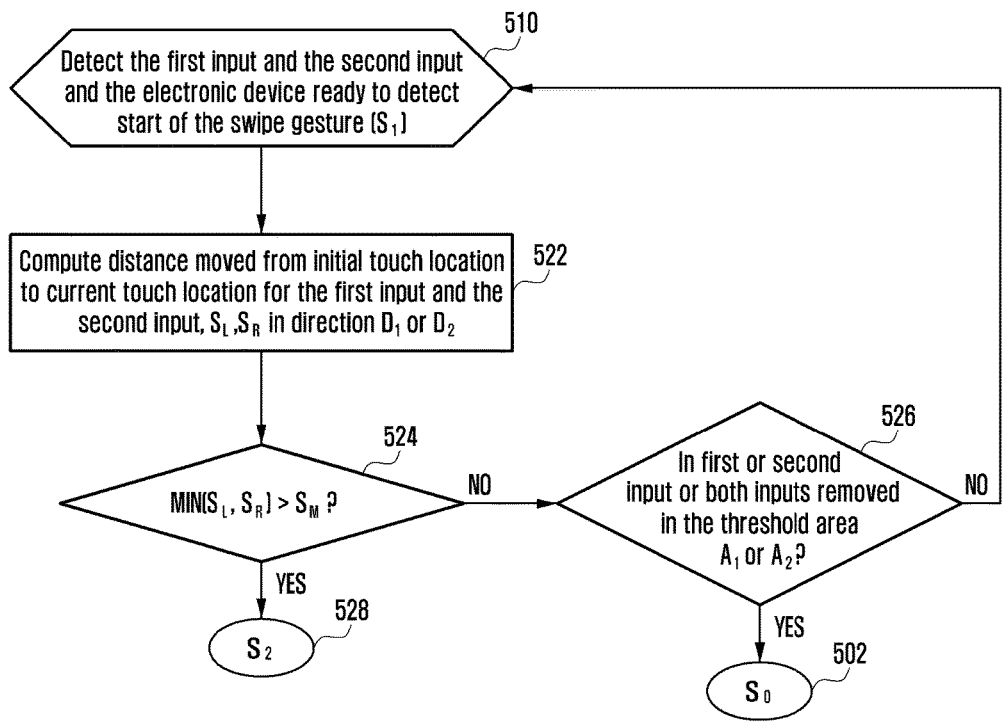
Figure 5C:
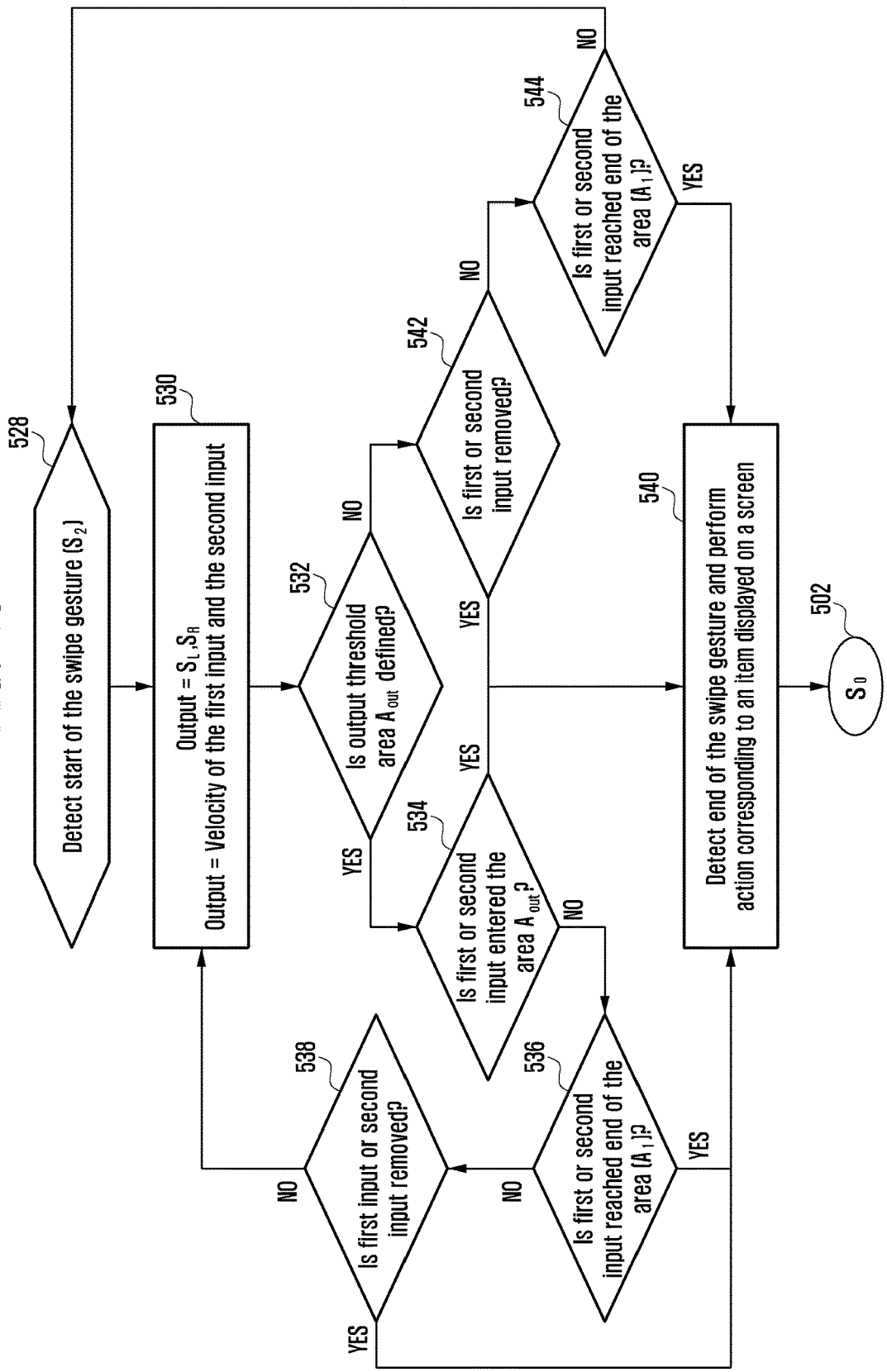

FIGS. 5A, 5B, and 5C are flow diagrams illustrating a method 500 for performing the action in the electronic device 100 based on the rail swipe gesture performed simultaneously on the first edge 104 and the second edge 106, according to various embodiments of the present disclosure.

Referring to FIGS. 5A to 5C, the sequence of operations can be performed inside the electronic device 100 by using the microcontroller, the microprocessor, the control unit 206 or any computer readable storage medium. At operation 502, current state of the electronic device may be the initial state ($S_0$) which is ready to detect touch inputs (i.e., first input and the second input).

If it is determined, at operation 504, that the first input in the threshold area "$A_1$" is not detected, then the method 500 is looped back to operation 502 as described above. If it is determined, at operation 504, that the first input in the threshold area "$A_1$" is detected, then at operation 506, the method 500 includes determining whether an action is defined for the first input. If it is determined, at operation 506, that the action is not defined for the first input, then at operation 508, the method 500 includes determining whether the second input in the threshold area "$A_2$" is detected. If it is determined, at operation 508, that the second input in the threshold area "$A_2$" is detected, then at operation 510, the method 500 includes detecting the first input and the second input; the electronic device 100 is ready to detect the start of the rail swipe gesture. If it is determined, at operation 508, that the second input in the threshold area "$A_2$" is not detected, then at operation 512, the method 500 includes determining whether the first input in the threshold area "$A_1$" is removed.

If it is determined, at operation 512, that the first input in the threshold area "$A_1$" is removed, then the method 500 is looped back to operation 502 as described above. If it is determined, at operation 512, that the first input in the area "$A_1$" is not removed, then the method 500 is looped back to operation 508 as described above. If it is determined, at operation 506, that the action is defined for the first input, then at operation 514, the method 500 includes determining whether time lapsed from the first input is greater than $T_0$ (i.e., $>T_0$). If it is determined, at operation 514, that the time lapsed from the first input is greater than $T_0$ (i.e., $>_{T0}$), then at operation 516, the method 500 includes performing the action defined for the first input.

If it is determined, at operation 514, that the time lapsed from the first input is not greater than $T_0$ (i.e., $>T_0$), then at operation 518, the method 500 includes determining whether the second input in the threshold area "$A_2$" is detected. If it is determined, at operation 518, that the second input in the threshold area "$A_2$" is not detected, then at operation 520, the method 500 includes determining whether the first input in the threshold area "$A_1$" is removed. If it is determined, at operation 520, that the first input in the threshold area "$A_1$" is removed, then the method 500 is looped back to operation 502 as described above. If it is determined, at operation 520, that the first input in the threshold area "$A_1$" is not removed, then the method 500 is looped back to operation 514 as described above. If it is determined, at operation 518, that the second input in the threshold area "$A_2$" is detected, then the method 500 is looped back to operation 510 as described above. After detecting the first input and the second input; the electronic device 100 is ready to detect the start of the rail swipe gesture and the below described operations are performed.

At operation 522, the method 500 includes computing a distance moved from the initial touch location to the current touch location for the first input and the second input, a distance moved by "MOVEMENT-1" on the first edge 104 during the rail swipe gesture ($S_L$), and a distance moved by "MOVEMENT-2" on the second edge 106 during the rail swipe gesture ($S_R$), in the direction of $D_1$ or $D_2$. If it is determined, at operation 524, that the minimum of $S_L$ and $S_R$ is not greater than the minimum distance to detect the rail swipe gesture and to reject false triggers ($S_M$), then at operation 526, the method 500 includes determining whether the first input in the threshold area "$A_1$" is removed, the second input in the threshold area "$A_2$" is removed, or the first input in the threshold area "$A_1$" and the second input in the threshold area "$A_2$" are removed. If it is determined, at operation 526, that the first input in the threshold area "$A_1$" is removed, the second input in the threshold area "$A_2$" is removed, or the first input in the threshold area "$A_1$" and the second input in the threshold area "$A_2$" are removed, then the method 500 is looped back to operation 502 as described above. If it is determined, at operation 526, that the first input in the threshold area "$A_1$" is not removed, the second input in the threshold area "$A_2$" is not removed, or the first input in the threshold area "$A_1$" and the second input in the threshold area "$A_2$" are not removed, then the method 500 is looped back to operation 510 as described above.

If it is determined, at operation 524, that the minimum of $S_L$, and $S_R$ is greater than the $S_M$, then at operation 528, the method 500 includes detecting the start of the rail swipe gesture. At operation 530, the method 500 includes determining the $S_L$, $S_R$, and the velocity of the first input and the second input. If it is determined, at operation 532, that the output trigger area "$A_{out}$" is defined for the first input and the second input, then at operation 534, the method 500 includes determining whether the first input or the second input enters the output trigger area "$A_{out}$". If it is determined, at operation 534, that the first input or the second input not entered the output trigger area "$A_{out}$", then at operation 536, the method 500 includes determining whether the first input or the second input reaches an end of the threshold area "$A_1$".

If it is determined, at operation 536, that the first input or the second input not reached end of the threshold area "$A_1$", then at operation 538, the method 500 includes determining whether the first input or the second input is removed. If it is determined, at operation 538, that the first input or the second input is not removed, then the method 500 is looped back to operation 530 as described above. If it is determined, at operation 538, that the first input or the second input is removed, then at operation 540, the method 500 includes detecting the end of the rail swipe gesture and the electronic device 100 performs the action corresponding to the item displayed on the screen 102. If its determined, at operation 536, that the first input or the second input reached end of the threshold area "$A_1$", then the method 500 is looped back to operation 540 as describe above. If it is determined, at operation 534, that the first input or the second input entered the output trigger area "$A_{out}$", then the method 500 performs the operation 540 as described above.

If it is determined, at operation 532, that the output trigger area "$A_{out}$" is not defined, then at operation 542, the method 500 includes determining whether the first input in the threshold area "$A_1$" or the second input in the threshold area "$A_2$" is removed. If it is determined, at operation 542, that the first input in the threshold area "$A_1$" or the second input in the threshold area "$A_2$" is removed, then the method 500 performs the operation 540 as described above. If it is determined, at operation 542, that the first input in the threshold area "$A_1$" or the second input in the threshold area "$A_2$" is not removed, then at operation 544, the method 500 includes determining whether the first input or the second input reaches the end of threshold area "$A_1$". If it is determined, at operation 544, that the first input or the second input reaches the end of threshold area "$A_1$", then the method 500 performs operation 540 as described above. If it is determined, at operation 544, that the first input or the second input not reached the end of threshold area "$A_1$", then the method 500 is looped back to operation 530 as described above.

The various actions, acts, blocks, operations, or the like in the method 500 may be performed in the order presented, in a different order or simultaneously. Further, in various embodiments of the present disclosure, some of the actions, acts, blocks, operations, or the like may be omitted, added, modified, skipped, or the like without departing from the scope of the disclosure.

FIGS. 6A to 6E illustrate a plurality of ways where the user can perform the rail swipe gesture, according to various embodiments of the present disclosure.

Figure 6A:
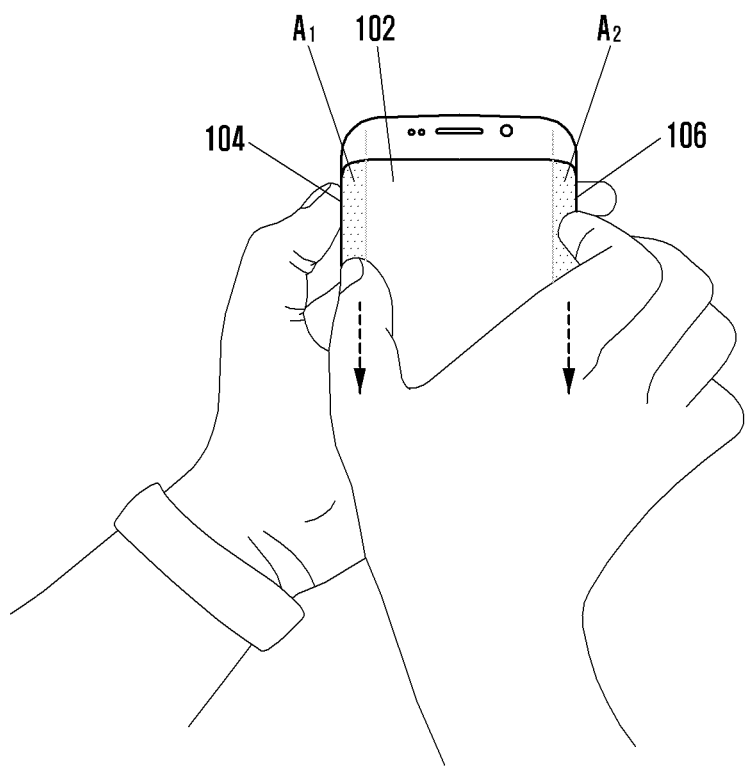
FIGS. 6A, 6B, 6C, 6D, and 6E illustrate a plurality of ways where the user can perform the rail swipe gestures, according to various embodiments of the present disclosure.

FIG. 6A illustrates a scenario where the first input is performed by the user in the threshold area ($A_1$) on the first edge 104. Simultaneously, along with the first input, if the first and second inputs are performed by the user in the threshold area ($A_2$) in front (i.e., parallel) and on the second edge 106 (i.e., originating from the middle portion of the screen 102 and extending to the bottom portion of the screen 102), then the gesture recognition unit 204 can be configured to detect the type of the gesture intended by the user to be a rail swipe on the first edge 104 and the second edge 106.

Figure 6B:
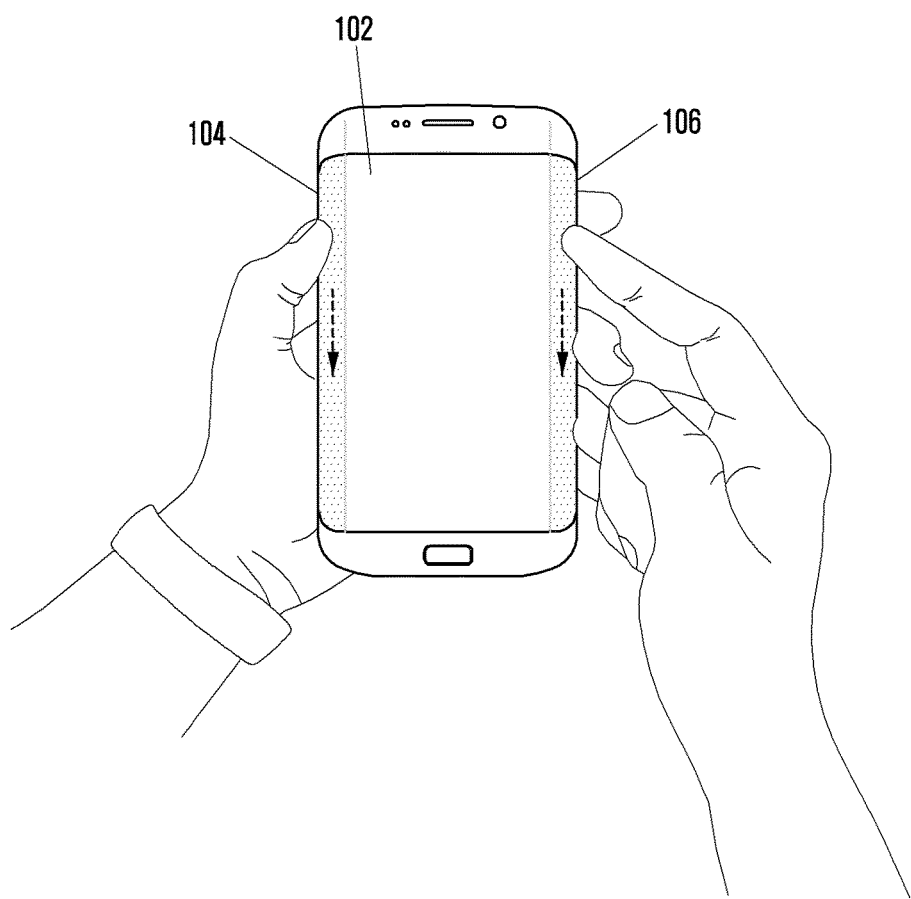

FIG. 6B illustrates a scenario where the first input is performed by the user in the threshold area ($A_1$) on the first edge 104. Simultaneously, along with the first input, if the second input is performed by the user in the threshold area ($A_2$) in front (i.e., parallel) and on the second edge 106 (i.e., originating from the middle portion of the screen 102 and extending to the bottom portion of the screen 102), then the gesture recognition unit 204 can be configured to detect the type of the gesture intended by the user to be a rail swipe on the first edge 104 and the second edge 106.

Figure 6C:
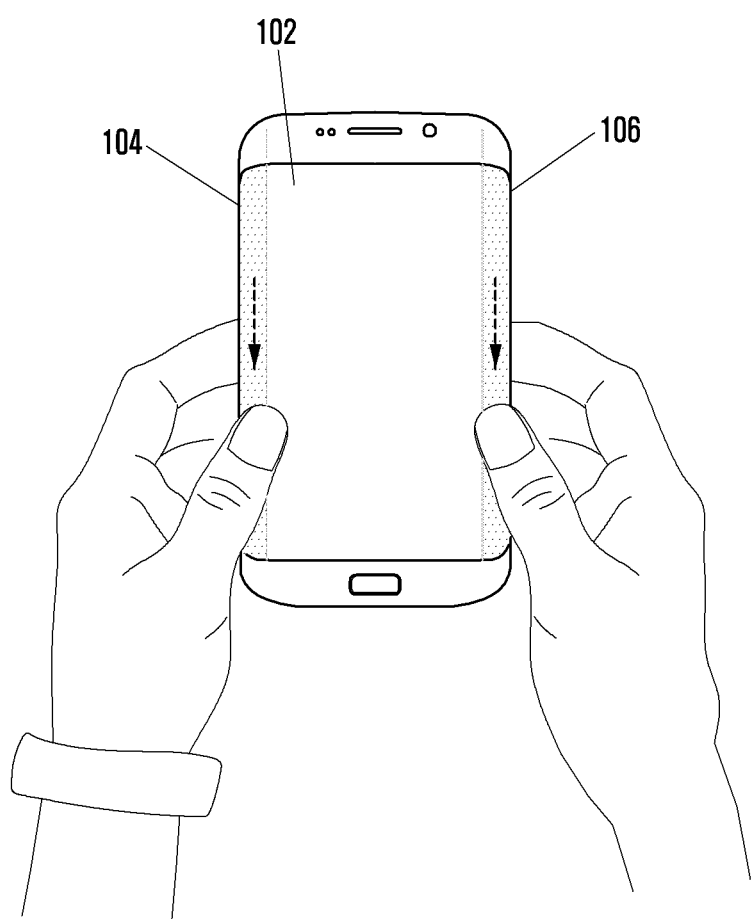
Figure 6D:
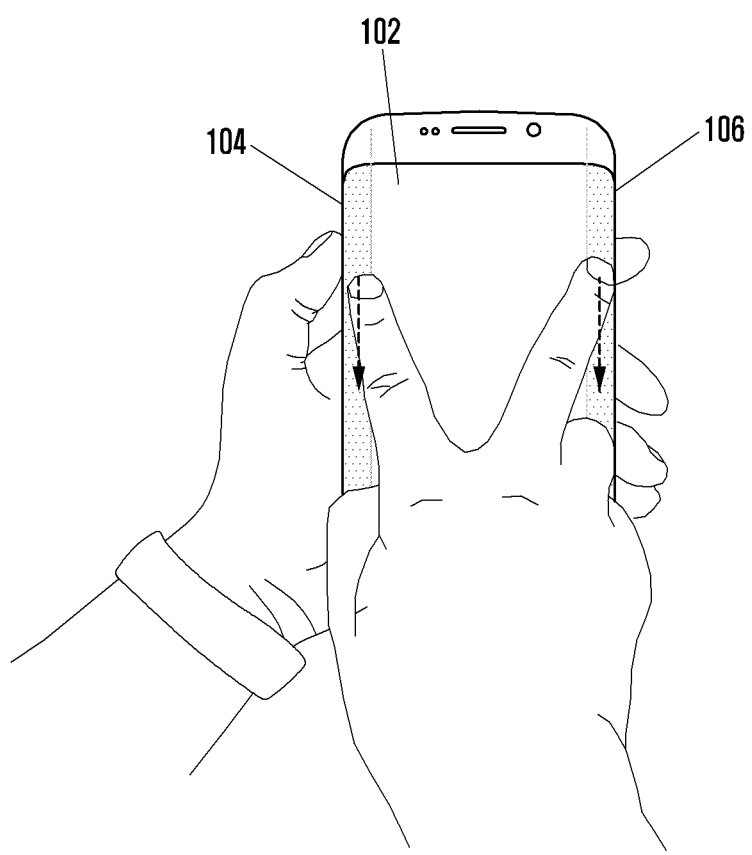
Figure 6E:
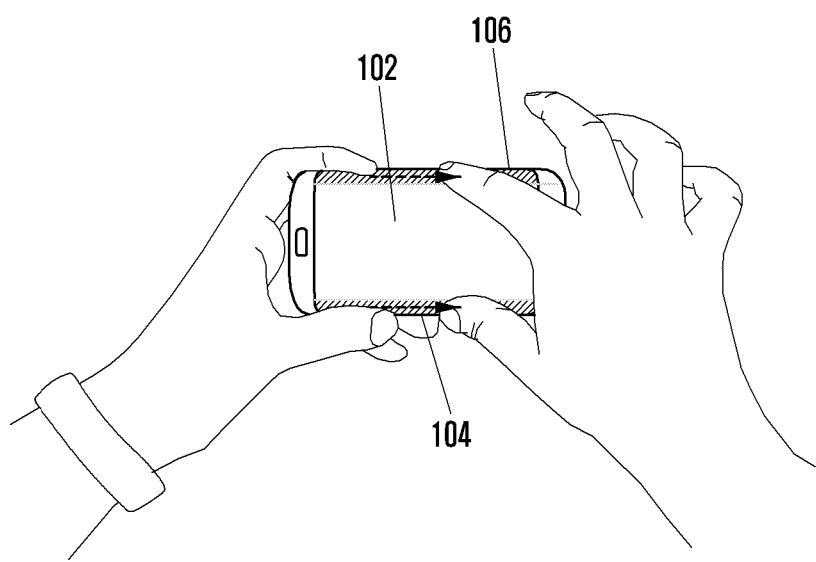

FIGS. 6C-6E illustrate scenarios where first input is performed by the user in the threshold area ($A_1$) on the first edge 104. Simultaneously, along with first input, a second input is performed by the user in the threshold area ($A_2$) in front (i.e., parallel) and on the second edge 106 (i.e., originating from the middle portion of the screen 102 and extending to the bottom portion of the screen 102).

FIGS. 7A to 7D illustrate an example for capturing the partial screen shot of the web page displayed on the screen 102, according to various embodiments of the present disclosure.

Figure 7A:
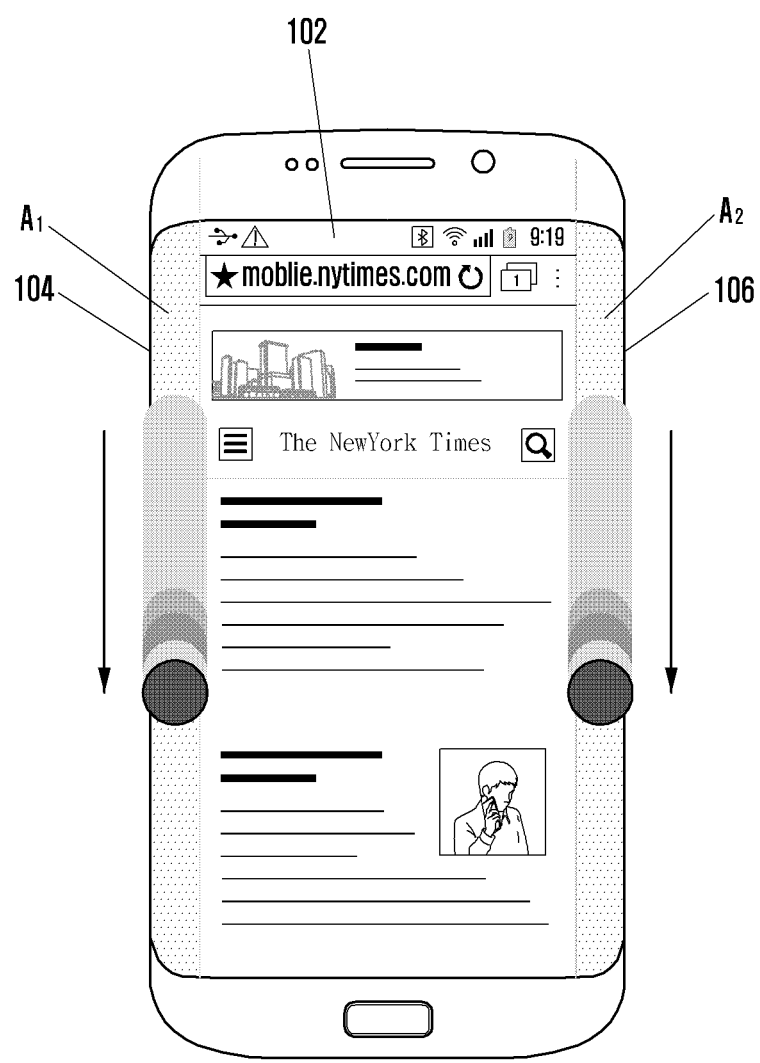
FIGS. 7A, 7B, 7C, and 7D illustrate an example for capturing the partial screen shot of a web page displayed on the screen, according to various embodiments of the present disclosure.

Referring to FIG. 7A, consider a scenario, where the user needs to capture the partial screen shot of the web page displayed on the screen 102. The first input is performed by the user in the threshold area ($A_1$) on the first edge 104 originating from the top portion of the screen 102 and extending to the middle portion of the screen 102. Simultaneously with the first input or within a predetermined threshold time after performing the first input by the user, the second input is performed in the threshold area ($A_2$) in front (i.e., parallel) and on the second edge 106, then the gesture recognition unit 204 detects the type (e.g. the rail swipe) of the gesture intended by the user.

Figure 7B:
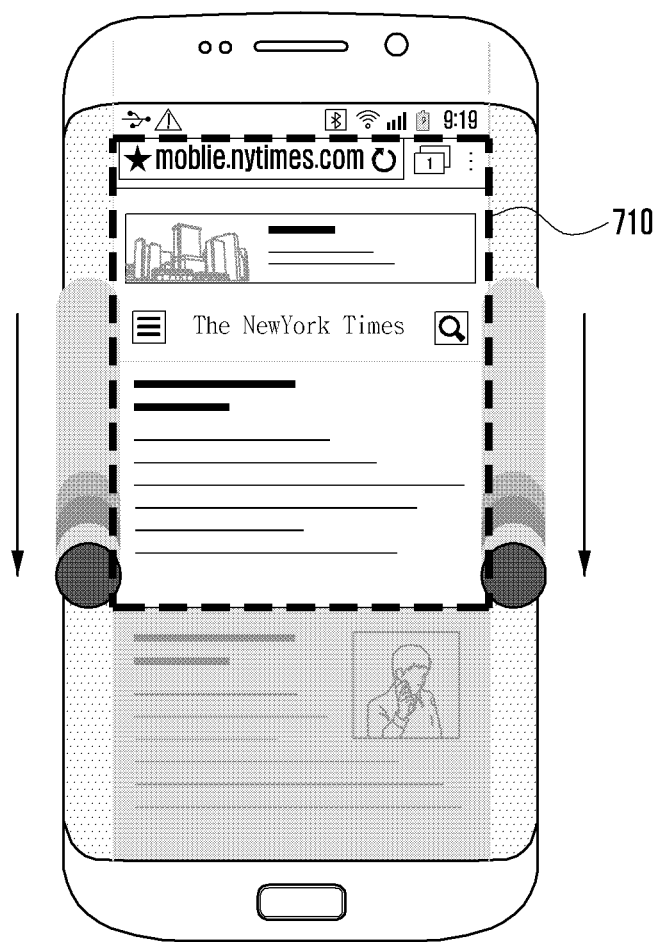
Figure 7C:
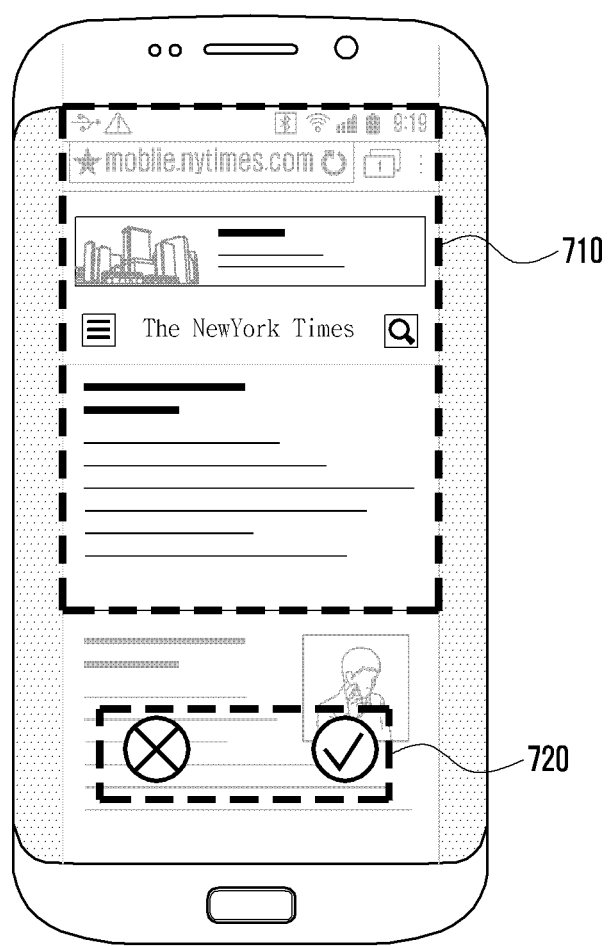
Figure 7D:
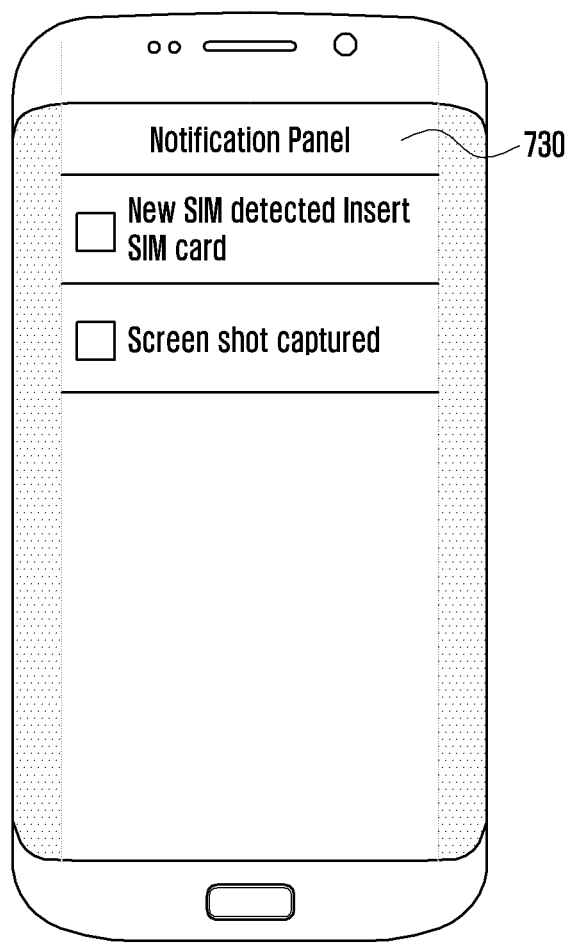

As shown in the FIG. 7B, based on the rail swipe gesture, the electronic device 100 captures the partial screenshot 710 of the web page displayed on the screen 102. Further, the user can be provided with an option 720 to save or discard the captured partial screen shot as shown in the FIG. 7C. Further, the captured partial screen shot can be accessed by the user from the notification panel 730 as shown in the FIG. 7D.

Figure 8A:
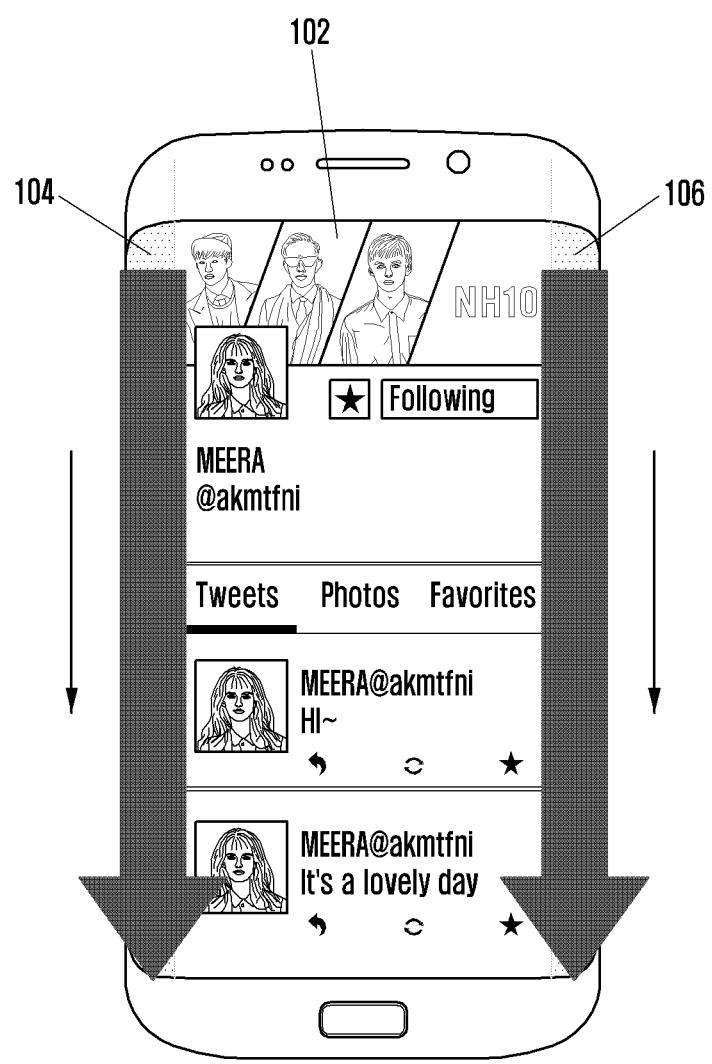
FIGS. 8A, 8B, and 8C illustrate an example for capturing the full screen shot of the web page displayed on the screen of the electronic device, according to various embodiments of the present disclosure.
Figure 8B:
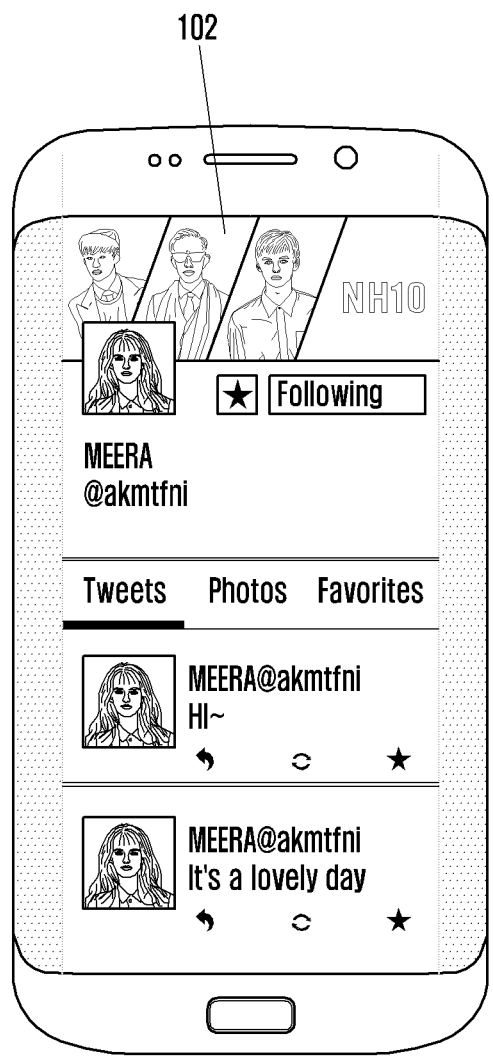
Figure 8C:
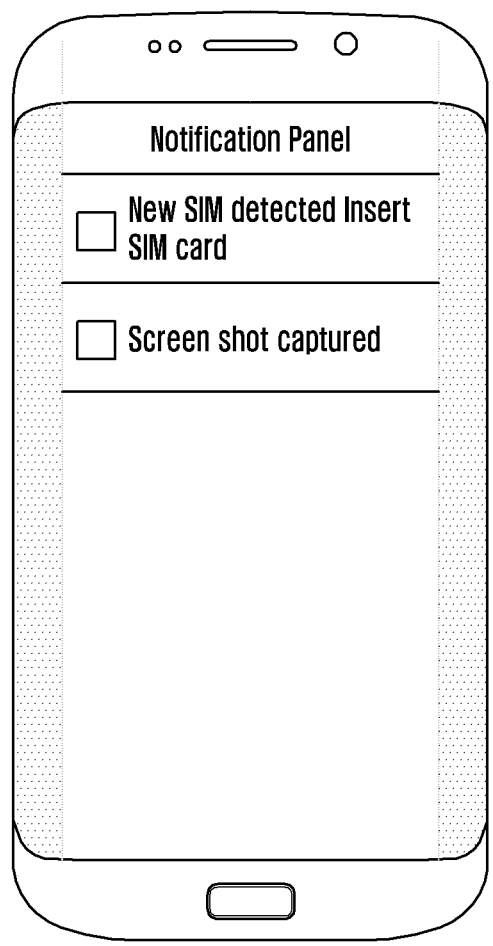

FIGS. 8A to 8C illustrate an example for capturing the full screen shot of the web page displayed on the screen 102 of the electronic device 100, according to various embodiments of the present disclosure.

Referring to FIG. 8A, consider a scenario, where the user needs to capture the full screen shot of the web page displayed on the screen 102. The first input is performed by the user in the threshold area ($A_1$) on the first edge 104 originating from the top portion of the screen 102 and extending to the bottom portion of the screen 102. Simultaneously with the first input or within a predetermined threshold time after performing the first input by the user, the second input is performed in the threshold area ($A_2$) in front (i.e., parallel) and on the second edge 106, then the electronic device 100 detects the type of the gesture intended by the user to be the rail swipe gesture.

Referring to FIG. 8B, based on the rail swipe gesture, the electronic device 100 captures the full screenshot of the web page displayed on the screen 102. Further, the user can be provided with an option to save or discard the captured screen shot. Further, the captured screen shot can be accessed by the user from the notification panel as shown in FIG. 8C.

Figure 9:
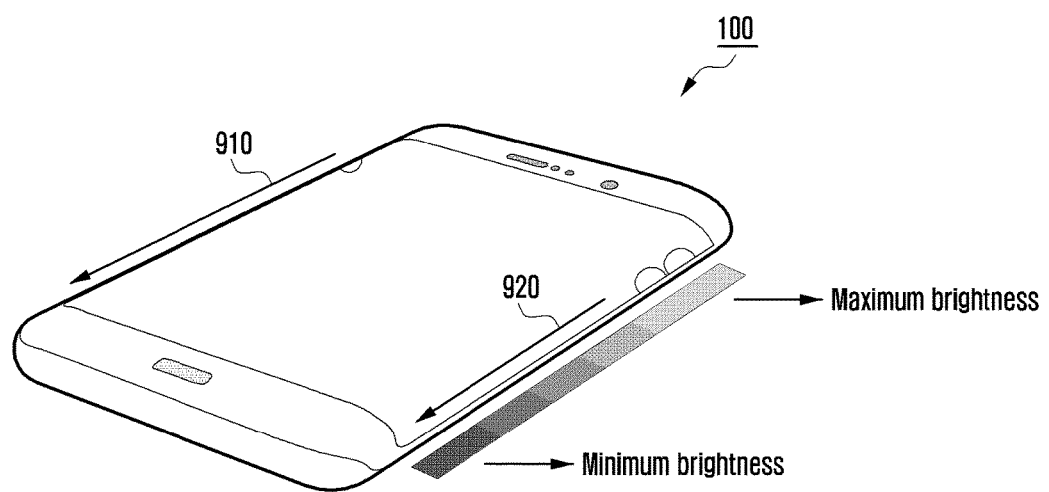
FIG. 9 illustrates another example for changing the brightness of the screen, according to various embodiments of the present disclosure.

FIG. 9 illustrates an example for changing the brightness of the screen 102, according to various embodiments of the present disclosure.

Referring to FIG. 9, the user may perform a first input 910 in the threshold area ($A_1$) from the top portion of the screen 102 and extending to the bottom portion of the screen 102. Simultaneously with the first input 910 or within a predetermined threshold time after performing the first input 910 by the user, a second input 920 is performed in the threshold area ($A_2$) in front (i.e., parallel) and on the second edge 106 as shown in the FIG. 9, then the electronic device 100 detects the type of the gesture intended by the user to be the rail swipe gesture.

The user may perform a rail swipe gesture (e.g. the first input 910 and the second input 920) with one finger in the threshold area ($A_1$) on the first edge 104 and with two fingers in the threshold area ($A_2$) on the second edge of the screen 102. The rail swipe gesture performed by the user can be used to change the brightness of the screen 102 just like drawing a curtain to reduce or increase the intensity of light. The brightness of the screen 102 will decrease as the user performs the rail swipe gesture originating from the top portion to the bottom portion of the screen 102. Further, the brightness of the screen 102 will increase as the user performs the rail swipe gesture originating from the bottom portion to the top portion of the screen 102.

Figure 10A:
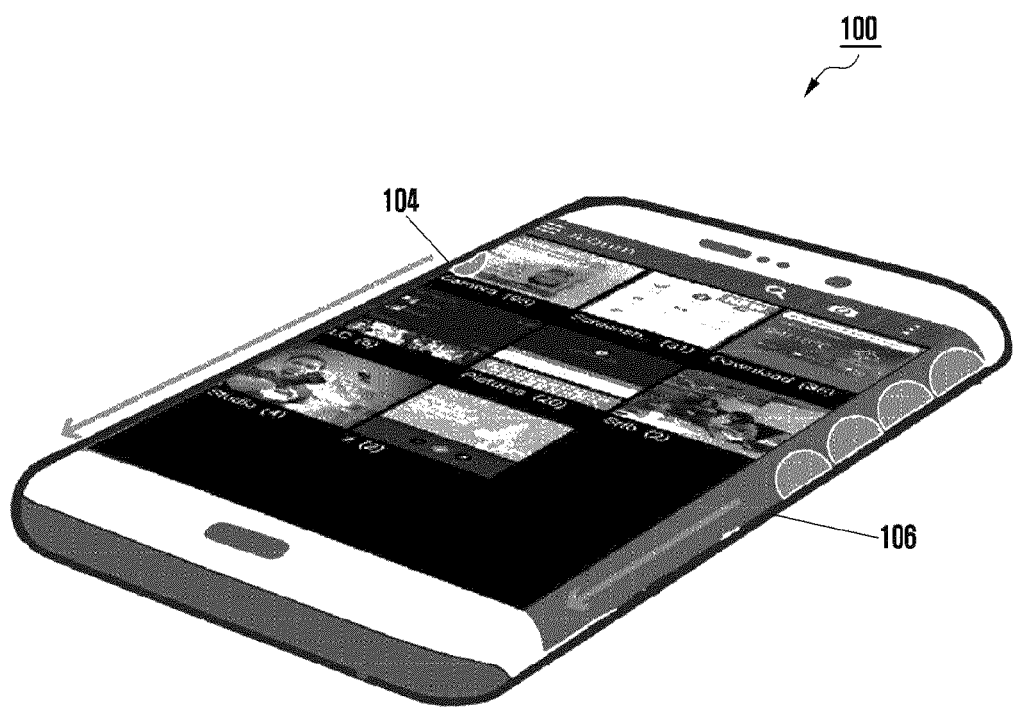
FIGS. 10A and 10B illustrate another example for permanently terminating a running application, according to various embodiments of the present disclosure.
Figure 10B:
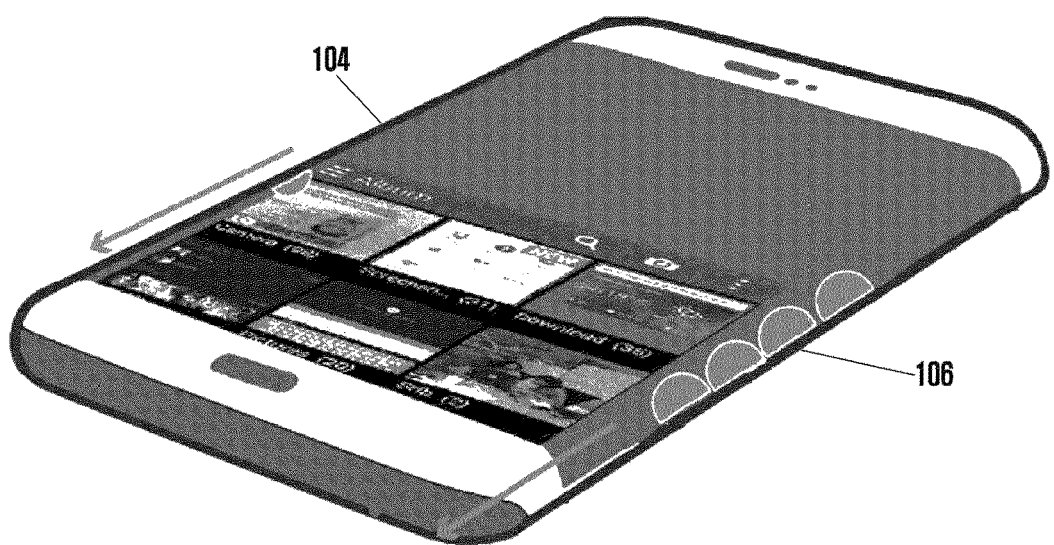

FIGS. 10A and 10B illustrate an example for permanently terminating a running application, according to various embodiments of the present disclosure.

Referring to FIG. 10A, the user may perform the rail swipe gesture from the top portion to the bottom portion with one finger on the first edge 104 and with three or more fingers on the second edge 106. As shown in the FIG. 10B, based on the rail swipe gesture, the running application is terminated permanently instead of being changed to a background application The permanently terminating may comprise deleting an application in a memory such as a volatile memory configured to store running application(s) and background application(s) ready to run or being on standby for running.

FIGS. 11A to 11D illustrate an example to forward or rewind a video, according to various embodiments of the present disclosure.

Figure 11A:
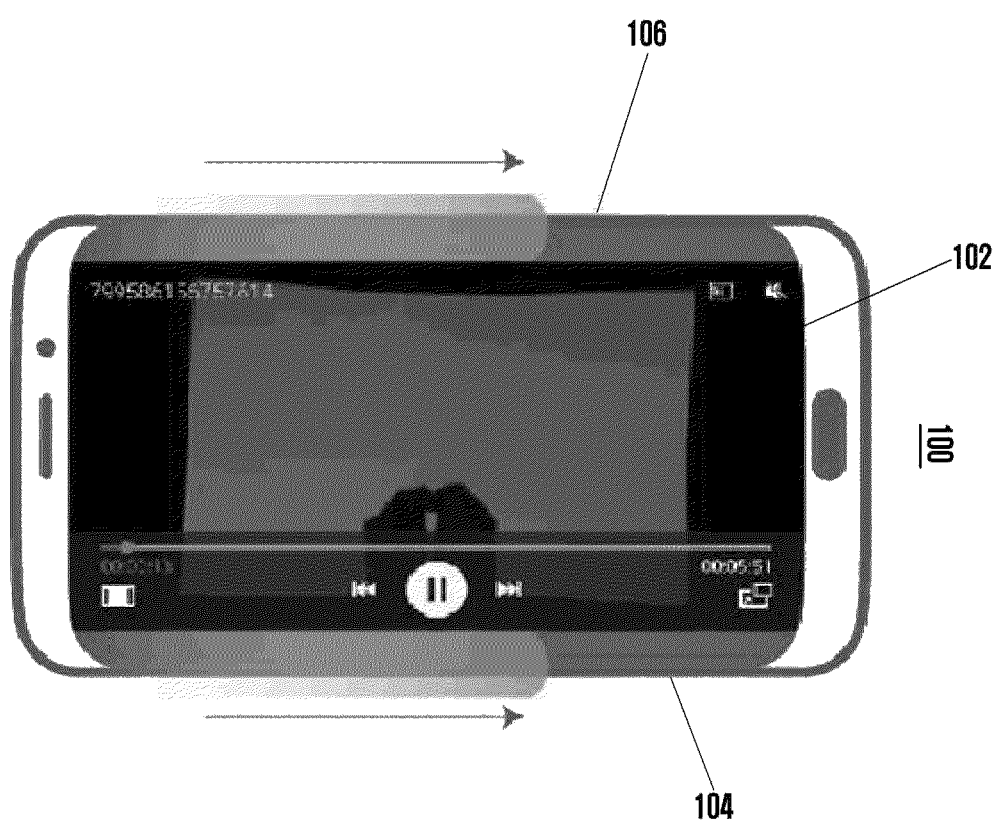
FIGS. 11A 11B, 11C, and 11D illustrate another example to forward or rewind the video, according to various embodiments of the present disclosure.
Figure 11B:
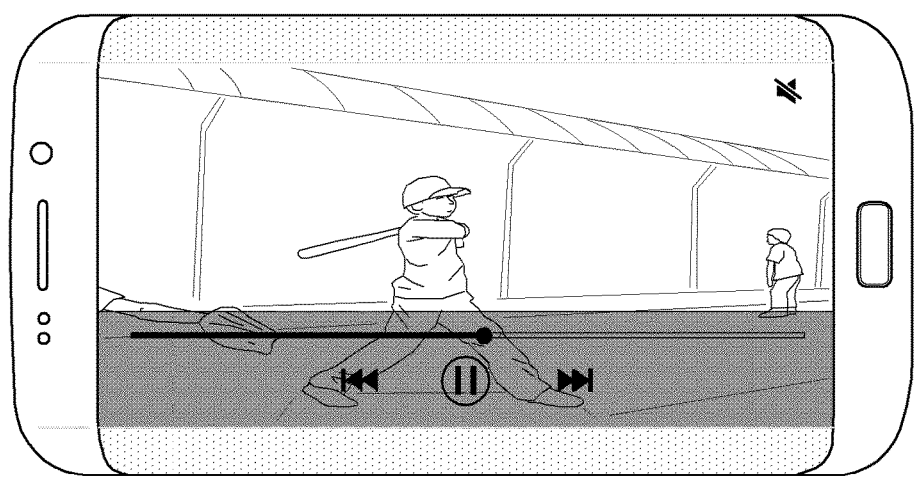

Referring to FIGS. 11A and 11B, consider a scenario where the user is watching the video on the screen 102. In an embodiment of the present disclosure, if the user performs the rail swipe gesture on the first edge 104 and the second edge 106 of the screen 102 with high speed as shown in the FIG. 11A, then the video is fast forwarded as shown in the FIG. 11B.

Figure 11C:
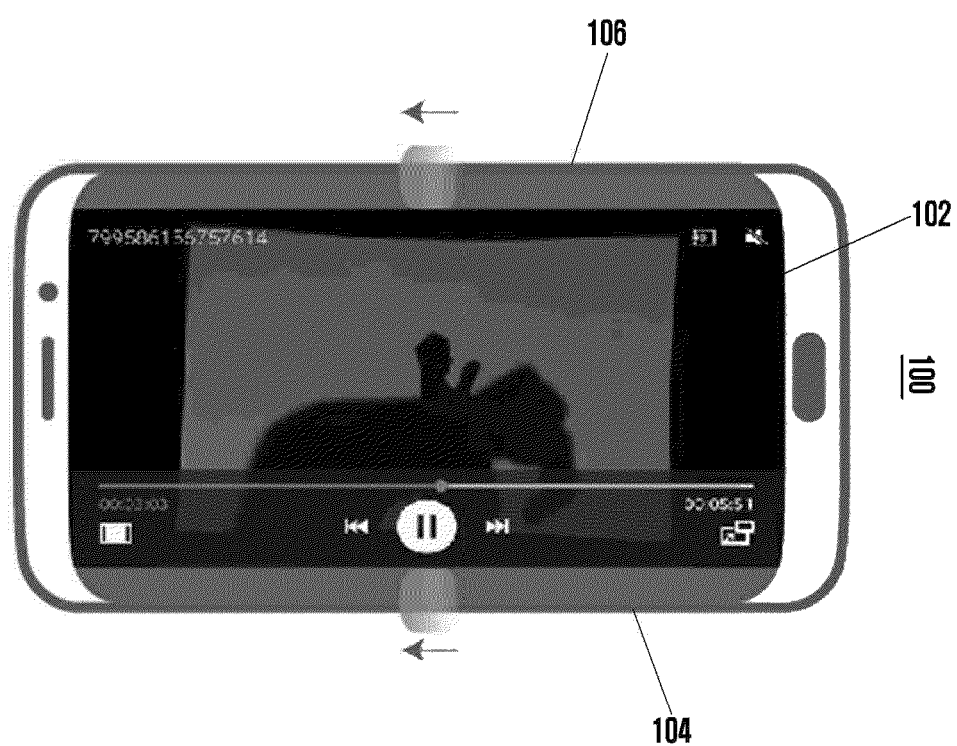
Figure 11D:
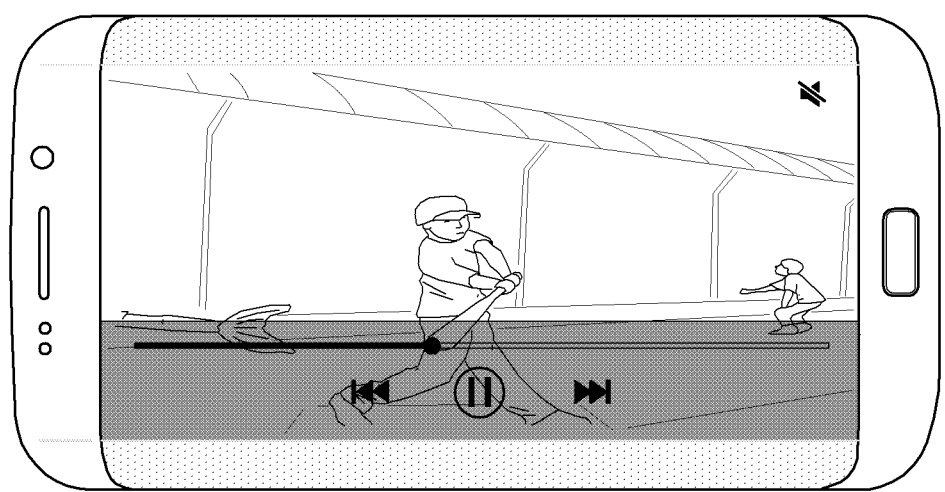

In an embodiment of the present disclosure, if the user performs a rail swipe gesture on the first edge 104 and the second edge 106 of the screen 102 with low speed as shown in the FIG. 11c, then the video is slowly rewinded as shown in the FIG. 11D.

Figure 12A:
FIGS. 12A, 12B, and 12C illustrate various use case scenarios of the rail swipe gesture performed at a variable speed, according to various embodiments of the present disclosure.
Figure 12B:
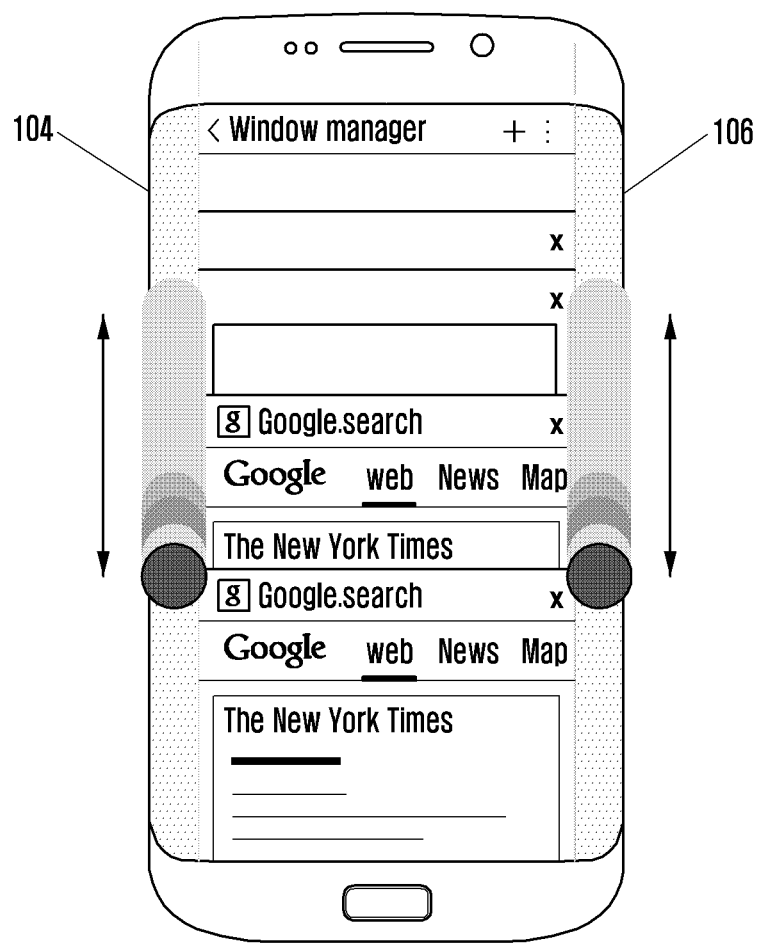
Figure 12C:
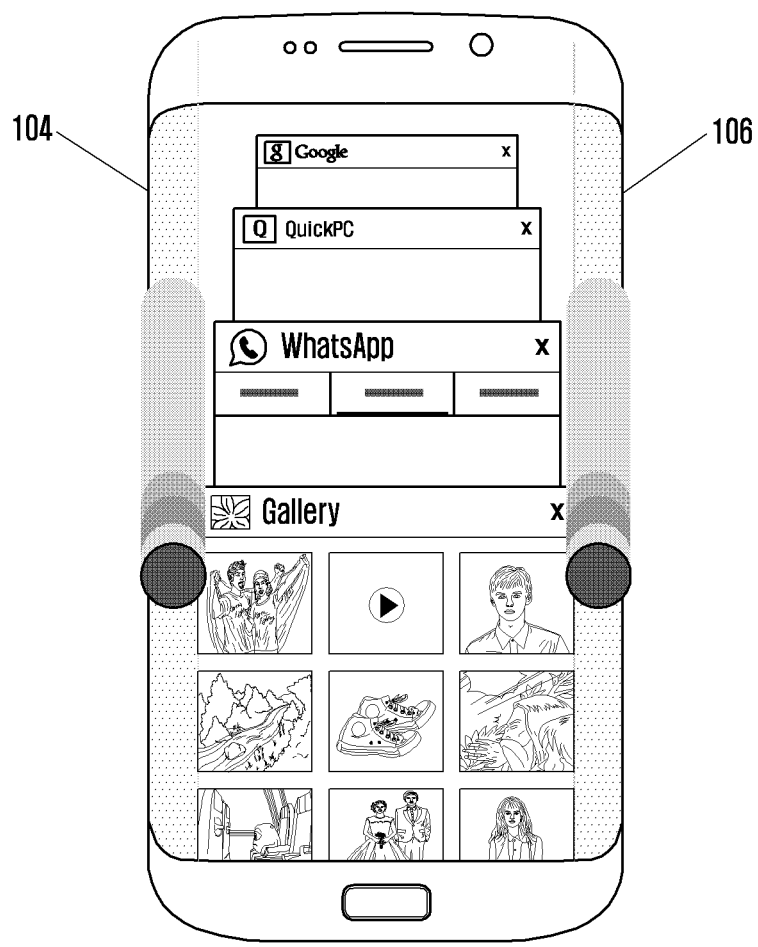

FIGS. 12A to 12C illustrate various use case scenarios of the rail swipe gesture performed at a variable speed, according to various embodiments of the present disclosure.

In an embodiment of the present disclosure, referring to FIG. 12A, the rail swipe gesture (i.e., up or down) along the first edge 104 and the second edge 106 is performed to forward or rewind the video depending on the speed of the rail swipe gesture performed by the user.

In an embodiment of the present disclosure, referring to FIG. 12B, the rail swipe gesture (i.e., up or down) along the first edge 104 and the second edge 106 is performed by the user in the browser window to switch between active tabs depending on the speed of the rail swipe gesture. In another embodiment of the present disclosure, referring to FIG. 12C, the rail swipe gesture (i.e., up or down) along the first edge 104 and the second edge 106 performed by the user in task manager to switch between the running applications depending on the speed of the rail swipe gesture.

Figure 13A:
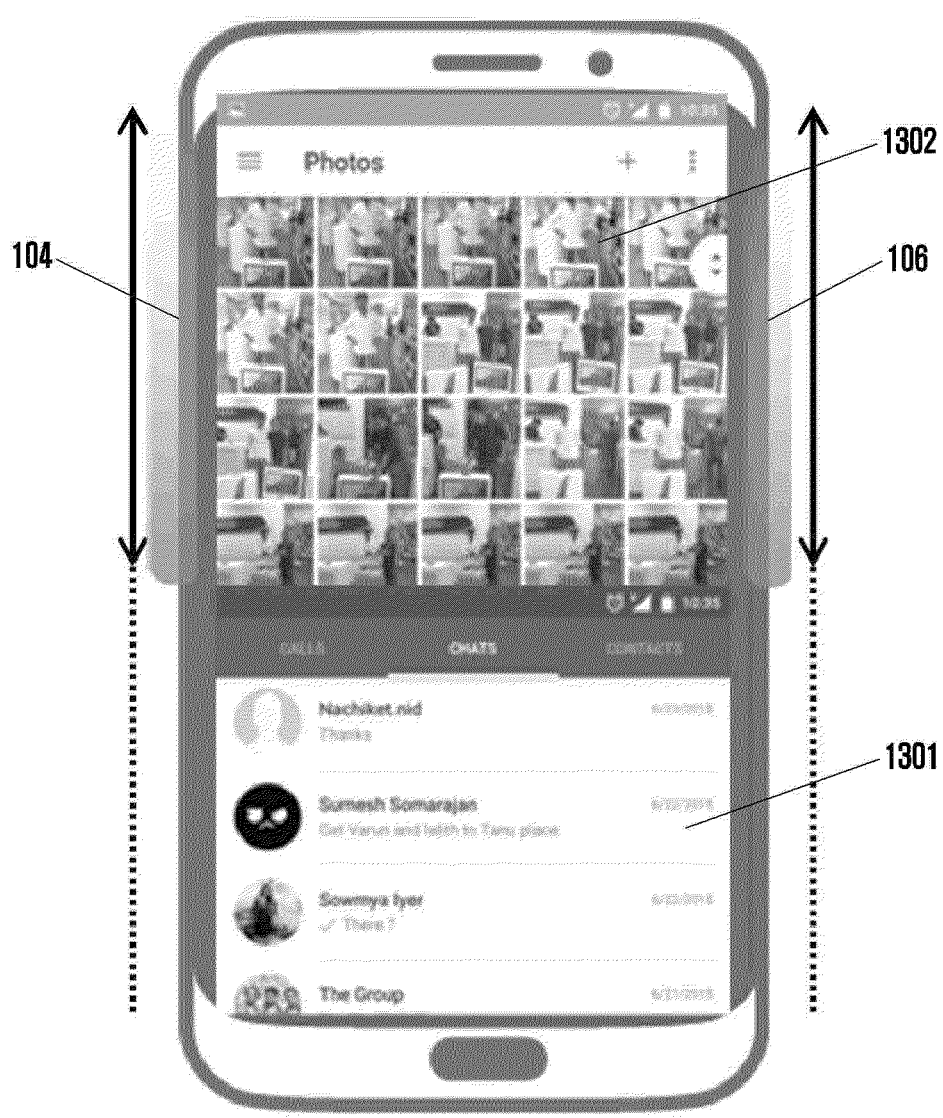
FIGS. 13A and 13B illustrate another example for invoking a multi-window using a partial swipe gesture, according to various embodiments of the present disclosure.
Figure 13B:
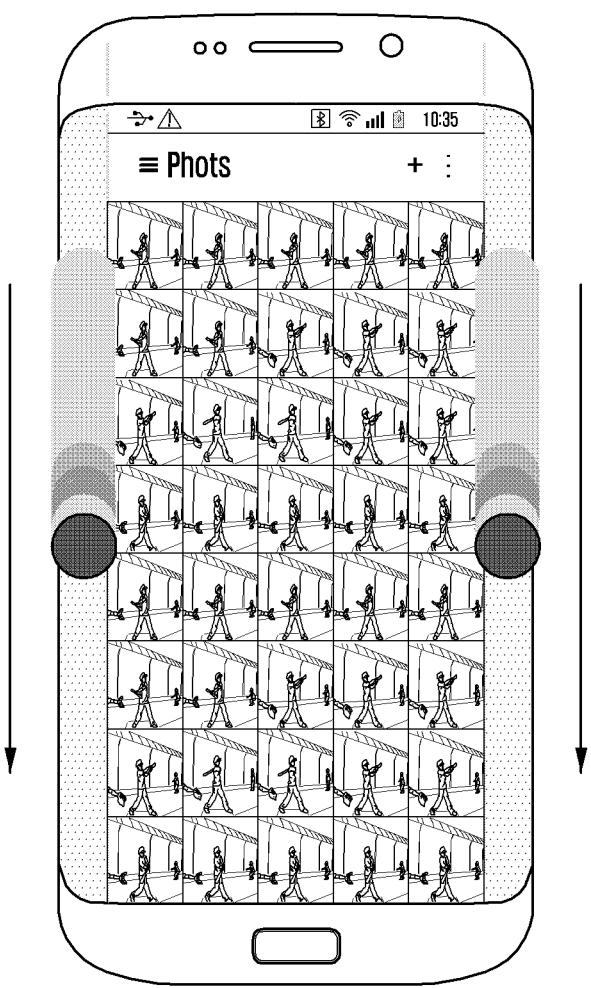

FIGS. 13A and 13B illustrate another example for invoking a background application using the rail swipe gesture, according to various embodiments of the present disclosure.

Referring to FIG. 13A, The rail swipe gesture (i.e., down) along the first edge 104 and the second edge 106 originating from the top portion is performed by the user to partially display a window of previous application 1301 in the background. The rail swipe gesture (i.e., upside) along the first edge 104 and the second edge 106 originating from the bottom portion is performed to partially display a window of next application 1302 in the background.

Referring to FIG. 13B, the rail swipe gesture (i.e., down) along the first edge 104 and the second edge 106 originating from the top portion to the bottom portion of the screen 102 is performed by the user to bring the previous application in the background to front. Further, the rail swipe gesture (i.e., up) (not shown) along the first edge 104 and the second edge 106 originating from the bottom portion to the top portion is performed by the user to bring the next application in the background to front.

Figure 14A:
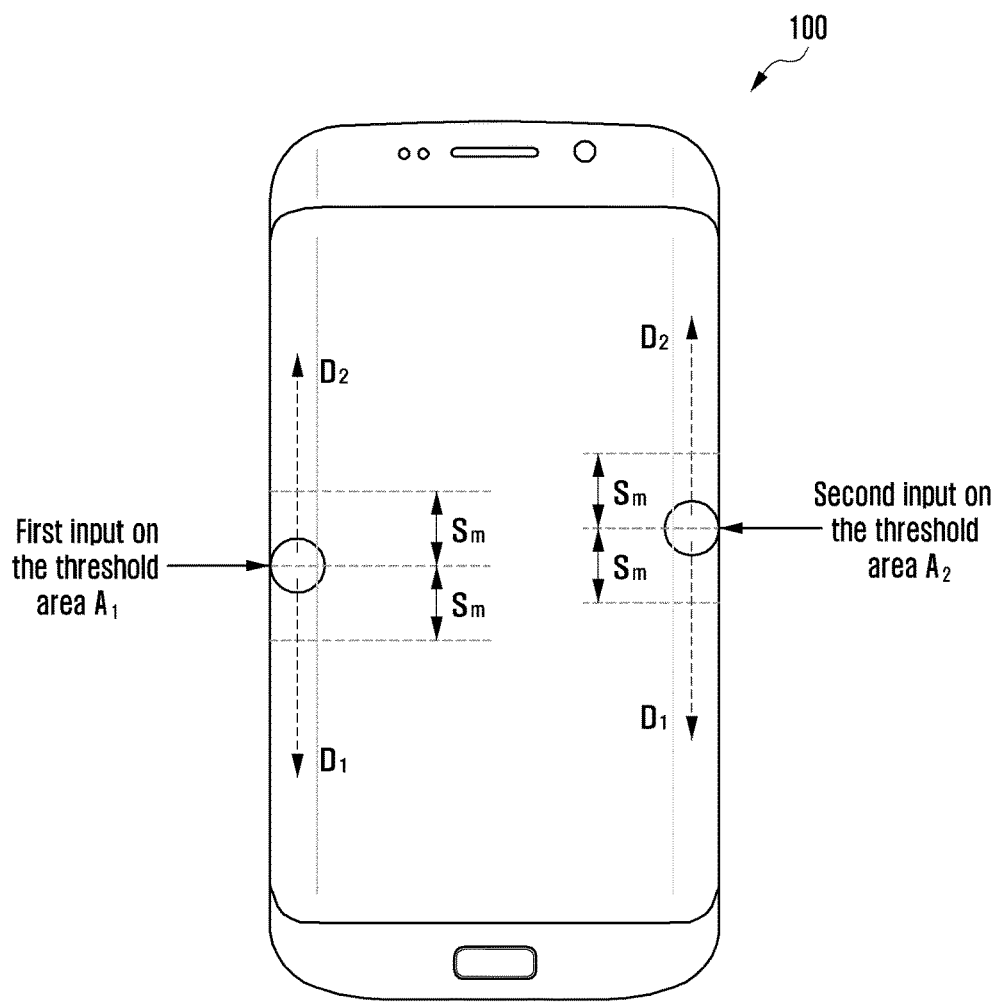
FIGS. 14A and 14B illustrate the electronic device with parameters defined to detect an asymmetric swipe gesture, according to various embodiments of the present disclosure.
Figure 14B:
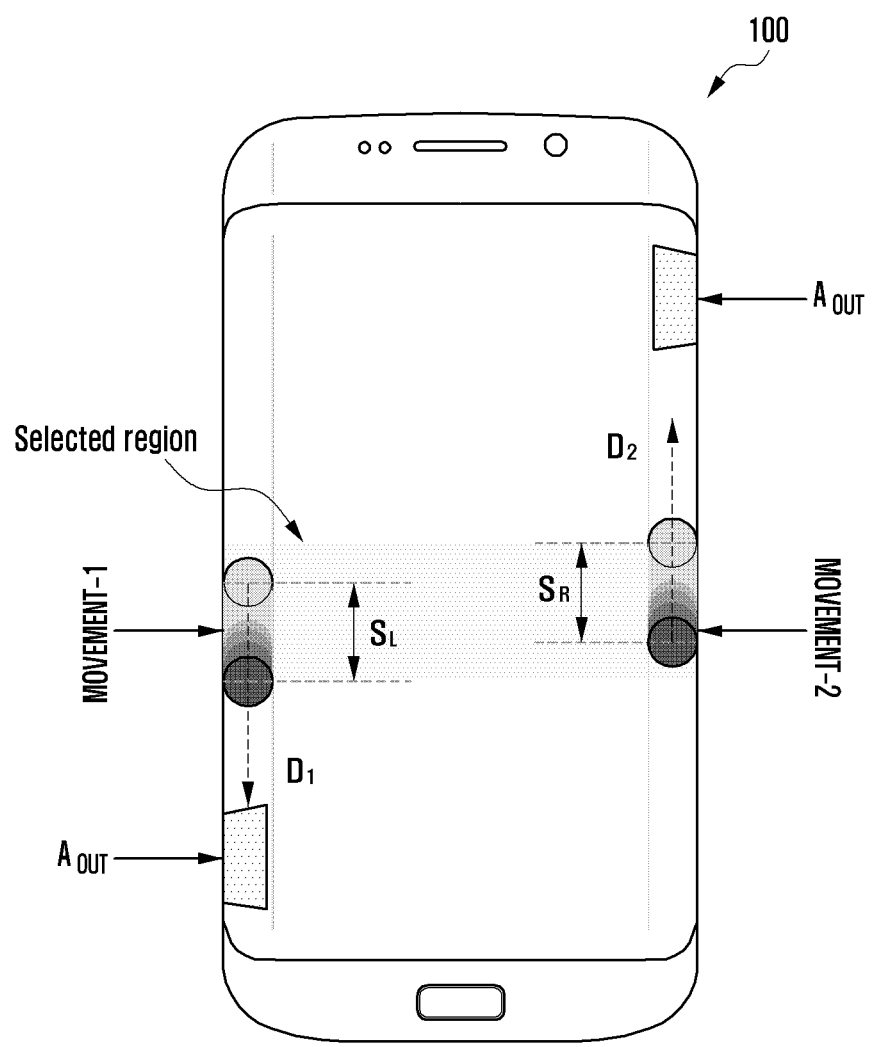

FIGS. 14A and 14B illustrate the electronic device 100 along with parameters defined to detect an asymmetric swipe gesture, according to various embodiments of the present disclosure. In an embodiment of the present disclosure, the electronic device 100 includes an area to detect the asymmetric swipe gesture. The asymmetric swipe gesture is defined based on the parameters such as $D_1$, $D_2$, $S_M$, $S_L$, $S_R$, $T_0$, $A_{OUT}$, $S_0$, $S_1$, and $S_2$. Where, Referring to FIGS. 14A and 14B, $D_1$: Refers to a direction vector for the asymmetric rail swipe gesture $D_2$: Refers to a direction vector for the asymmetric rail swipe gesture $S_M$: Refers to a minimum distance to detect the asymmetric rail swipe gesture and to reject any false triggers.

$S_L$: Refers to distance moved by "MOVEMENT-1" during the asymmetric rail swipe gesture.

$S_R$: Refers to distance moved by "MOVEMENT-2" during the asymmetric rail swipe gesture.

$T_0$: Refers to a threshold time between the first input and the second input to differentiate a single input and a dual touch input.

$A_{OUT}$: Refers to an output trigger area. $A_{OUT}$ on both sides may be in opposite directions. (i.e., user lifts his fingers in this area or cross extreme top or bottom portions of the threshold area ($A_1$).

$S_0$: Refers to an initial state of the electronic device 100 ready to detect the touch inputs (i.e., first input and the second input) performed on the first edge 104 and the second edge 106 of the screen 102.

$S_1$: Refers to detecting dual touch inputs and the electronic device 100 ready to detect start of the asymmetric rail swipe gesture.

$S_2$: Refers to a state where the electronic device 100 detects the start of the asymmetric rail swipe gesture.

Further, in an embodiment of the present disclosure, the $S_L$ and $S_R$ together may be in the opposite direction. For example, the $S_L$ and $S_R$ individually can be upwards or downwards based on the swipe gesture performed upwards or downwards by the user.

Figure 15A:
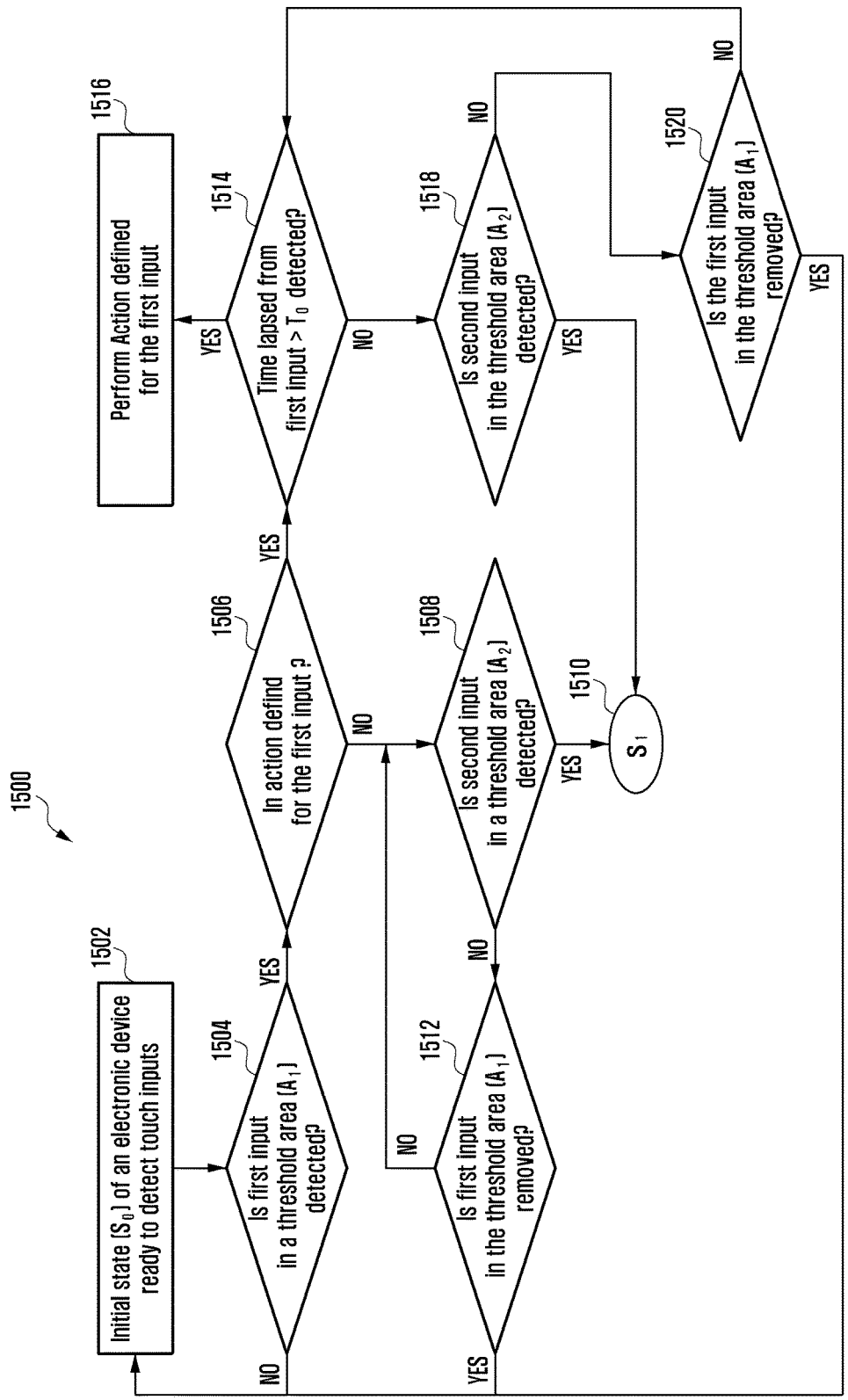
Figure 15B:
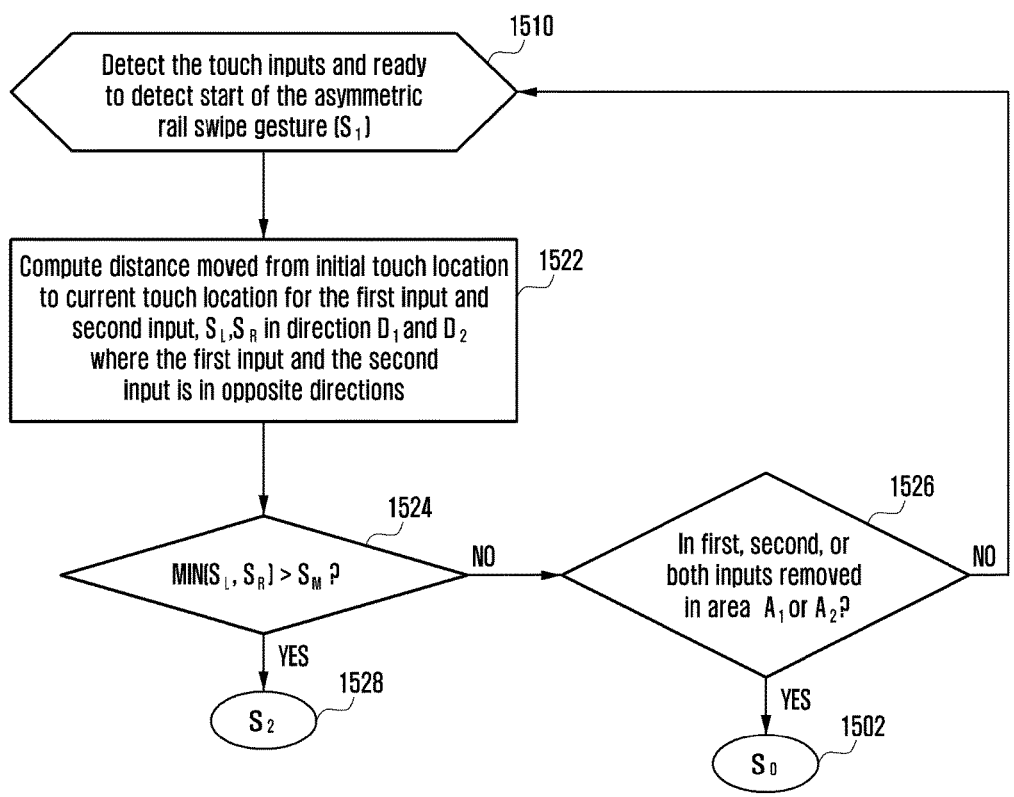

FIGS. 15A, 15B and 15C are flow charts illustrating a method 1500 for performing the action in the electronic device 100 based on the asymmetric rail swipe gesture performed on the first edge 104 and the second edge 106, according to various embodiments of the present disclosure.

Referring to FIGS. 15A to 15C, the sequence of operations can be performed inside the electronic device 100 by using the microcontroller, the microprocessor, the control unit 206 or any computer readable storage medium.

At operation 1502, the method 1500 indicates the initial state ($S_0$) of the electronic device 100 ready to detect the touch inputs (i.e., the first input and the second input). If it is determined, at operation 1504, that the first input in the threshold area "$A_1$" is not detected, then the method 1500 is looped back to operation 1502 as described above. If it is determined, at operation 1504, that the first input in the threshold area "$A_1$" is detected, then at operation 1506, the method 1500 includes determining whether the action is defined for the first input. If it is determined, at operation 1506, that the action is not defined for the first input, then at operation 1508, the method 1500 includes determining whether the second input in the threshold area "$A_2$" is detected. If it is determined, at operation 1508, that the second input in the threshold area "$A_2$" is detected, then at operation 1510, the method 1500 includes detecting the first input, the second input and ready to detect the start of the asymmetric rail swipe gesture. If it is determined, at operation 1508, that the second input in the threshold area "$A_2$" is not detected, then at operation 1512, the method 1500 includes determining whether the first input in the threshold area "$A_1$" is removed.

If it is determined, at operation 1512, that the first input in the threshold area "$A_1$" is removed, then the method 1500 is looped back to operation 1502 as described above. If it is determined, at operation 1512, that the first input in the threshold area "$A_1$" is not removed, then the method 1500 is looped back to operation 1508 as described above. If it is determined, at operation 1506, that the action is defined for the first input, then at operation 1514, the method 1500 includes determining whether the time lapsed from the first input is greater than $T_0$ (i.e., $>T_0$). If it is determined, at operation 1514, that the time lapsed from the first input is greater than $T_0$ (i.e., $>T_0$), then at operation 1516, the method 1500 includes performing the action defined for the first input.

If it is determined, at operation 1514, that the time lapsed from the first input is not greater than $T_0$ (i.e., $>T_0$), then at operation 1518, the method 1500 includes determining whether the second input in the threshold area "$A_2$" is detected. If it is determined, at operation 1518, that the second input in the threshold area "$A_2$" is not detected, then at operation 1520, the method 1500 includes determining whether the first input in the threshold area "$A_1$" is removed. If it is determined, at operation 1520, that the first input in the threshold area "$A_1$" is removed, the method 1500, is looped back to operation 1502 as described above. If it is determined, at operation 1520, that the first input in the threshold area "$A_1$" is not removed, then the method 1500 is looped back to operation 1514 as described above. If it is determined, at operation 1518, that the second input in the threshold area "$A_2$" is detected, then the method 1500 is looped back to operation 1510 as described above. After detecting the first input and the second input, the electronic device 100 can be configured to detect the start of the asymmetric rail swipe gesture, and the below described operations are performed.

At operation 1522, the method 1500 includes computing the distance moved from the initial touch location to the current touch location for the first input and the second input, the distance moved by "MOVEMENT-1" on the first edge 104 during the asymmetric rail swipe gesture (i.e., $S_L$), the distance moved by "MOVEMENT-2" on the second edge 106 during the asymmetric rail swipe gesture (i.e., $S_R$) in the direction of $D_1$ and $D_2$, where the first input and the second input is in the opposite directions. If it is determined, at operation 1524, that the minimum of $S_L$, $S_R$ are not greater than $S_M$, then at operation 1526, the method 1500 includes determining whether the first input in the threshold area "$A_1$" is removed, the second input in the threshold area "$A_2$" is removed, or the first input in the threshold area "$A_1$" and the second input in the threshold area "$A_2$" are removed. If it is determined, at operation 1526, that the first input in the threshold area "$A_1$" is removed, the second input in the threshold area "$A_2$" is removed, or the first input in the threshold area "$A_1$" and the second input in the threshold area "$A_2$" are removed, then the method 1500 is looped back to operation 1502 as described above. If it is determined, at operation 1526, that the first input in the threshold area "$A_1$" is not removed, the second input in the threshold area "$A_2$" is not removed, or the first input in the threshold area "$A_1$" and the second input in the threshold area "$A_2$" are not removed, then the method 1500 is looped back to operation 1510 as described above.

If it is determined, at operation 1524, that the minimum of $S_L$, $S_R$ is greater than the $S_M$, then at operation 1528, the method 1500 includes detecting the start of the asymmetric rail swipe gesture. At operation 1530, the method 1500 includes determining the output by adding the $S_L$, $S_R$ and selected region bounds, the maximum velocity of the first input and the second input. If it is determined, at operation 1532, that the output trigger area "$A_{out}$" is defined, then at operation 1534, the method 1500 includes determining whether the first input or the second input entered the output trigger area "$A_{out}$". If it is determined, at operation 1534, that the first input or the second input not entered the output trigger area "$A_{out}$", then at operation 1536, the method 1500 includes determining whether the first input or the second input reached the end of threshold area "$A_1$".

If it is determined, at operation 1536, that the first input or the second input not reached the end of threshold area "$A_1$", then the method 1500 is looped back to operation 1528 as described above. If it is determined, at operation 1536, that the first input or the second input reached the end of threshold area "$A_1$", then at operation 1538, the method 1500 includes detecting the end of the asymmetric rail swipe gesture and performing the action corresponding to the item displayed on the screen 102 of the electronic device 100. If it is determined, at operation 1534, that the first input or the second input entered the output trigger area "$A_{out}$", then the method 1500 performs the operation 1538 as described above.

If it is determined, at operation 1532, that the output trigger area "$A_{out}$" is not defined, then at operation 1540, the method 1500 includes determining whether the first input or the second input is removed. If it is determined, at operation 1540, that the first input or the second input is removed, then the method 1500 performs the operation 1538 as described above. If it is determined, at operation 1540, that the first input or the second input is not removed, then at operation 1542, the method 1500 includes determining whether the first input or the second input reached the end of threshold area "$A_1$". If it is determined, at operation 1542, that the first input or the second input reached the end of threshold area "$A_1$", then the method 1500 performs the operation 1538 as described above. If it is determined, at operation 1542, that the first input or the second input not reached the end of threshold area "$A_1$", then the method 1500 is looped back to operation 1528 as described above.

The various actions, acts, blocks, operations, or the like in the method 1500 may be performed in the order presented, in a different order or simultaneously. Further, in various embodiments of the present disclosure, some of the actions, acts, blocks, operations, or the like may be omitted, added, modified, skipped, or the like without departing from the scope of the disclosure.

Figure 16A:
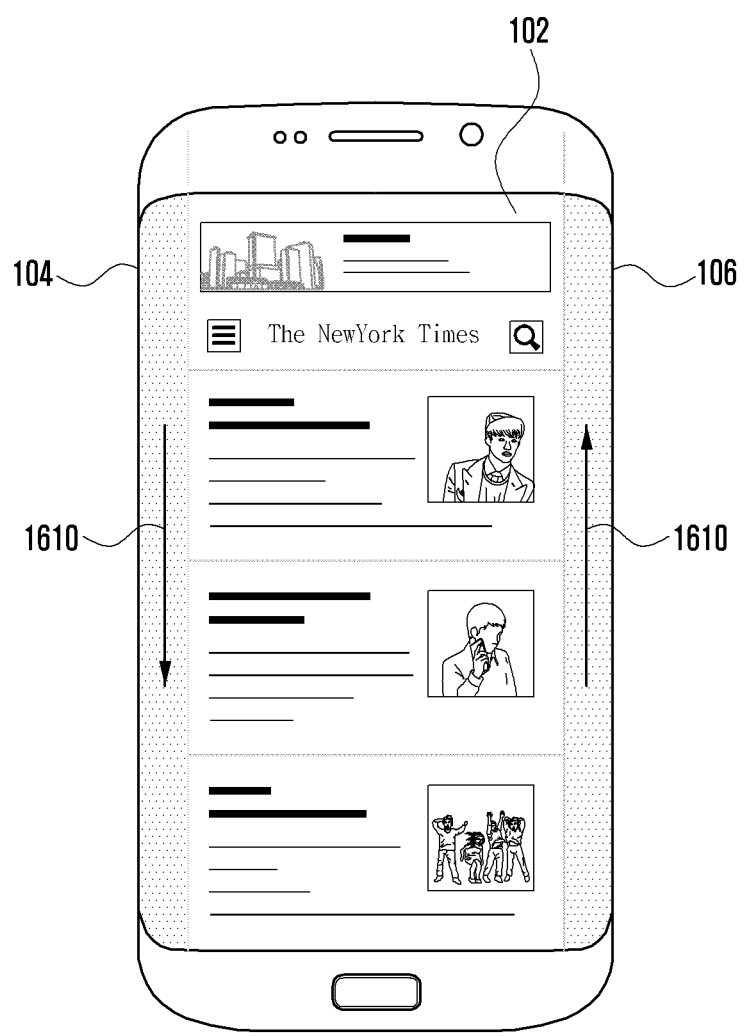
FIGS. 16A, 16B, and 16C illustrate an example for changing an orientation of the screen by performing the asymmetric swipe gesture simultaneously or within a threshold time on the first edge and the second edge, according to various embodiments of the present disclosure.
Figure 16B:
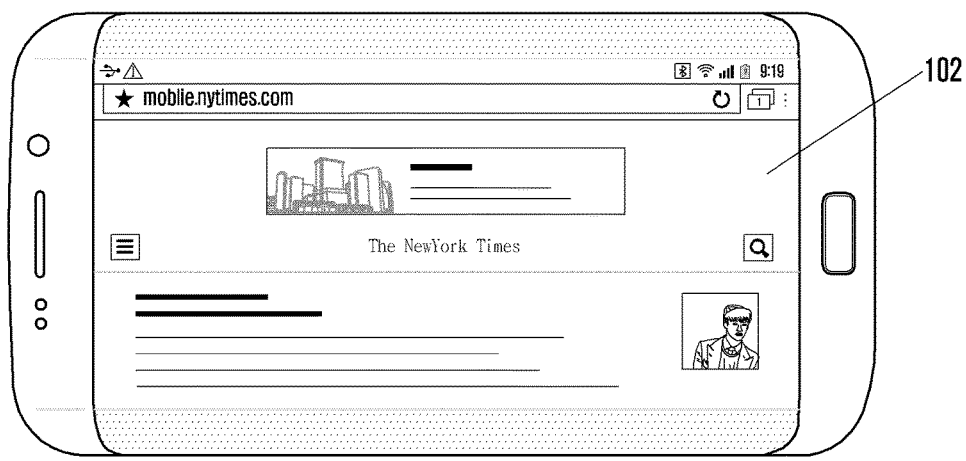
Figure 16C:
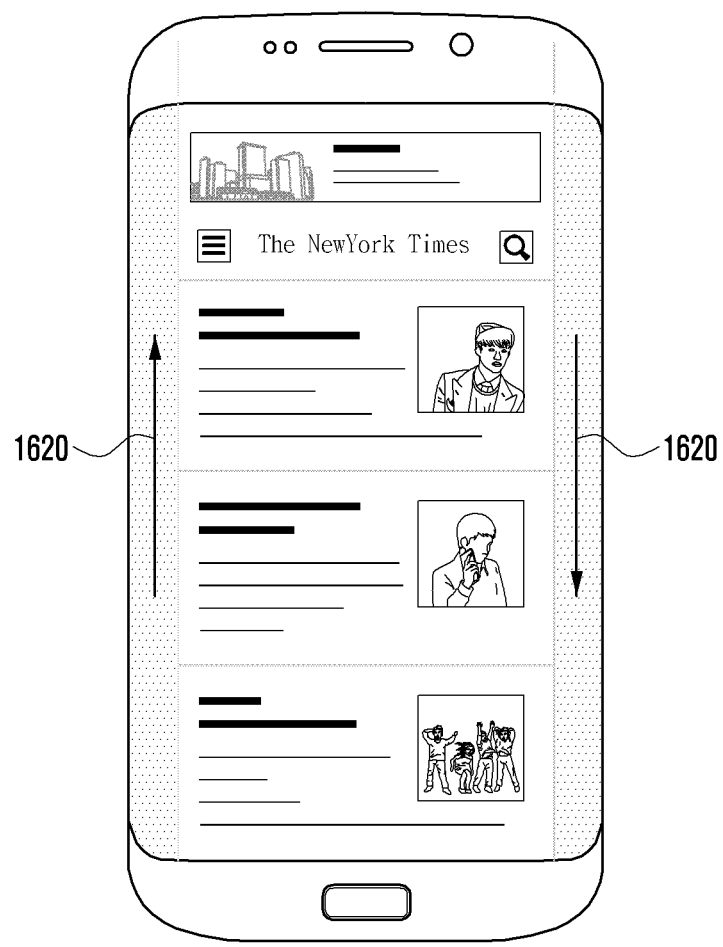
Figure 17A:
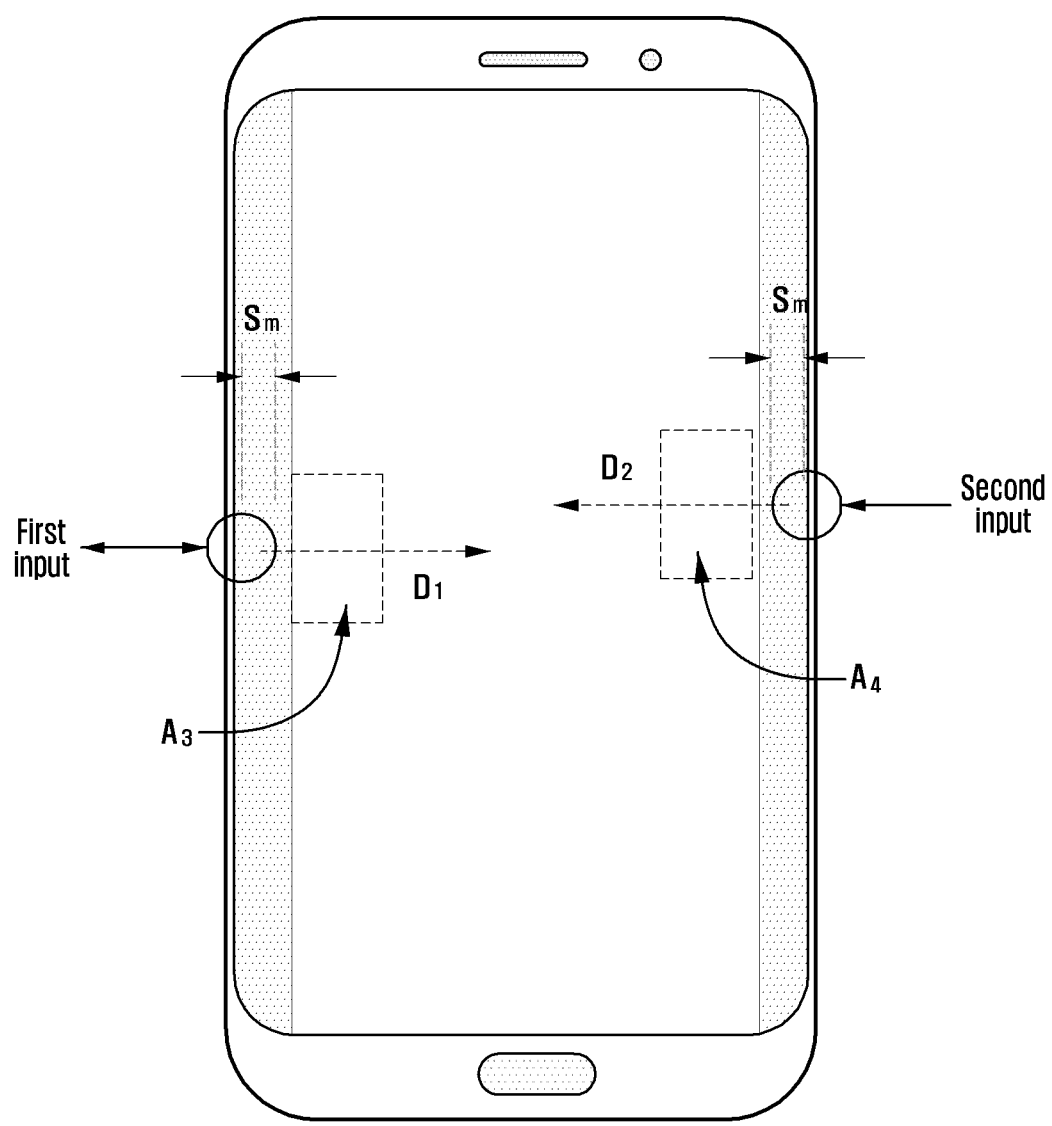
FIGS. 17A, 17B, 17C, 17D, and 17E illustrate the electronic device with parameters defined to detect a squeeze gesture or a lift and drop gesture, according to various embodiments of the present disclosure.
Figure 17B:
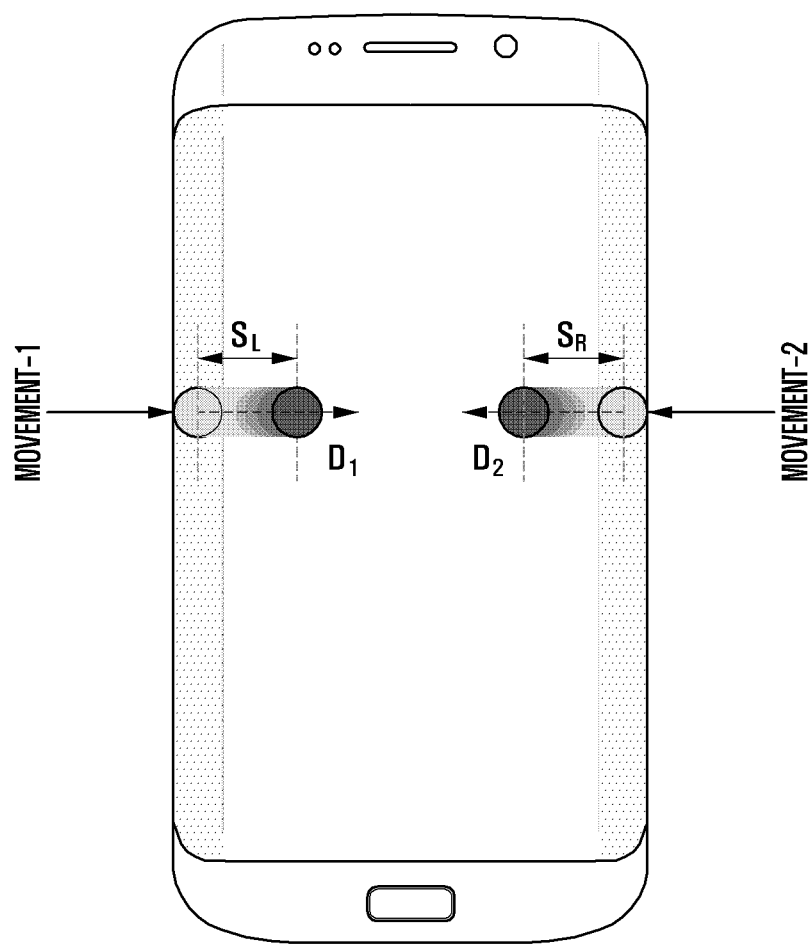
Figure 17C:
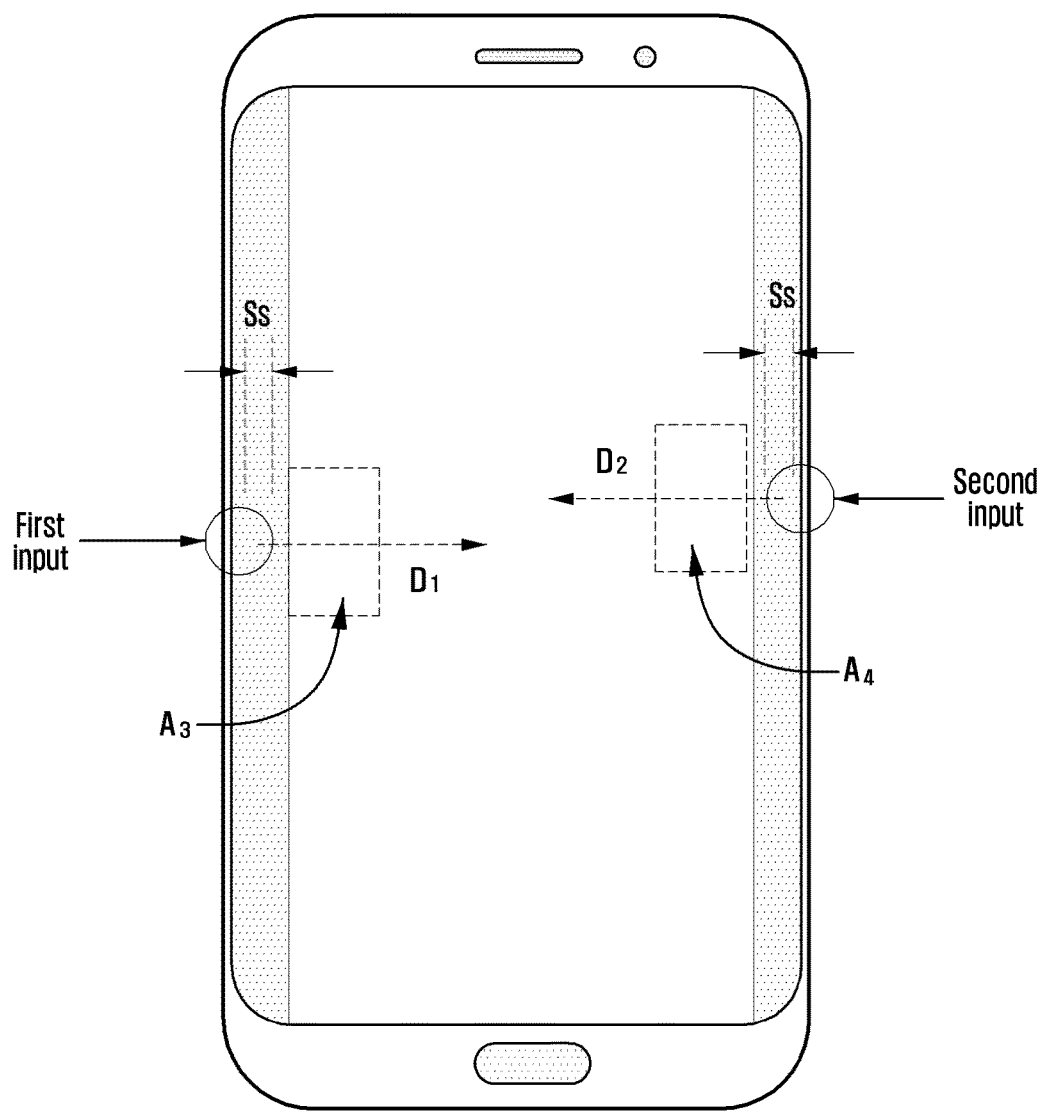
Figure 17D:
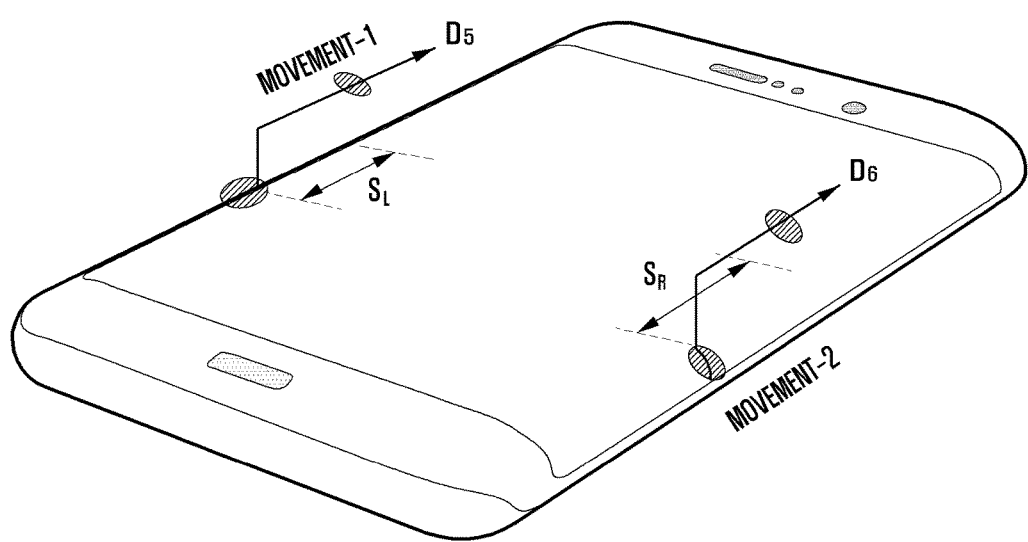
Figure 17E:
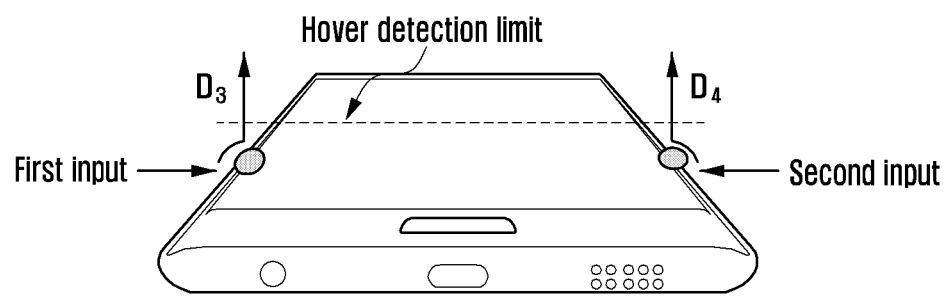
Figure 18A:
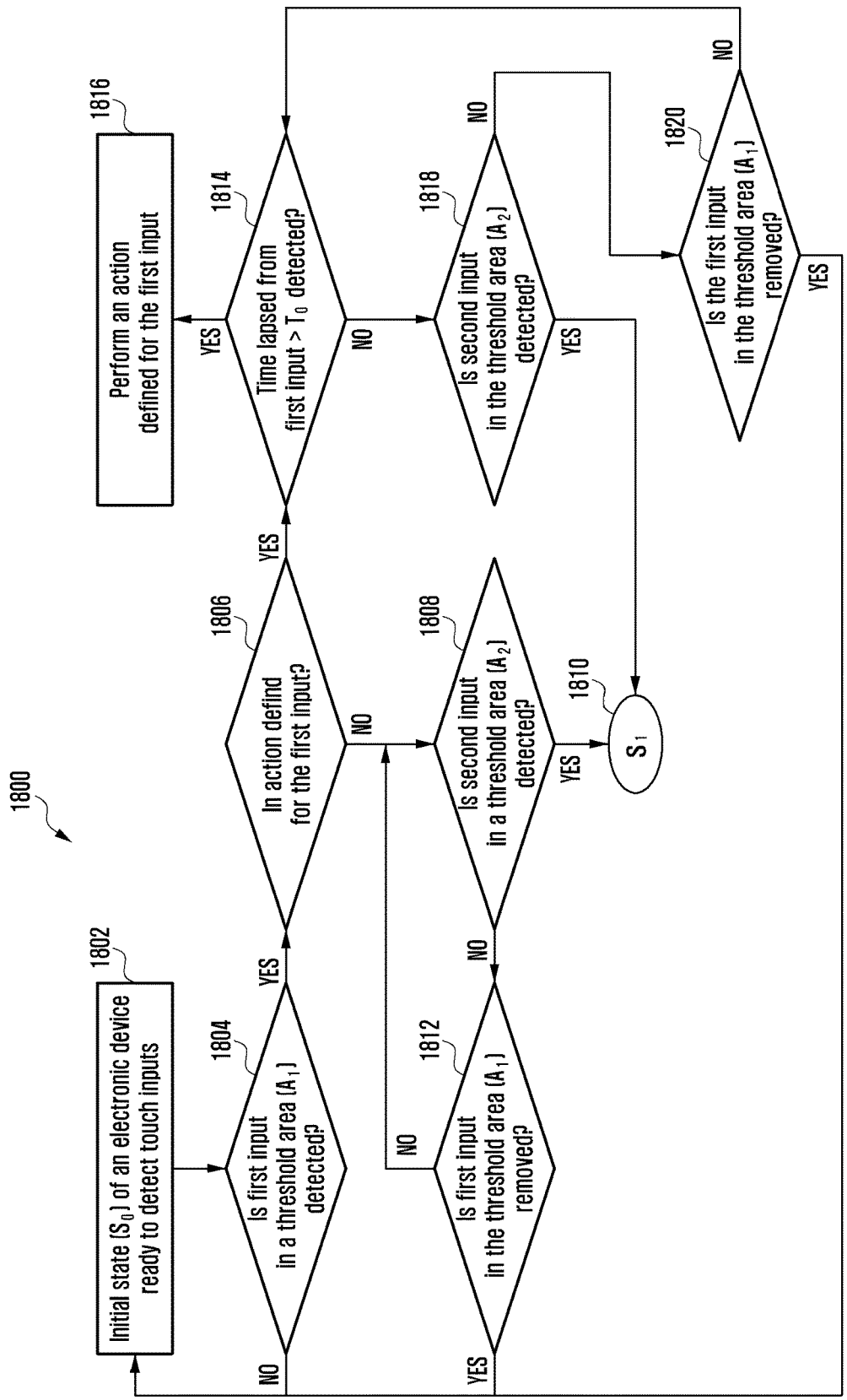
FIGS. 18A, 18B, 18C, 18D, and 18E are a flow chart illustrating a method for performing the action in the electronic device based on the squeeze gesture or the lift and drop gesture performed simultaneously on the first edge and the second edge on the screen, according to various embodiments of the present disclosure.
Figure 18B:
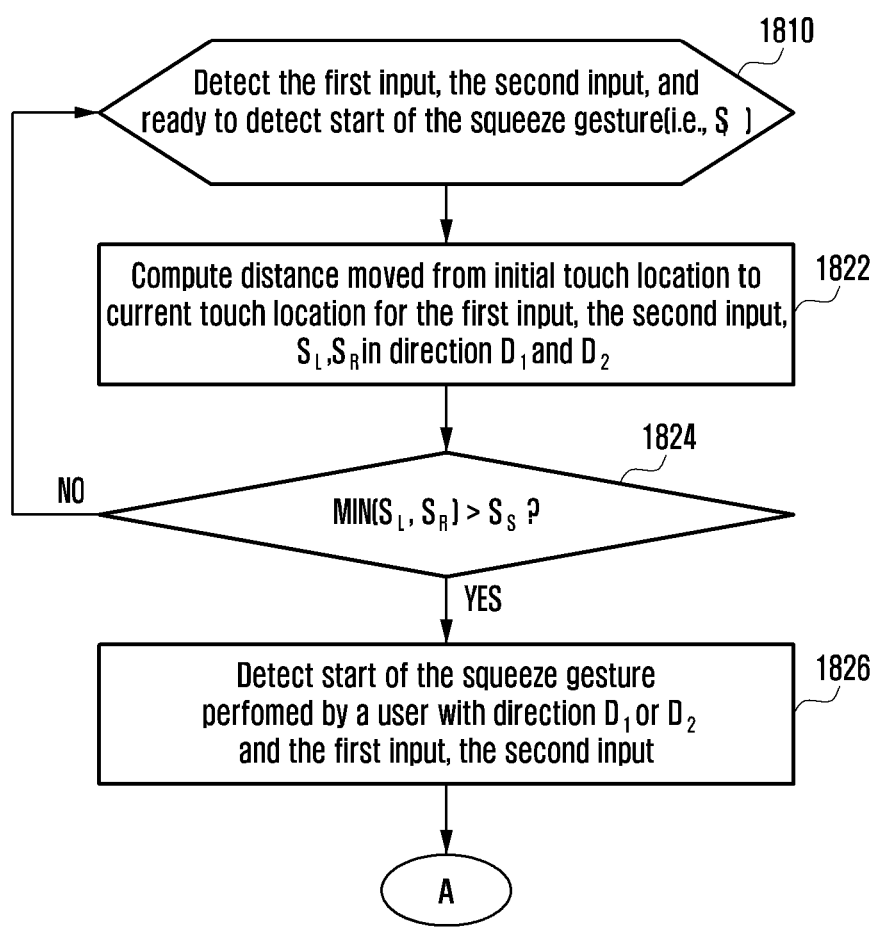
Figure 18C:
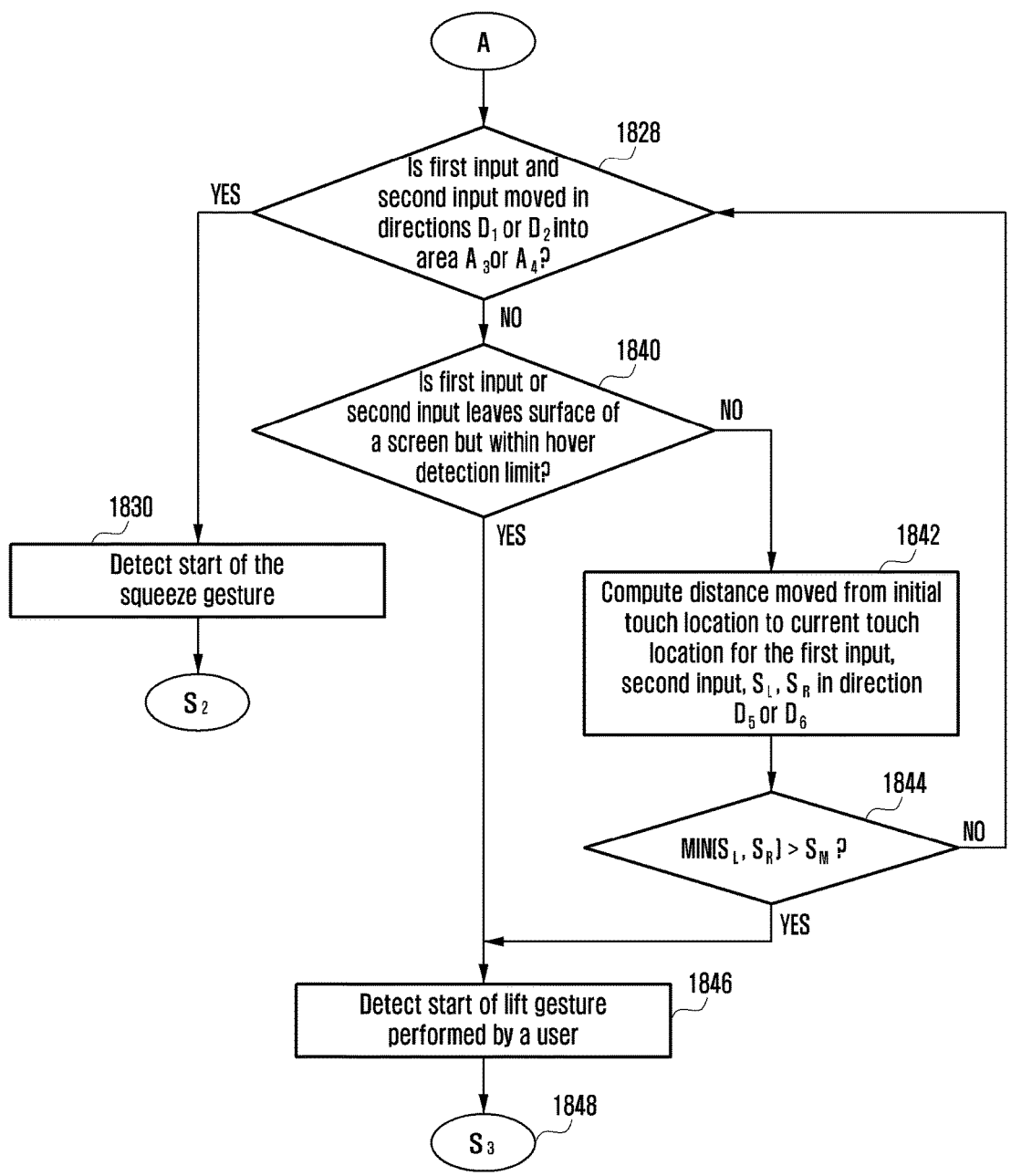
Figure 18D:
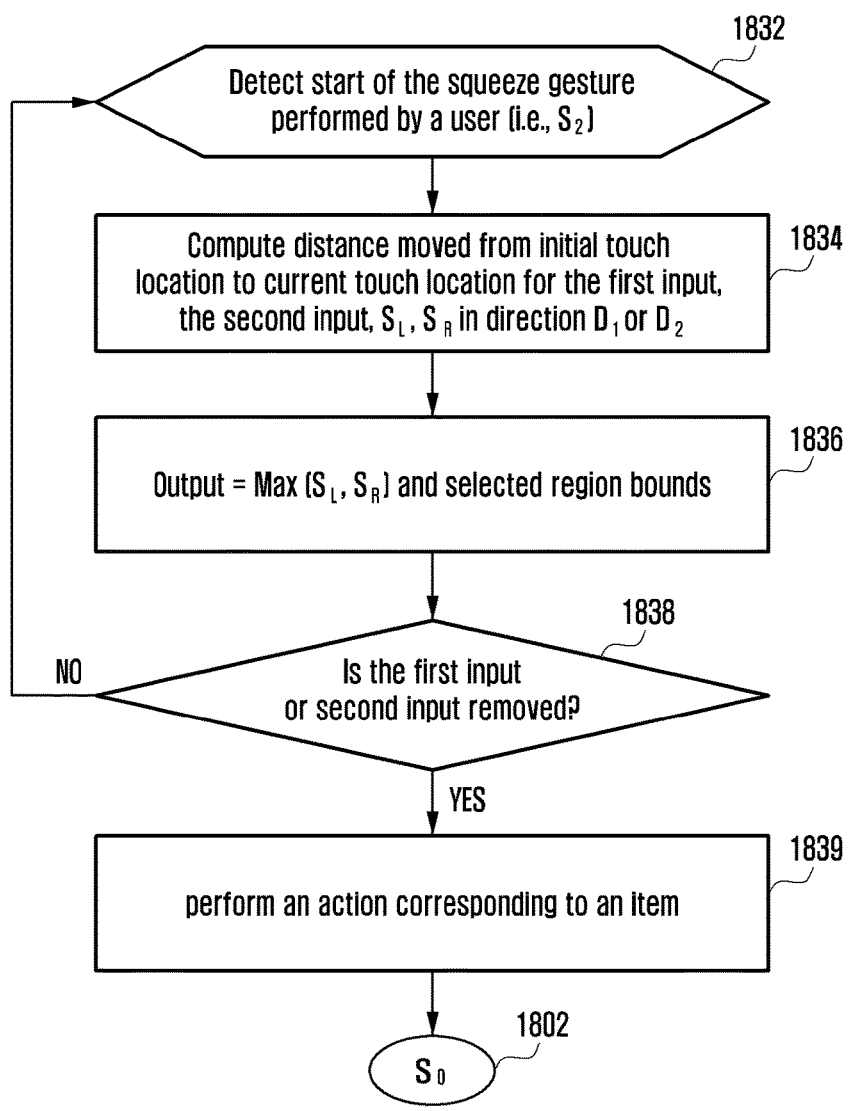
Figure 18E:
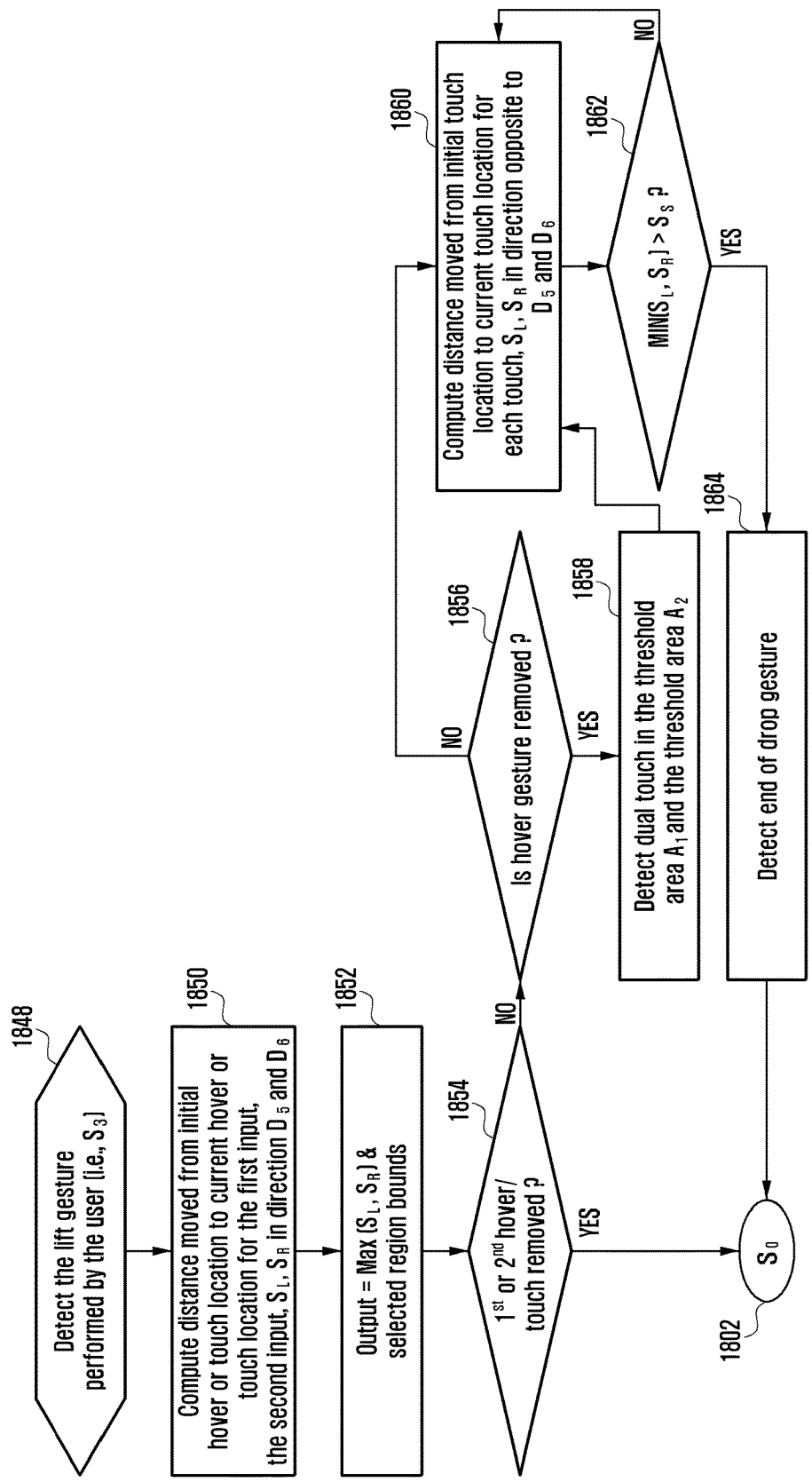

FIGS. 16A to 16C illustrate an example for changing an orientation of the screen 102 by performing a asymmetric swipe gesture simultaneously or within the threshold time on the first edge 104 and the second edge 106, according to various embodiments of the present disclosure.

Referring to FIGS. 16A to 16C, consider a scenario, where the user needs to change the orientation of the screen 102 in a lock state that the screen is not rotated. The user performs a first asymmetric rail swipe gesture 1610 on the first edge 104 and the second edge 106 as shown in the FIG. 16A. Based on the first asymmetric rail swipe gesture 1610, a setting of screen 102 may be changed from the lock state to the rotatable state. In response to detecting the first asymmetric rail swipe gesture 1610, the current orientation of the screen 102 may be changed as shown in the FIG. 16B. In response to performing a second asymmetric rail swipe gesture 1620 on the first edge 104 and the second edge 106 as shown in the FIG. 16C, the rotation lock of the screen 102 is activated. The first asymmetric rail swipe 1610 and the second asymmetric rail swipe 1620 may be in the opposite direction.

FIGS. 17A to 17E illustrate the electronic device 100 with parameters defined to detect a squeeze gesture, or a lift and drop gesture, according to various embodiments of the present disclosure. In an embodiment of the present disclosure, the electronic device 100 includes an area to detect the squeeze gesture, or the lift and drop gesture. The squeeze gesture, or the lift and drop gesture is defined based on the parameters such $D_1$, $D_2$, $D_3$, $D_4$, $D_5$, $D_6$, $A_3$, $A_4$, $S_M$.

Referring to FIGS. 17A to 17E, $A_3$: Refers to a squeeze threshold area for the first input in state $S_1$ $A_4$: Refers to a squeeze threshold area for the second input in state $S_1$ $D_1$: Refers to a direction vector for the squeeze gesture for the first input in state $S_2$ $D_2$: Refers to a direction vector for the squeeze gesture for the second input in state $S_2$ $D_3$: Refers to a direction vector for a lift gesture for the first input in state $S_1$ $D_4$: Refers to a direction vector for the lift gesture for the second input in state $S_1$ $D_5$: Refers to a direction vector for the lift gesture for "MOVEMENT-1" in state $S_3$ $D_6$: Refers to a direction vector for the lift gesture for "MOVEMENT-2" in state $S_3$ $S_S$: Refers to a minimum distance for squeeze or drop gesture detection to reject false triggers.

$S_M$: Refers to a minimum distance for the swipe gesture detection to reject false triggers.

FIGS. 18A, 18B, 18C, 18D, and 18E are flow charts illustrating a method 1800 for performing the action in the electronic device 100 based on a squeeze gesture, or a lift and drop gesture performed on the first edge 104 and the second edge 106 on the screen 102, according to various embodiments of the present disclosure.

Referring to FIGS. 18A to 18E, the sequence of operations can be performed inside the electronic device 100 by using the microcontroller, the microprocessor, the control unit 206 or any computer readable storage medium.

At operation 1802, the method 1800 indicates the initial state ($S_0$) of the electronic device 100 ready to detect the touch inputs (i.e., the first input and the second input). If it is determined, at operation 1804, that the first input in the threshold area "$A_1$" is not detected, then the method 1800 is looped back to operation 1802 as described above. If it is determined, at operation 1804, that the first input in the threshold area "$A_1$" is detected, then at operation 1806, the method 1800 includes determining whether the action is defined for the first input. If it is determined, at operation 1806, that the action is not defined for the first input, then at operation 1808, the method 1800 includes determining whether the second input in the threshold area "$A_2$" is detected. If it is determined, at operation 1808, that the second input in the threshold area "$A_2$" is detected, then at operation 1810, the method 1800 includes detecting the first input, the second input, and ready to detect the start of the squeeze gesture performed by the user. If it is determined, at operation 1808, that the second input in the threshold area "$A_2$" is not detected, then at operation 1812, the method 1800 includes determining whether the first input in the threshold area "$A_1$" is removed.

If it is determined, at operation 1812, that the first input in the threshold area "$A_1$" is removed, then the method 1800 is looped back to operation 1802 as described above. If it is determined, at operation 1812, that the first input in the threshold area "$A_1$" is not removed, then the method 1800 is looped back to operation 1808 as described above. If it is determined, at operation 1806, that the action is defined for the first input, then at operation 1814, the method 1800 includes determining whether the time lapsed from the first input is greater than $T_0$ (i.e., $>T_0$). If it is determined, at operation 1814, that the time lapsed from the first input is greater than $T_0$ (i.e., $>T_0$), then at operation 1816, the method 1800 includes performing the action defined for the first input.

If it is determined, at operation 1814, that the time lapsed from the first input is not greater than $T_0$ (i.e., $>T_0$), then at operation 1818, the method 1800 includes determining whether the second input in the threshold area "$A_2$" is detected. If it is determined, at operation 1818, that the second input in the threshold area "$A_2$" is not detected, then at operation 1820, the method 1800 includes determining whether the first input in the threshold area "$A_1$" is removed. If it is determined, at operation 1820, that the first input in the threshold area "$A_1$" is removed, the method 1800 is looped back to the operation 1802 as described above. If it is determined, at operation 1820, that the first input in the threshold area "$A_1$" is not removed, then the method 1800 is looped back to operation 1814 as described above. If it is determined, at operation 1818, that the second input in the threshold area "$A_2$" is detected, then the method 1800 is looped back to operation 1810 as described above.

At operation 1822, the method 1800 includes computing the distance moved from the initial touch location to the current touch location for the first input, the second input, $S_L$, $S_R$, in direction $D_1$ or $D_2$. If it is determined, at operation 1824, that the minimum of $S_L$, $S_R$ is not greater than $S_S$, then the method 1800 is looped back to operation 1810 as described above. If it is determined, at operation 1824, that the minimum of $S_L$, $S_R$ is greater than $S_S$, then at operation 1826, the method 1800 includes detecting the start of the squeeze gesture in direction $D_1$ or $D_2$, and the first input and the second input. If it is determined, at operation 1828, that the first input and the second input moved in directions $D_1$ or $D_2$ into the threshold area "$A_3$" or the threshold area "$A_4$", then at operation 1830, the method 1800 includes detecting the start of the squeeze gesture performed by the user.

At operation 1832, the method 1800 includes detecting the squeeze gesture performed by the user (i.e., refers to state $S_2$). At operation 1834, the method 1800 includes computing the distance moved from the initial touch location to the current touch location for the first input, the second input, $S_L$, $S_R$, in direction $D_1$ or $D_2$. At operation 1836, the method 1800 includes determining the maximum of $S_L$ and $S_R$ and selected region bounds. If it is determined, at operation 1838, that the first input and/or the second input is removed, then the method 1800, at operation 1839, performs an action corresponding to an item and then is looped back to operation 1802 as described above. The action may comprise adjusting size of a displayed item. For example, in response to the squeeze gesture, at least one of displayed images may be reduced in direction D1 and D2. If it is determined, at operation 1838, that the first input and the second input is not removed, then the method 1800 is looped back to operation 1832 as described above. If it is determined, at operation 1828, that the first input and the second input not moved in directions $D_1$ or $D_2$ into the threshold area "$A_3$" or the threshold area "$A_4$", then at 1840, the method 1800 includes determining whether the first input and the second input leaves the surface of the screen 102 in directions $D_3$ or $D_4$ but within a hover detection limit.

If it is determined, at operation 1840, that the first input and the second input do not leave the surface of the screen 102, then at operation 1842, the method 1800 includes computing the distance moved from the initial touch location to the current touch location for the first input, the second input, $S_L$, $S_R$ in direction $D_5$ or $D_6$. If it is determined, at operation 1844, that the minimum of $S_L$ and $S_R$ is not greater than $S_M$, then the method 1800 is looped back to operation 1828 as described above. If it is determined, at operation 1844, that the minimum of $S_L$ and $S_R$ is greater than $S_M$, then at operation 1846, the method 1800 includes detecting the start of the lift gesture performed by the user. If it is determined, at operation 1840, that the first input and the second input leaves the surface of the screen 102 in directions $D_3$ or $D_4$ but within the hover detection limit, then operation 1846 is performed as described above.

At operation 1848, the method 1800 includes detecting the lift gesture performed by the user (i.e., refers to state $S_3$). At operation 1850, the method 1800 includes computing the distance moved from the initial hover or touch location to the current hover or touch location for the first input (i.e., first hover or touch input), the second input (i.e., second hover or touch input), $S_L$, $S_R$ in direction $D_5$ or $D_6$. At operation 1852, the method 1800 includes determining output as the maximum of $S_L$, $S_R$, and selected region bounds. If it is determined, at operation 1854, that the first input or the second input are removed, then the method 1800 is looped back to operation 1802 as described above. If it is determined, at operation 1854, that the first input or the second input are not removed, then at operation 1856, the method 1800 includes determining whether the hover gesture performed by the user is removed. If it is determined, at operation 1856, that the hover gesture performed by the user is removed, then at operation 1858, the method 1800 includes detecting dual touch inputs in the threshold area "$A_1$" and the threshold area "$A_2$". At operation 1860, the method 1800 includes computing the distance moved from initial touch location to the current touch location for the first input, the second input, $S_L$, $S_R$, in direction opposite to $D_1$ or $D_2$.

If it is determined, at operation 1856, that the hover gesture performed by the user is not removed, then the method 1800 performs operation 1860 as described above. If it is determined, at operation 1862, that the minimum of $S_L$, $S_R$ is not greater than $S_S$, then the method 1800 is looped back to operation 1860 as described above. If it is determined, at operation 1862, that the minimum of $S_L$, $S_R$ is greater than $S_S$, then at operation 1864, the method 1800 includes detecting the output end of the drop gesture and looped back to operation 1802 as described above.

The various actions, acts, blocks, operations, or the like in the method 1800 may be performed in the order presented, in a different order or simultaneously. Further, in various embodiments of the present disclosure, some of the actions, acts, blocks, operations, or the like may be omitted, added, modified, skipped, or the like without departing from the scope of the disclosure.

Figure 19A:
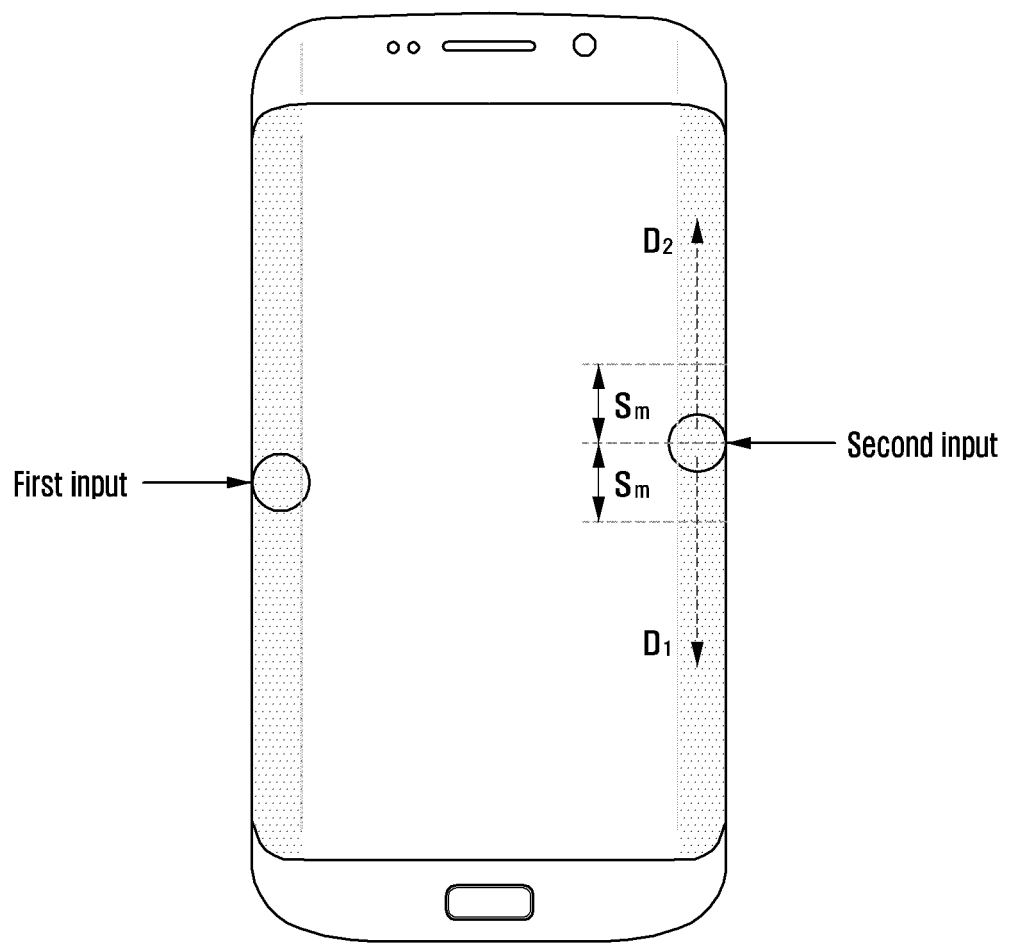
FIGS. 19A and 19B illustrate an electronic device with parameters defined to detect the long press hold gesture on the first edge and a vertical swipe gesture on the second edge, according to various embodiments of the present disclosure.
Figure 19B:
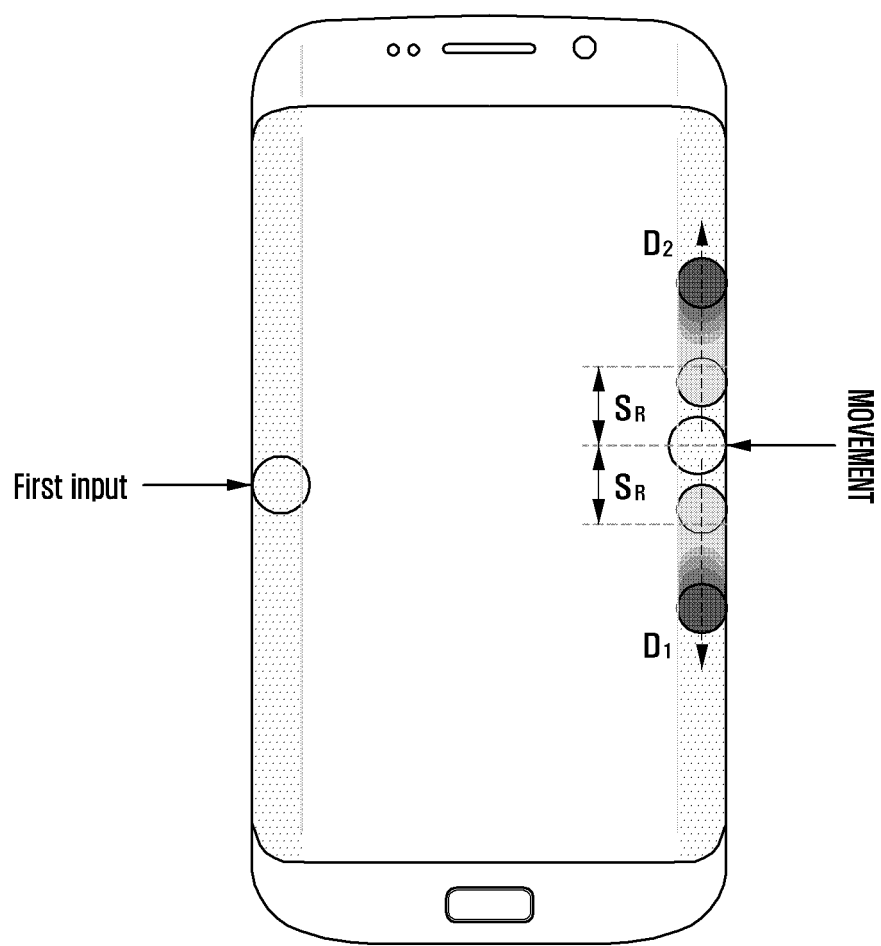
Figure 20A:
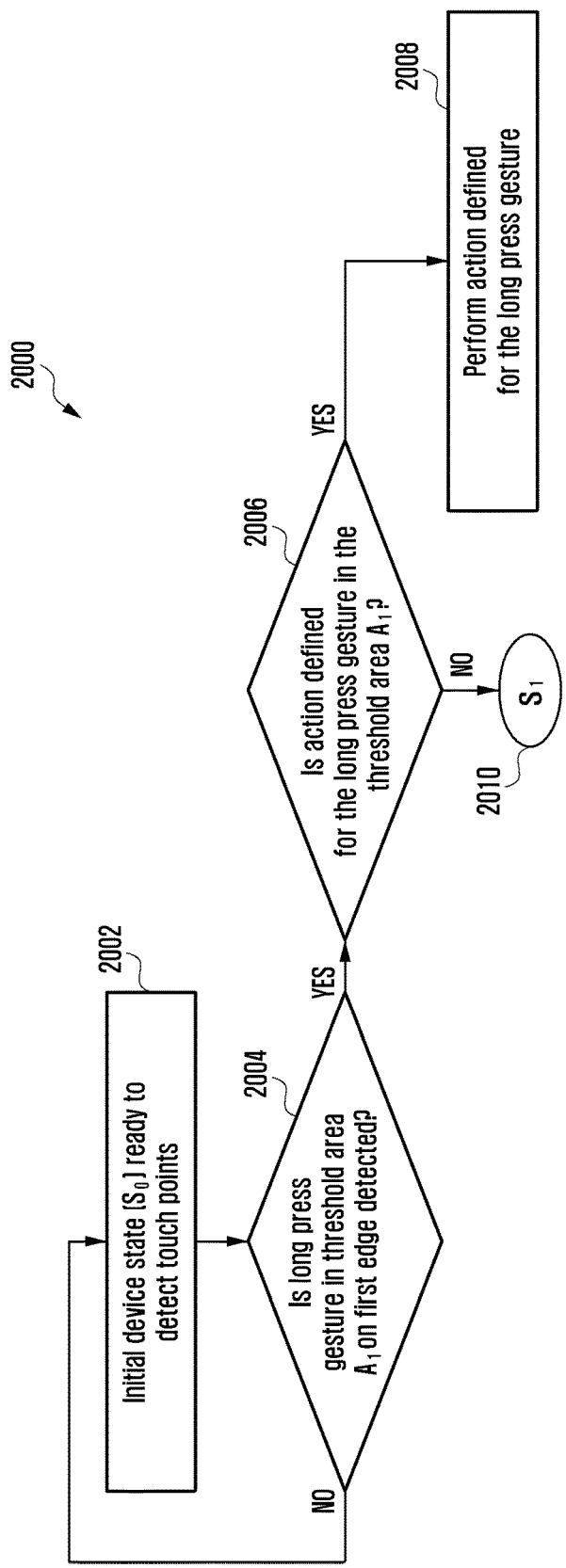
FIGS. 20A, 20B, 20C, and 20D are flow charts illustrating a method for performing the action in the electronic device based on the long press gesture performed on the first edge and the vertical swipe gesture performed on the second edge, according to various embodiments of the present disclosure.
Figure 20B:
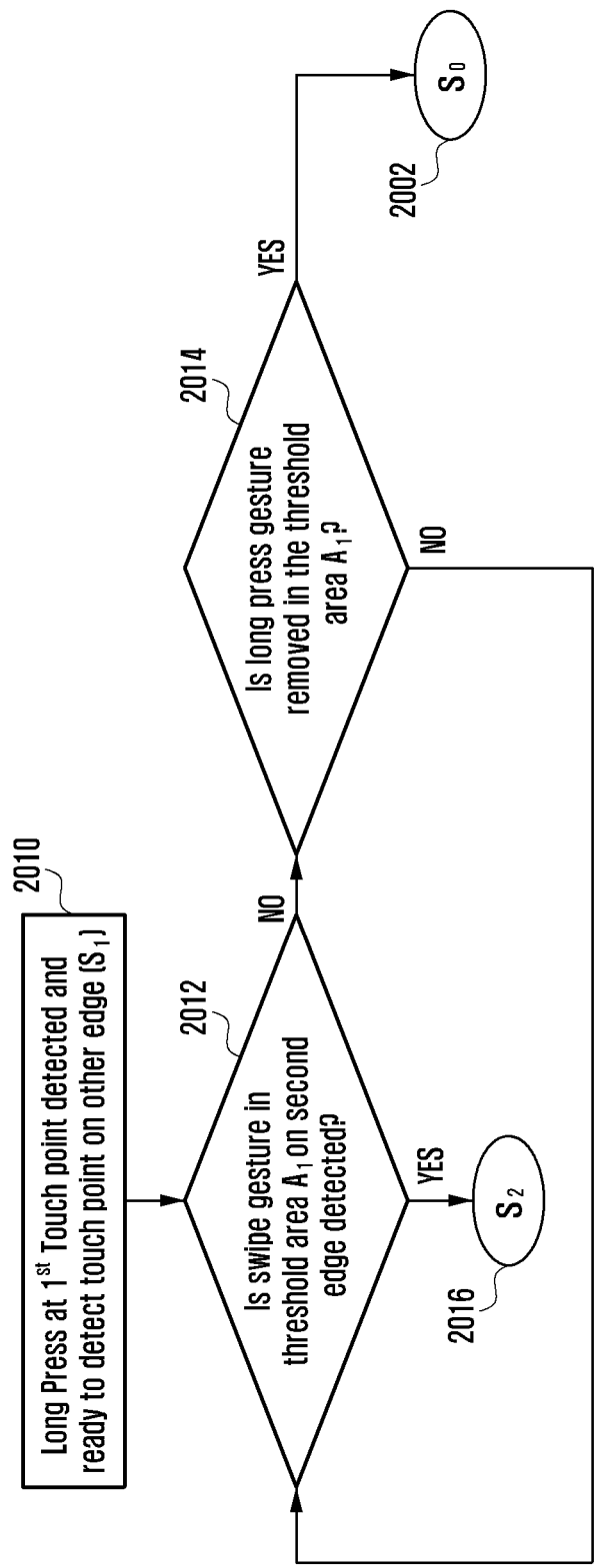
Figure 20C:
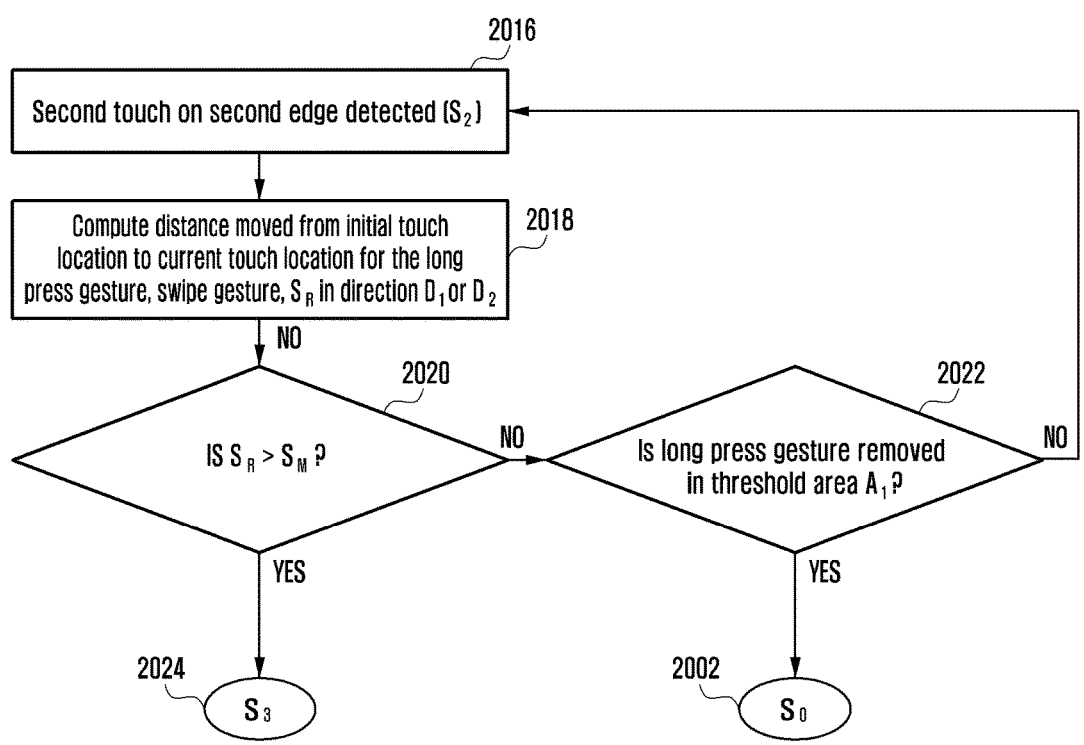
Figure 20D:
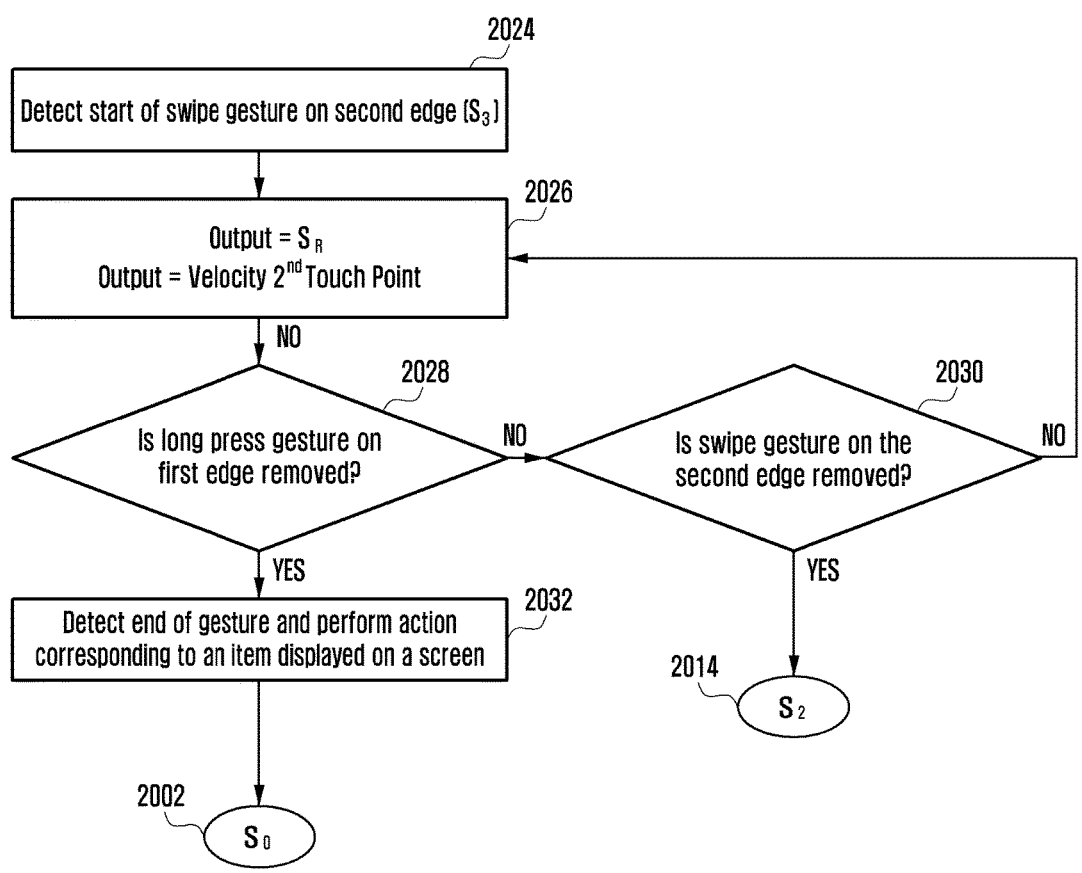

FIGS. 19A and 19B illustrate an electronic device 100 with parameters defined to detect the long press hold gesture on the first edge 104 and a vertical swipe gesture on the second edge 106, according to various embodiments of the present disclosure. In an embodiment of the present disclosure, the electronic device 100 includes the area to detect the long press hold gesture on the first edge 104 and the vertical swipe gesture on the second edge 106 (i.e., collectively known as gesture performed by the user). The long press hold gesture on the first edge 104 and the vertical swipe gesture on the second edge 106 is defined based on the parameters such as $D_1$, $D_2$, $S_M$, $S_R$, $S_0$, $S_1$, $S_2$, $S_3$, $T_0$, $A_{OUT}$, $S_0$, $S_1$, and $S_2$. Where, Referring to FIGS. 19A and 19B, $D_1$: Refers to a direction vector for a swipe down gesture $D_2$: Refers to a direction vector for a swipe up gesture $S_M$: Refers to a minimum distance to detect the swipe gesture and to reject any false triggers.

$S_R$: Refers to a distance moved by "MOVEMENT" during the swipe gesture.

$S_0$: Refers to an initial state of the electronic device 100 ready to detect touch inputs (i.e., first input and the second input) performed on the first edge 104 and the second edge 106 of the screen 102.

$S_1$: Refers to a state where the electronic device 100 detects the long press hold gesture as the first input on the first edge 104 and ready to detect the swipe gesture as the second input on the second edge 106.

$S_2$: Refers to a state where the electronic device 100 detects the second input on the second edge 106.

$S_3$: Refers to a state where the electronic device 100 detects the start of the swipe gesture on the second edge 106.

FIGS. 20A to 20D are flow charts illustrating a method 2000 for performing the action in the electronic device 100 based on a long press gesture performed on the first edge 104 and a vertical swipe gesture performed on the second edge 106, according to various embodiments of the present disclosure.

Referring to FIGS. 20A to 20D, the sequence of operations can be performed inside the electronic device 100 by using the microcontroller, the microprocessor, the control unit 206 or any computer readable storage medium.

At operation 2002, the method 2000 indicates the initial state ($S_0$) of the electronic device 100 ready to detect the touch inputs (i.e., long press gesture as the first input and the vertical swipe gesture as the second input). If it is determined, at operation 2004, that the long press gesture in the threshold area "$A_1$" on the first edge 104 is not detected, then the method 2000 is looped back to operation 2002 as described above. If it is determined, at operation 2004, that the long press gesture in the threshold area "$A_1$" on the first edge 104 is detected, then at operation 2006, the method 2000 includes determining whether the action is defined for the long press gesture in the threshold area "$A_1$".

If it is determined, at operation 2006, that the action is defined for the long press gesture in the threshold area "$A_1$", then at operation 2008, the method 2000 includes performing the action defined for the long press gesture.

If it is determined, at operation 2006, that the action is not defined for the long press gesture in the threshold area "$A_1$", then at operation 2010, the method 2000 includes detecting the long press gesture as the first input on the first edge 104 and ready to detect the swipe gesture on the second edge 106 on the screen 102 (i.e., refers to the state "$S_1$"). If it is determined, at operation 2012, that the swipe gesture in the threshold area "$A_1$" on the second edge 106 is not detected, then at operation 2014, the method 2000 includes determining whether the long press gesture is removed in the threshold area "$A_1$". If it is determined, at operation 2014, that the long press gesture is removed in the threshold area $A_1$, then the method 2000 is looped back to operation 2002 as described above. If it is determined, at operation 2014, that the long press gesture is not removed in the threshold area $A_1$, then the method 2000 is looped back to operation 2012 as describe above.

If it is determined, at operation 2012, that the swipe gesture in the threshold area "$A_1$" on the second edge 106 is detected, then at operation 2016, the method 2000 includes detecting the swipe gesture on the second edge 106 on the screen 102 (i.e., refers to the state "$S_2$" of the electronic device 100). After detecting the long press gesture and the swipe gesture (i.e., collectively known as the specific type of gesture), the electronic device 100 is ready to detect the start of the gesture and the below described operations are performed.

At operation 2018, the method 2000 includes computing the distance moved from the initial touch location to the current touch location for the long press gesture, swipe gesture, $S_R$ in direction of $D_1$ or $D_2$. If it is determined, at operation 2020, that the $S_R$ is not greater than $S_M$, then at operation 2022, the method 2000 includes determining whether the long press gesture on the first edge 104 is removed in the threshold area "$A_1$". If it is determined, at operation 2022, that the long press gesture is removed in the threshold area "$A_1$", then the method 2000 is looped back to operation 2002 as described above. If it is determined, at operation 2022, that the long press gesture is not removed in the threshold area "$A_1$", then the method 2000 is looped back to operation 2016 as described above. At operation 2020, if it is determined that the $S_R$ is greater than $S_M$, then at operation 2024, the method 2000 includes detecting the start of the swipe gesture on the second edge 106 (i.e., refers to the state $S_3$ of the electronic device 100).

After detecting the start of the swipe gesture on the second edge 106, at operation 2026, the method 2000 includes determining the $S_R$ and the velocity of the swipe gesture on the second edge 106. If it is determined, at operation 2028, that the long press gesture on the first edge 104 is not removed, then at operation 2030, the method 2000 includes determining whether the swipe gesture on the second edge 106 is removed. If it is determined, at operation 2030, that the swipe gesture on the second edge 106 is removed, then the method 2000 is looped back to operation 2014 as described above. If it is determined, at operation 2030, that the swipe gesture on the second edge 106 is not removed, then the method 2000 is looped back to operation 2026 as described above. If it is determined, at operation 2028, that the long press gesture is removed, then at operation 2032, the method 2000 includes detecting the end of the gesture, thus allowing the electronic device 100 to perform the action corresponding to the item currently displayed on the screen 102 and looped back to operation 2002 as described above.

The various actions, acts, blocks, operations, or the like in the method 2000 may be performed in the order presented, in a different order or simultaneously. Further, in various embodiments of the present disclosure, some of the actions, acts, blocks, operations, or the like may be omitted, added, modified, skipped, or the like without departing from the scope of the disclosure.

Figure 21:
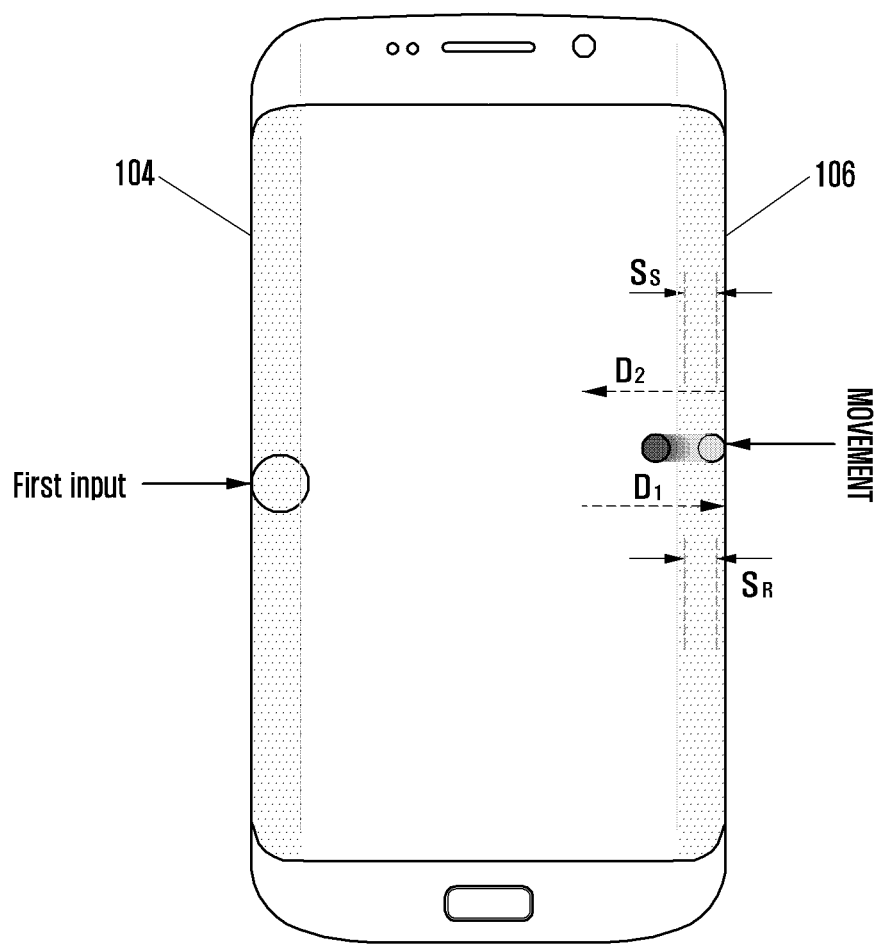
FIG. 21 illustrates an electronic device with parameters defined to detect the long press gesture on the first edge and the horizontal swipe gesture on the second edge, according to various embodiments of the present disclosure.

FIG. 21 illustrates an electronic device 100 with parameters defined to detect a long press gesture on the first edge 104 and a horizontal swipe gesture on the second edge 106, according to various embodiments of the present disclosure. In an embodiment of the present disclosure, the electronic device 100 includes the area to detect the long press gesture on the first edge 104 and the horizontal swipe gesture on the second edge 106. The long press gesture on the first edge 104 and the horizontal swipe gesture on the second edge 106 are defined based on the parameters such as $D_1$, $D_2$, $S_S$, $S_R$, $S_0$, $S_1$, and $S_2$. Where, Referring to FIG. 21, $D_1$: Refers to a direction vector for the swipe gesture from the first edge 104 to the second edge 106

$D_2$: Refers to a direction vector for the swipe gesture from the second edge 106 to the first edge 104.

$S_S$: Refers to a minimum distance for detecting the swipe gesture and to reject any false triggers.

$S_R$: Refers to a distance moved by "MOVEMENT" during the swipe gesture in $D_1$ or $D_2$ direction $S_0$: Refers to an initial state of the electronic device 100 ready to detect touch inputs (i.e., first input and the second input) performed on the first edge 104 and the second edge 106 of the screen 102.

$S_1$: Refers to a state where the electronic device 100 detects the long press gesture as the first input on the first edge 104 and ready to detect the swipe gesture as the second input on the second edge 106.

$S_2$: Refers to a state where the electronic device 100 detects the swipe gesture on the second edge 106.

Figure 22A:
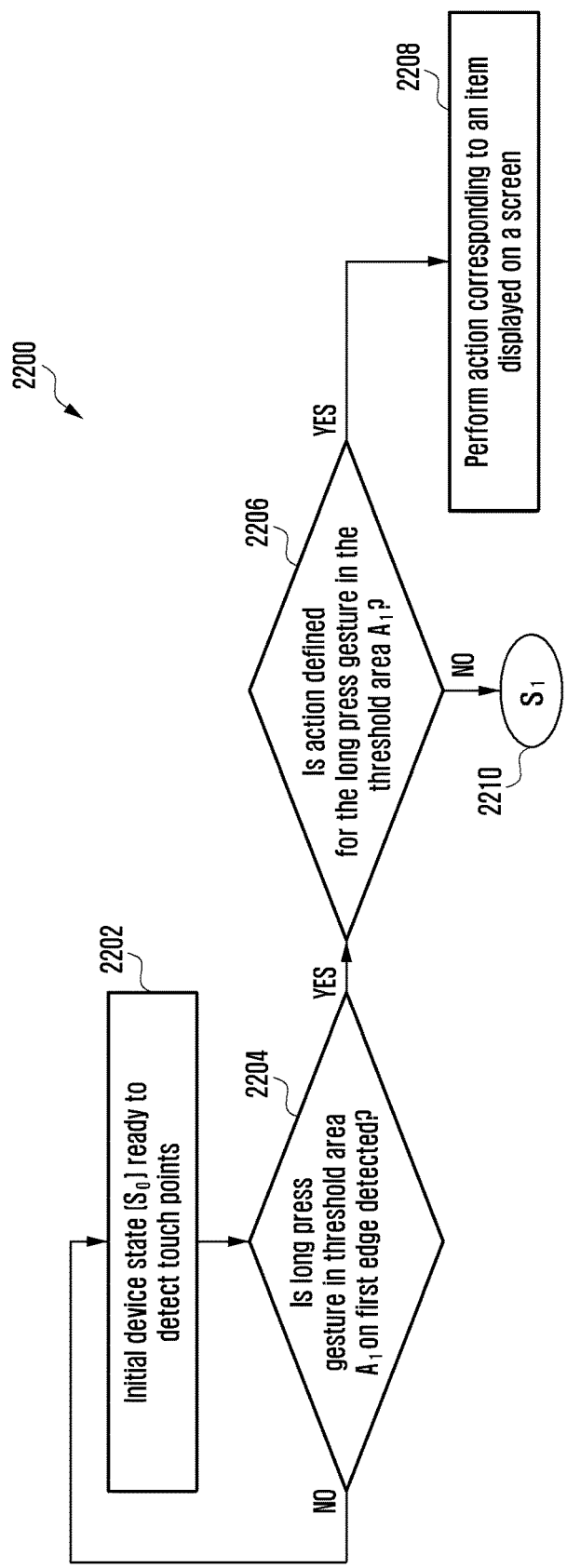
FIGS. 22A, 22B, and 22C are flow charts illustrating a method for performing the action in the electronic device based on the long press gesture performed on the first edge and the horizontal swipe gesture performed on the second edge, according to various embodiments of the present disclosure.
Figure 22B:
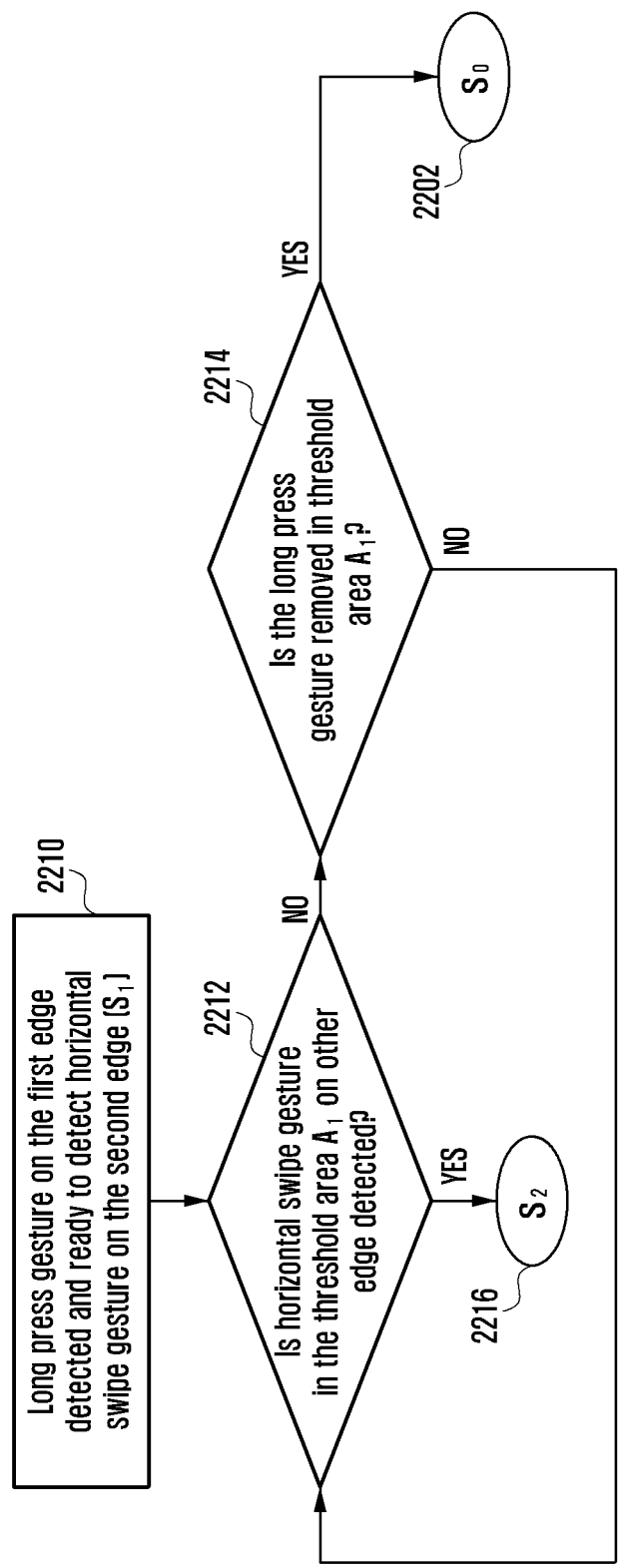
Figure 22C:
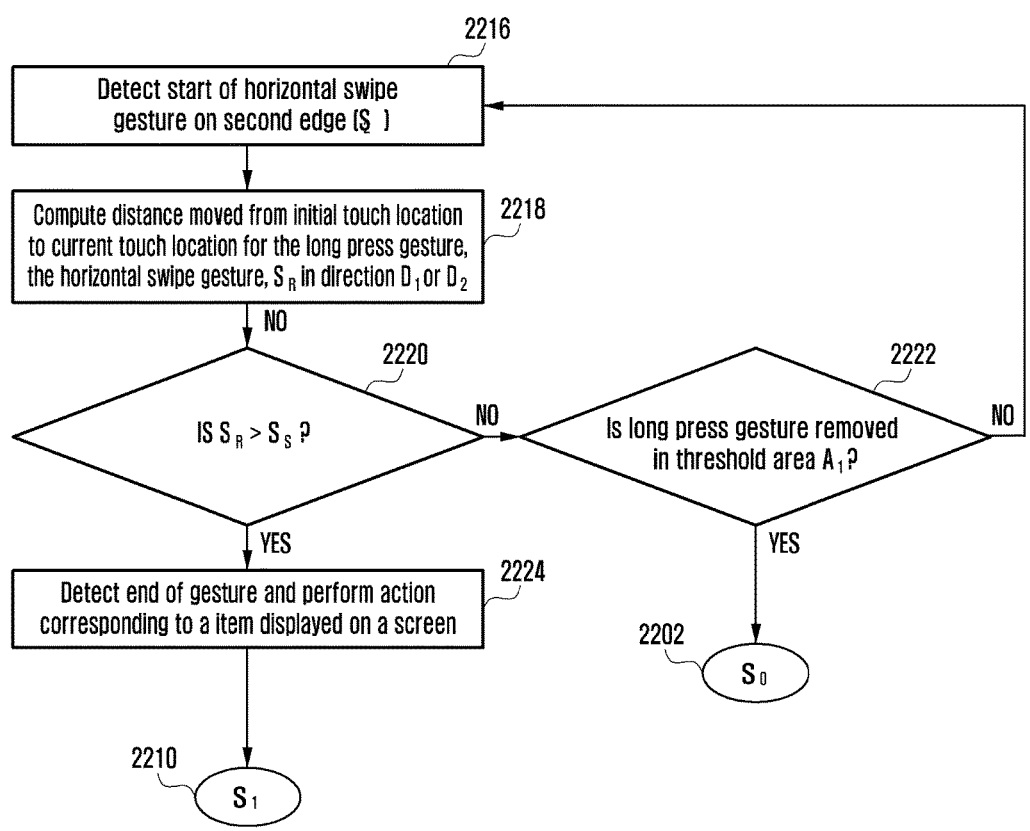

FIGS. 22A, 22B and 22C are flowcharts illustrating a method 2200 for performing the action in the electronic device 100 based on the long press gesture performed on the first edge 104 and the horizontal swipe gesture performed on the second edge 106, according to various embodiments of the present disclosure.

Referring to FIGS. 22A to 22C, the sequence of operations can be performed inside the electronic device 100 by using the microcontroller, the microprocessor, the control unit 206 or any computer readable storage medium.

At operation 2202, the method 2000 indicates the initial state ($S_0$) of the electronic device 100 ready to detect the touch inputs (i.e., long press gesture as the first input and the horizontal swipe gesture as the second input). If it is determined, at operation 2204, that the long press gesture in the threshold area "$A_1$" on the first edge 104 is not detected, then the method 2200 is looped back to operation 2202 as described above. If it is determined, at operation 2204, that the long press gesture in the threshold area "$A_1$" on the first edge 104 is detected, then at operation 2206, the method 2200 includes determining whether the action defined for the long press gesture in the threshold area "$A_1$". If it is determined, at operation 2206, that the action is defined for the long press gesture in the threshold area "$A_1$", then at operation 2208, the method 2200 includes performing the action corresponding to the item displayed on the screen 102. If it is determined, at operation 2206, that the action is not defined for the long press gesture in the threshold area "$A_1$", then at operation 2210, the method 2200 includes detecting the long press gesture on the first edge 104 and ready to detect the horizontal swipe gesture on the second edge 106 (i.e., refers to the state "$S_1$" of the electronic device 100).

If it is determined, at operation 2212, that the horizontal swipe gesture in the threshold area "$A_1$" on the second edge 106 is not detected, then at operation 2214, the method 2200 includes determining whether the long press gesture in the threshold area "$A_1$" is removed. If it is determined, at operation 2214, that the long press gesture in the threshold area "$A_1$" is removed, then the method 2200 is looped back to operation 2202 as described above. If it is determined, at operation 2214, that the long press gesture in the threshold area "$A_1$" is not removed, then the method 2200 is looped back to operation 2212 as described above. If it is determined, at operation 2212, that the horizontal swipe gesture in the threshold area "$A_1$" on the second edge 106 is detected, then at operation 2216, the method 2200 includes detecting the start of the horizontal swipe gesture on the second edge 106 (i.e., refers to the state $S_2$ of the electronic device 100). At operation 2218, the method 2200 includes computing the distance moved from the initial touch location to the current touch location for the long press gesture, the horizontal swipe gesture, and $S_R$ in direction of $D_1$ or $D_2$.

If it is determined, at operation 2220, that $S_R$ is not greater than $S_S$, then at operation 2222, the method 2200 includes determining whether the long press gesture is removed in the threshold area "$A_1$". If it is determined, at operation 2222, that the long press gesture is removed in the threshold area "$A_1$", then the method 2200 is looped back to operation 2202 as described above. If it determined, at operation 2222, that the long press gesture is not removed in the threshold area "$A_1$", then the method 2200 is looped back to operation 2216 as described above. If it is determined, at operation 2220, that $S_R$ is greater than $S_S$, then at operation 2224, the method 2200 includes detecting the end of the gesture, thus allowing the electronic device 100 to perform the action corresponding to the item displayed on the screen 102 and is looped back to operation 2202 as described above.

The various actions, acts, blocks, operations, or the like in the method 2200 may be performed in the order presented, in a different order or simultaneously. Further, in various embodiments of the present disclosure, some of the actions, acts, blocks, operations, or the like may be omitted, added, modified, skipped, or the like without departing from the scope of the disclosure.

Figure 23:
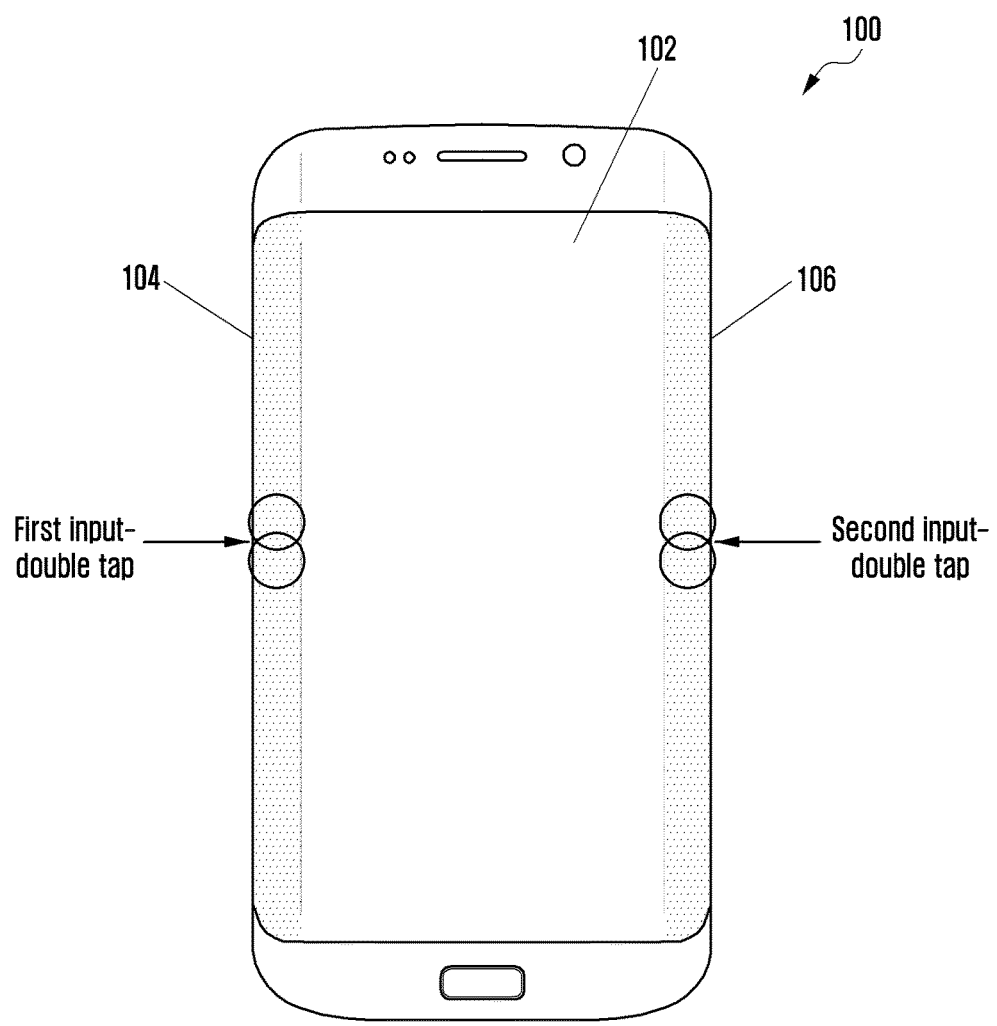
FIG. 23 illustrates an example for triggering near field communication (NFC) capability based on double tap performed simultaneously on the first edge and the second edge, according to various embodiments of the present disclosure.

FIG. 23 illustrates an example for triggering NFC capability based on double tap gesture performed on the first edge 104 and the second edge 106, according to various embodiments of the present disclosure.

Referring to FIG. 23, consider a scenario, where the user needs to trigger the NFC capability for the electronic device 100 to establish a communication session with another electronic device. The user may perform the double tap gesture on the first edge 104 and the second edge 106 on the screen 102 as shown in the FIG. 23. Based on the double tap gesture, the electronic device 100 triggers the NFC capability to establish the communication session with another electronic device.

Figure 24A:
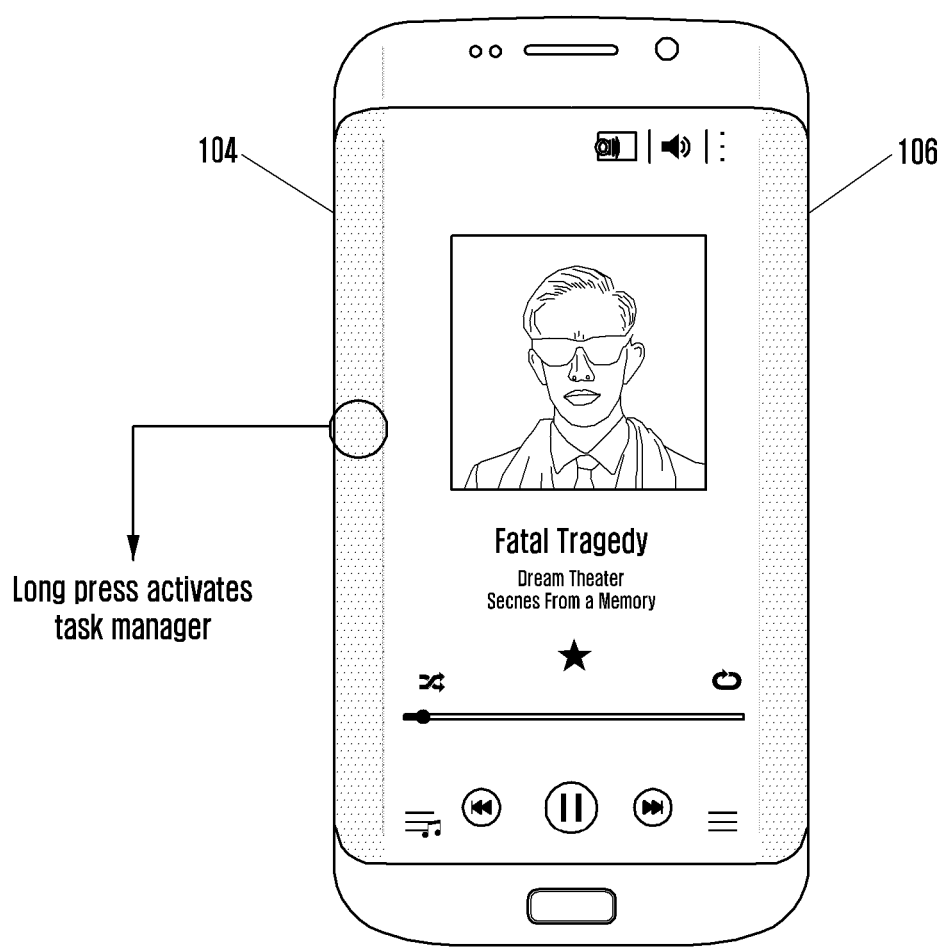
FIGS. 24A, 24B, and 24C illustrate another example for activating task manager based on a long press gesture performed on the first edge and the horizontal swipe gesture performed on the second edge, according to various embodiments of the present disclosure.
Figure 24B:
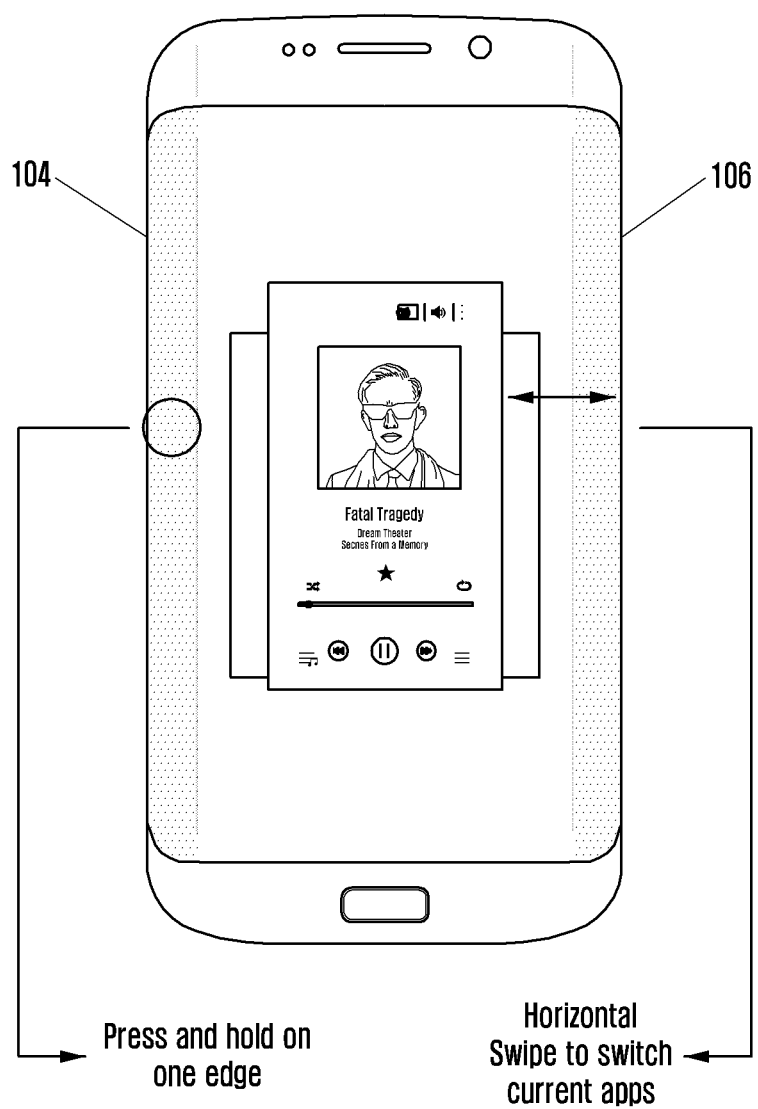
Figure 24C:
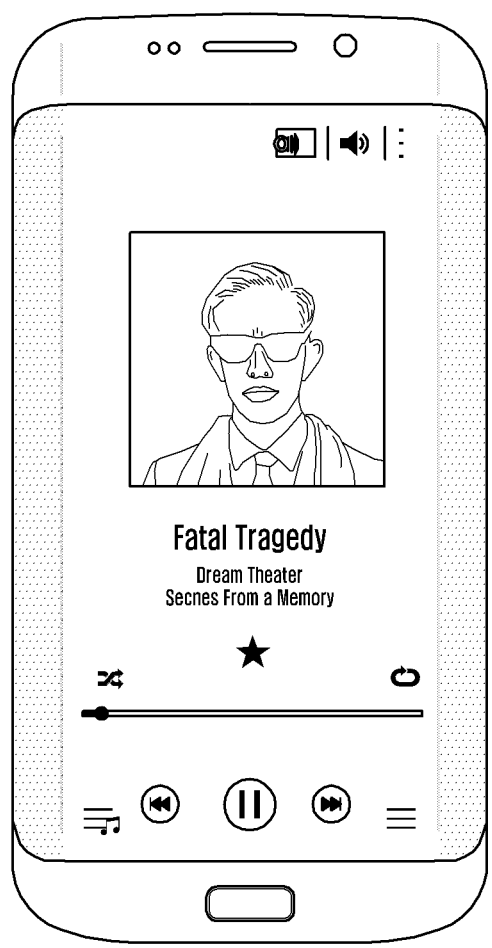

FIGS. 24A to 24C illustrate an example for activating task manager based on a long press gesture performed on the first edge 104 and a horizontal swipe gesture on the second edge 106, according to various embodiments of the present disclosure.

Referring to FIGS. 24A to 24C, consider a scenario, where the user needs to activate the task manager. The user may perform the long press gesture on the first edge 104 as shown in the FIG. 24A and the horizontal swipe gesture across the second edge 106 as shown in the FIG. 24B. After detecting the long press gesture, the electronic device 100 activates the task manager. Further, after detecting the horizontal swipe gesture, the electronic device 100 switches the active application windows. Further, after detecting that the long press gesture on the first edge 104 is removed, the electronic device 100 exit the task manager as shown in the FIG. 24C.

Figure 25A:
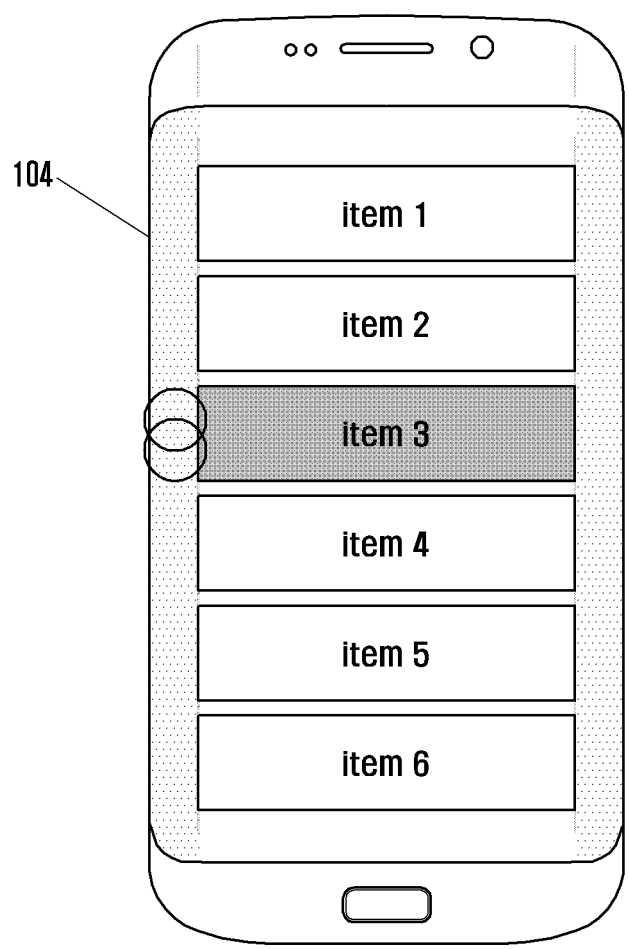
FIGS. 25A, 25B, and 25C illustrate another example for moving an object from one location to another location based on the long press gesture performed on the first edge and the vertical swipe gesture performed on the second edge, according to various embodiments of the present disclosure.
Figure 25B:
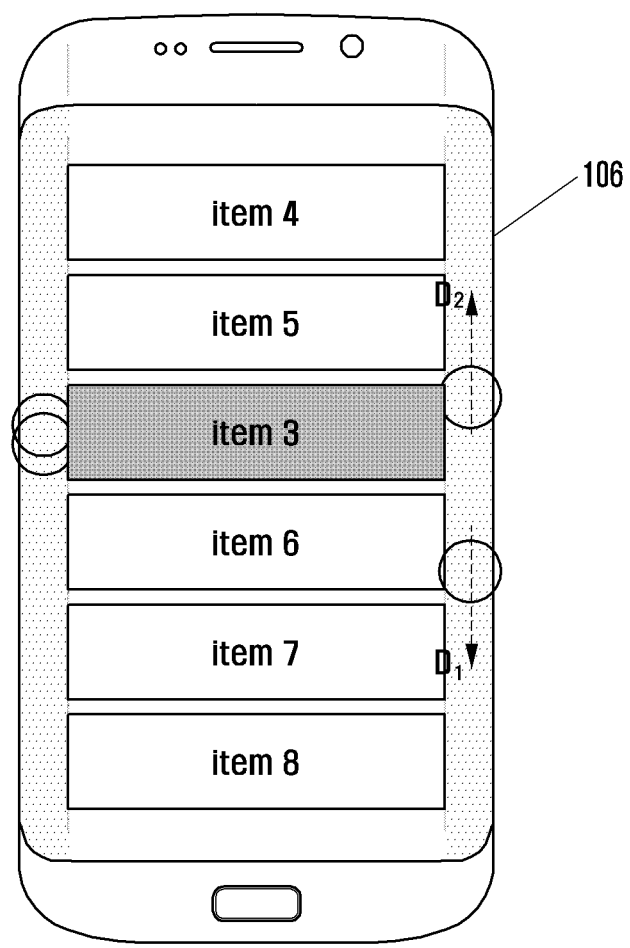
Figure 25C:
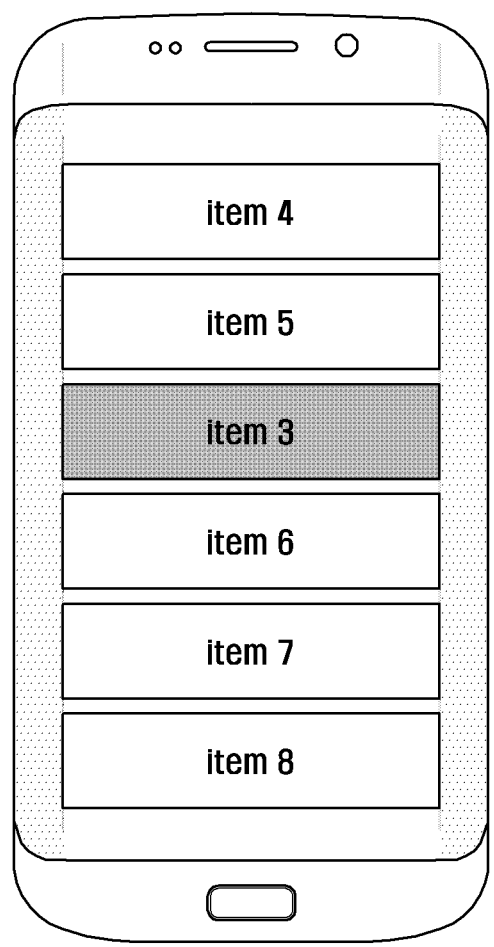

FIGS. 25A to 25C illustrate another example for moving an object from one location to another location based on the long press gesture performed on the first edge 104 and the vertical swipe gesture performed on the second edge 106, according to various embodiments of the present disclosure.

Referring to FIGS. 25A to 25C, consider a scenario, where the user needs to move the item-3 at a third location to a sixth location among the list of items. The user may perform the long press gesture in the threshold area "$A_1$" on the first edge 104 in front of the item-3 as shown in the FIG. 25A. Simultaneously with the long press gesture or within a predetermined time after performing the long press gesture, the user may perform the vertical swipe gesture in the threshold area ($A_2$) on the second edge 106 starting from the front of the long press gesture for scrolling all other items in the list up or down based on the direction of the swipe gesture as shown in the FIG. 25B. After detecting that the long press gesture on the first edge 104 is removed, then the electronic device 100 moves (i.e., drops) the item-3 to the sixth location (i.e., after item-5) as shown in the FIG. 25C.

Figure 26A:
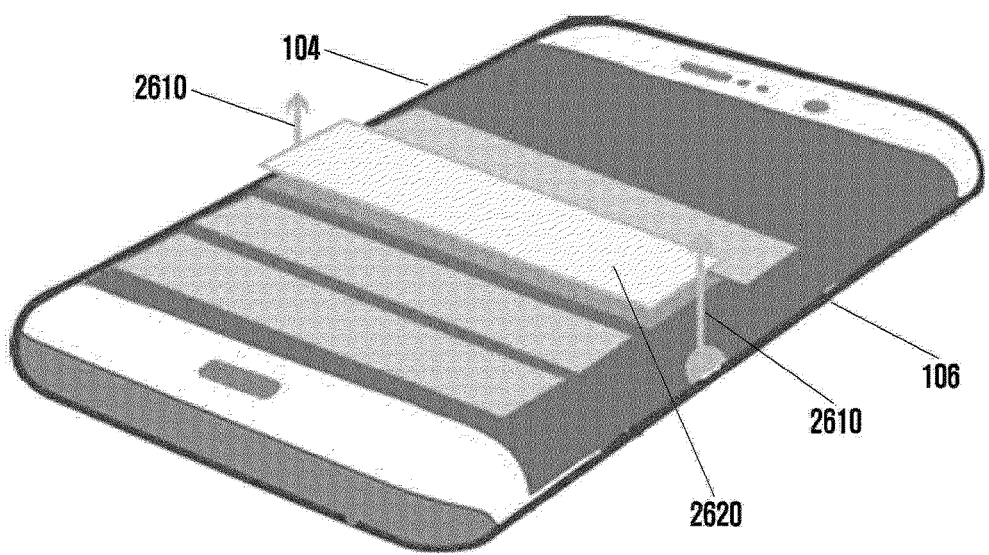
FIGS. 26A and 26B illustrates another example for moving an object based on a gesture performed on the first edge and the second edge, according to various embodiments of the present disclosure.
Figure 26B:
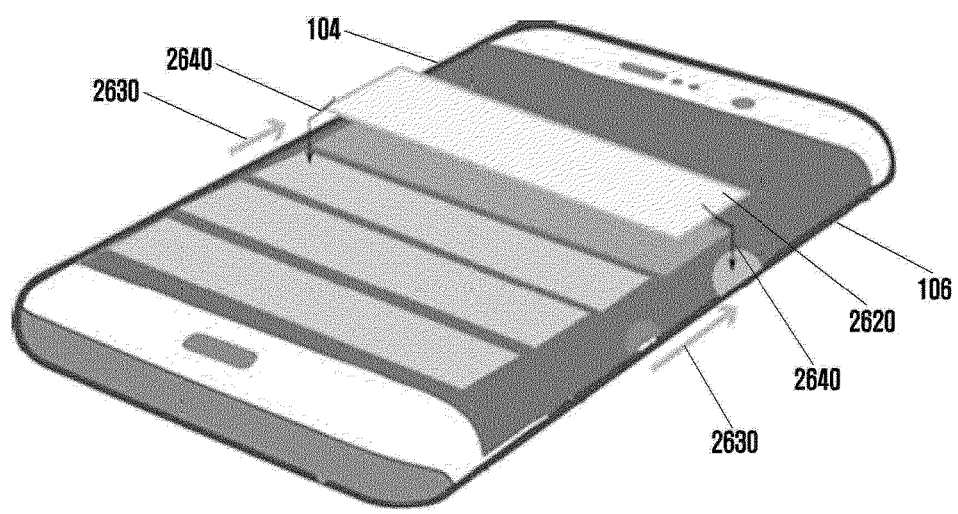

FIGS. 26A and 26B illustrate another example for moving an object based on a gesture performed on the first edge 104 and the second edge 106, according to various embodiments of the present disclosure. The user may perform a gesture originated from the first edge 104 and the second edge 106 to select the object. The gesture performed by the user may be equivalent to a movement in a Z-axial direction because of the curved edges of the electronic device 100.

Referring to FIG. 26A, according to an embodiment of the present disclosure, the user may perform a lift gesture 2610 from the first edge 104 and the second edge 106 to select an object 2620 as shown in the FIG. 26A. The electronic device 100 may select one of displayed objects adjacent to the lift gesture 2610. The electronic device 100 may display visual effects like lifting the selected object 2620 in an upward (Z-axial) direction. Further, longer the movement distance (for example, referring back to FIG. 17E, a distance in directions D3 and D4), the electronic device 100 may display visual effects like raising the selected object 2620 higher. Additionally or alternatively, the electronic device 100 may provide visual effects as that an attribute (for example, color, transparency or size) of the selected object 2620 is varied according to the movement distance.

According to an embodiment of the present disclosure, the user may perform a squeeze gesture from the first edge 104 and the second edge 106 to select an object. In response to detecting the squeeze gesture, the electronic device 100 may display visual effects like lifting the selected object in an upward (Z-axial) direction. Further, longer the movement distance (for example, referring back to FIG. 17C, $S_R$ and $S_L$), the electronic device 100 may display visual effects like raising the selected object 2620 higher or changing an attribute (for example, color, transparency or size) of the selected object.

According to an embodiment of the present disclosure, the user may perform a long press gesture from the first edge 104 and the second edge 106 to select an object. In response to detecting the long press gesture, the electronic device 100 may display visual effects like lifting the selected object in an upward (Z-axial) direction. Further, various effects may be provided according to a holding time or dimensions of the long press gesture. For example, the larger the dimensions (for example, a touch area becomes wider according to the user pressing strongly both edges with the user's fingers), the electronic device 100 may display visual effects like raising the selected object 2620 higher. Additionally or alternatively, the electronic device 100 may provide visual effects as that an attribute (for example, color, transparency or size) of the selected object is varied according to the holding time or the dimensions.

Further, the user may perform a hover gesture (or a swipe gesture) 2630 along the first edge 104 and the second edge 106. The electronic device 100 may move the selected object along the moving direction of the gesture 2630.

Subsequently, the user may perform a drop gesture 2640 from the screen 102 towards the first edge 104 and the second edge 106 to drop the selected object 2620 into a desired location as shown in the FIG. 26B. If detecting the drop gesture 2640, the electronic device may provide visual effects like falling the selected object 2620.

Figure 27A:
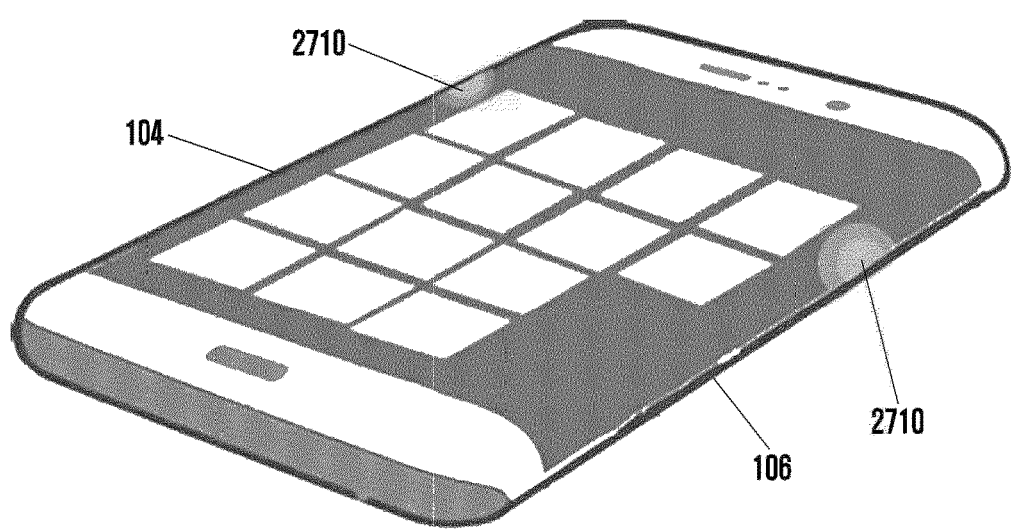
FIGS. 27A and 27B illustrate an example for selecting a plurality of objects, according to various embodiments of the present disclosure.
Figure 27B:
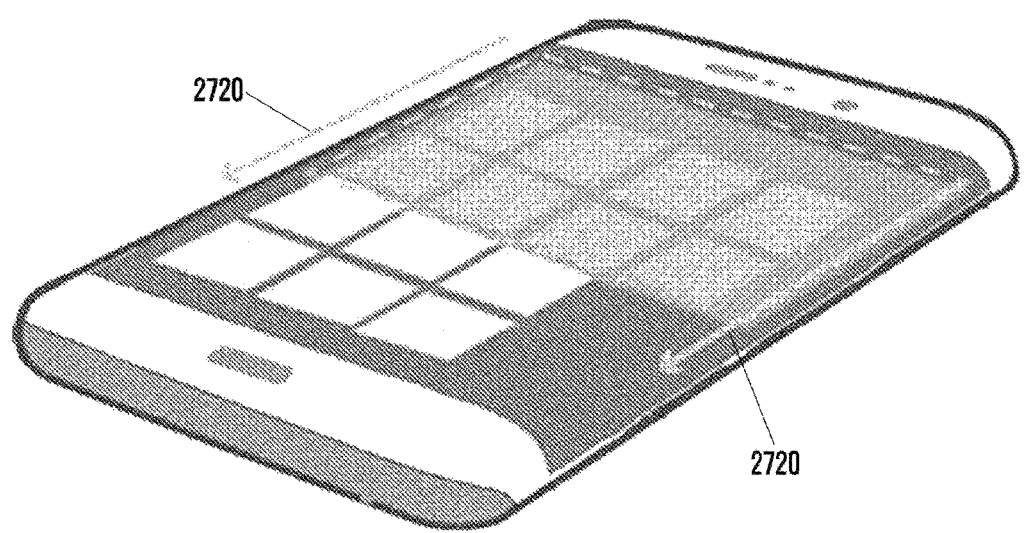

FIGS. 27A and 27B illustrate an example for selecting a plurality of objects, according to various embodiments of the present disclosure.

Referring to FIGS. 27A and 27B, the user may perform a long press gesture 2710 on the first edge 104 and the second edge 106 to invoke a selection mode of the plurality of the objects as shown in the FIG. 27A. Further, the user may perform the vertical swipe gesture 2720 (up or down) across the first edge 104 and the second edge 106 to select a plurality of the items in the area where the vertical swipe gesture 2720 is performed as shown in the FIG. 27B.

Figure 28A:
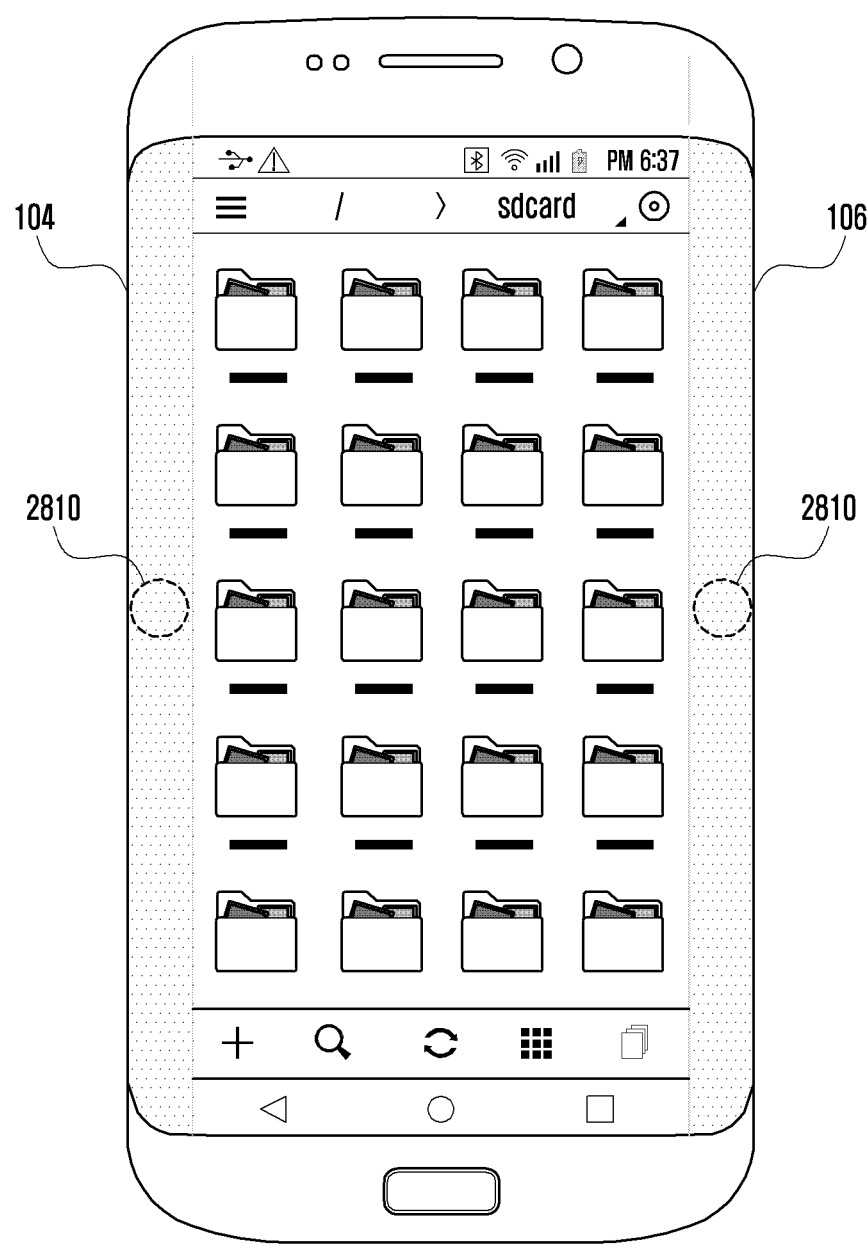
FIGS. 28A, 28B, and 28C illustrate an example for selecting and moving the plurality of objects to a new location, according to various embodiments of the present disclosure.
Figure 28B:
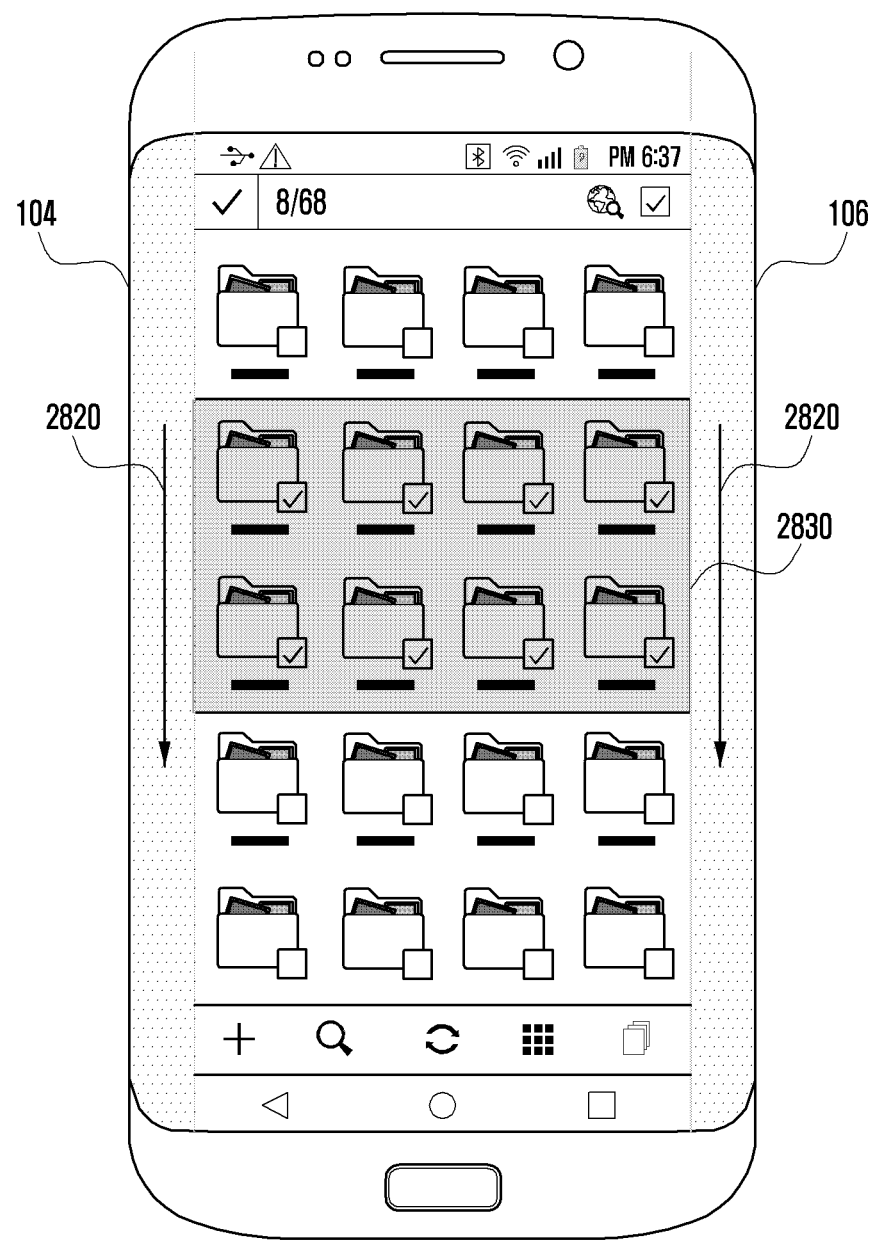
Figure 28C:
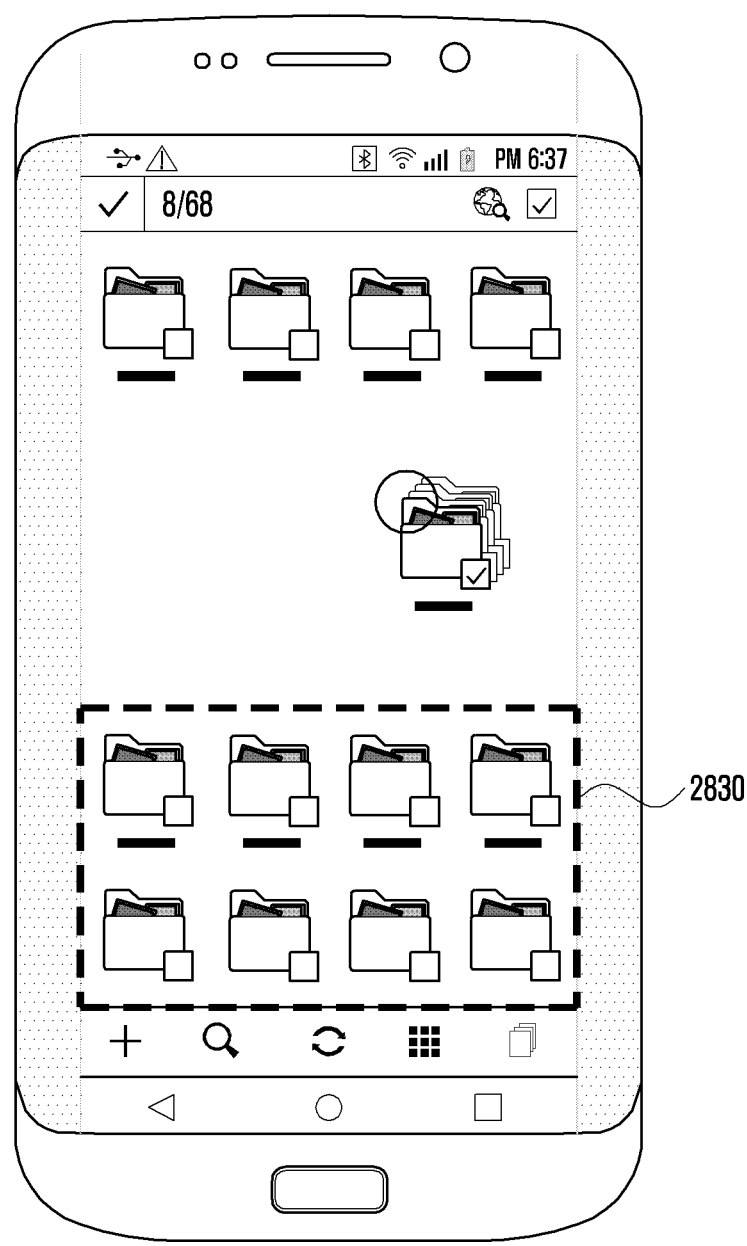

FIGS. 28A to 28C illustrate an example for selecting and moving a plurality of objects to a new location, according to various embodiments of the present disclosure.

Referring to FIGS. 28A to 28C, the user may perform a long press gesture 2810 on the first edge 104 and the second edge 106 to invoke the selection mode as shown in the FIG. 28A. Further, the user may perform a vertical swipe gesture 2820 across the first edge 104 and the second edge 106 so that at least one item 2830 is selected in an area where the vertical swipe gesture 2820 is performed as shown in the FIG. 28B. Further, the user may perform drag and drop gestures into a new location (or a new folder) so that the selected at least one item 2830 is dropped into the new location as shown in the FIG. 28C.

Although the above description is described in conjunction with the electronic device including curved edges for performing the action corresponding to the item but it is to be understood that other embodiments are not limited thereon. The proposed method and gestures described herein can also be implemented in any electronic device without departing from the scope of the disclosure. For example, the various gestures described herein can also be implemented in the electronic device(s) having edges bent at an angle (i.e., chamfered). In another example, the electronic device having a flat screen with edges defined by the logical pattern of the screen may also implement the gestures as described herein.

Figure 29:
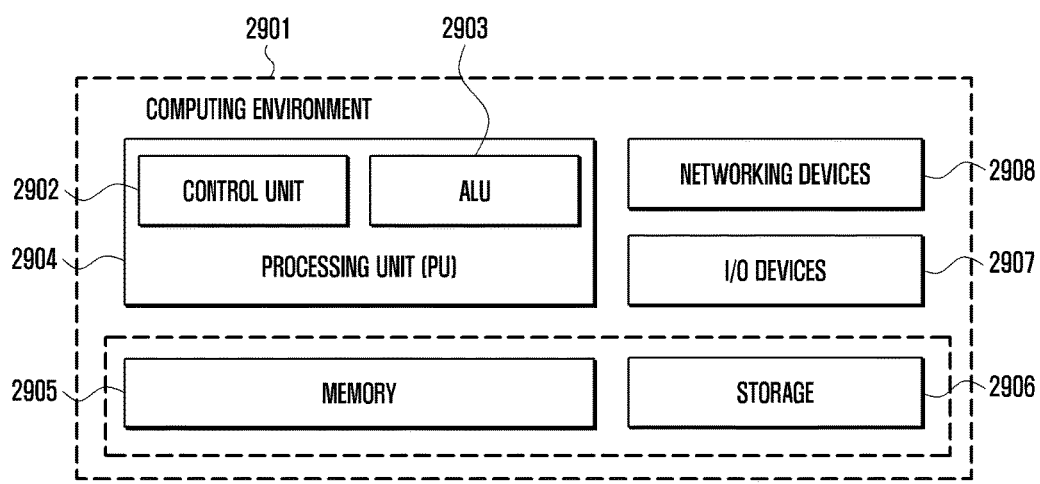
FIG. 29 illustrates a computing environment implementing the method for performing the action in the electronic device, according to various embodiments of the present disclosure.

FIG. 29 illustrates a computing environment implementing the method for performing the action in the electronic device, according to various embodiments of the present disclosure.

Referring to FIG. 29, the computing environment 2901 comprises at least one processing unit 2904 that is equipped with a control unit 2902 and an arithmetic logic unit (ALU) 2903, a memory 2905, a storage unit 2906, plurality of networking devices 2908 and a plurality input output (I/O) devices 2907. The processing unit 2904 is responsible for processing the instructions of the algorithm. The processing unit 2904 receives commands from the control unit in order to perform its processing. Further, any logical and arithmetic operations involved in the execution of the instructions are computed with the help of the ALU 2903.

The overall computing environment 2901 can be composed of multiple homogeneous or heterogeneous cores, multiple central processing units (CPUs) of different kinds, special media and other accelerators. The processing unit 2904 is responsible for processing the instructions of the algorithm. Further, the plurality of processing units 2904 may be located on a single chip or over multiple chips.

The algorithm includes instructions and codes required for the implementation are stored in either the memory unit 2905 or the storage 2906 or both. At the time of execution, the instructions may be fetched from the corresponding memory 2905 or storage 2906, and executed by the processing unit 2904.

In case of any hardware implementations various networking devices 2908 or external I/O devices 2907 may be connected to the computing environment to support the implementation through the networking unit and the I/O device unit.

Figure 30:
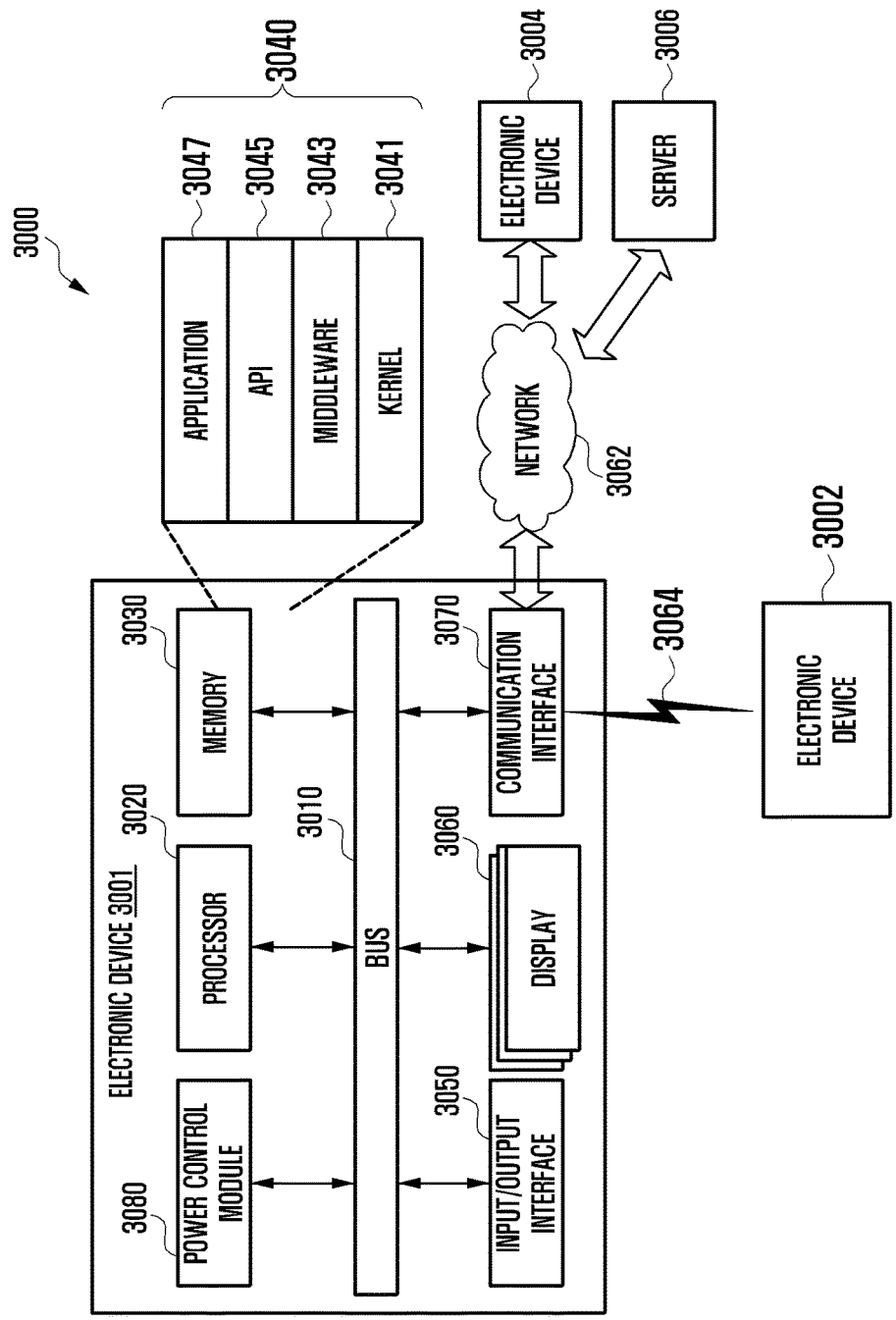
FIG. 30 illustrates a network environment 3000 including an electronic device 3001 according to various embodiments of the present disclosure.

FIG. 30 illustrates a network environment 3000 including an electronic device 3001 according to various embodiments of the present disclosure. The electronic device 3001 may configure, for example, a whole or a part of the electronic device 100 illustrated in FIGS. 1 and 2.

Referring to FIG. 30, the electronic device 3001 includes a bus 3010, a processor 3020, a memory 3030, an input/output interface 3050, a display 3060, a communication interface 3070, and a power control module 3080.

The bus 3010 may be a circuit connecting the above described components and transmitting communication (for example, a control message) between the above described components.

The processor 3020 receives commands from other components (for example, the memory 3030, the input/output interface 3050, the display 3060, the communication interface 3070, or the power control module 3080) through the bus 3010, analyzes the received commands, and executes calculation or data processing according to the analyzed commands.

The memory 3030 stores commands or data received from the processor 3020 or other components (for example, the input/output interface 3050, the display 3060, the communication interface 3070, or the power control module 3080) or generated by the processor 3020 or other components. The memory 3030 may store a software and/or a program 3040. For example, the program 3040 may include a kernel 3041, middleware 3043, an application programming interface (API) 3045, and an application program (or an application) 3047. At least part of the kernel 3041, the middleware 3043 or the API 3045 may refer to an operating system (OS).

The kernel 3041 controls or manages system resources (for example, the bus 3010, the processor 3020, or the memory 3030) used for executing an operation or function implemented by the remaining other programming modules, for example, the middleware 3043, the API 3045, or the application 3047. Further, the kernel 3041 provides an interface for accessing individual components of the electronic device 3001 from the middleware 3043, the API 3045, or the application 3047 to control or manage the components.

The middleware 3043 performs a relay function of allowing the API 3045 or the application 3047 to communicate with the kernel 3041 to exchange data. Further, in operation requests received from the application 3047, the middleware 3043 performs a control for the operation requests (for example, scheduling or load balancing) by using a method of assigning a priority, by which system resources (for example, the bus 3010, the processor 3020, the memory 3030 and the like) of the electronic device 3001 can be used, to the application 3047.

The API 3045 is an interface by which the application 3047 can control a function provided by the kernel 3041 or the middleware 3043 and includes, for example, at least one interface or function (for example, command) for a file control, a window control, image processing, or a character control.

According to various embodiments of the present disclosure, the application 3047 may include a short message service (SMS)/multimedia messaging service (MMS) application, an email application, a calendar application, an alarm application, a health care application (for example, application measuring quantity of exercise or blood sugar) or an environment information application (for example, application providing information on barometric pressure, humidity or temperature). Additionally or alternatively, the application 3047 may be an application related to an information exchange between the electronic device 3001 and an external electronic device (for example, electronic device 3004). The application related to the information exchange may include, for example, a notification relay application for transferring particular information to the external electronic device or a device management application for managing the external electronic device.

For example, the notification relay application may include a function of transmitting notification information generated by another application (for example, an SMS/MMS application, an email application, a health care application or an environment information application) of the electronic device 3001 to the external electronic device (for example, electronic device 3004). Additionally or alternatively, the notification relay application may receive notification information from, for example, the external electronic device 3004 and provide the received notification information to the user. The device management application may manage (for example, install, remove, or update) at least a part of functions (for example, turning on/off the external electronic device (or some components of the external electronic device) or controlling a brightness of the display) of the external electronic device (3004 communicating with the electronic device 3001, an application executed in the external electronic device 3004, or a service (for example, call service or message service) provided by the external electronic device 3004.

According to various embodiments of the present disclosure, the application 3047 may include an application designated according to an attribute (for example, type of electronic device) of the external electronic device 3004. For example, when the external electronic device 3004 is a Moving Picture Experts Group phase 1 or phase 2 (MPEG-1 or MPEG-2) audio layer 3 (MP3) player, the application 3047 may include an application related to music reproduction. Similarly, when the external electronic device 3004 is a mobile medical device, the application 3047 may include an application related to health care. According to an embodiment of the present disclosure, the application 3047 may include at least one of an application designated to the electronic device 3001 and an application received from an external electronic device (for example, server 3006 or electronic device 3004).

The I/O interface 3050 transmits a command or data input from the user through an I/O device (for example, a sensor, a keyboard, or a touch screen) to the processor 3020, the memory 3030, the communication interface 3070, or the display control module 3070 through, for example, the bus 3010. For example, the I/O interface 3050 may provide data on a user's touch input through a touch screen to the processor 3020. Further, the I/O interface 3050 may output a command or data received, through, for example, the bus 3010, from the processor 3020, the memory 3030, the communication interface 3070, or the power control module 3080 through the I/O device (for example, a speaker or a display). For example, the I/O interface 3050 may output voice data processed through the processor 3020 to the user through the speaker.

The display 3060 may include, for example, LCD, OLED display, microelectromechanical systems (MEMS) display, or electronic paper display. The display 3060 may visually offer, for example, various contents (e.g., text, image, video, icon, symbol, etc.) to users. The display 3060 may include a touch screen and receive, for example, a touch, gesture, proximity, or hovering input using an electronic pen or a user's body. According to an embodiment of the present disclosure, the display 3060 may be one or more displays. For example, the display 3060 may be included in the electronic device 3001 or included in an external device (e.g., the electronic device 3002 or 3004) having a wired or wireless connection with the electronic device 3001, thus outputting information offered by the electronic device 3001 to users.

According to an embodiment of the present disclosure, the display 3060 may be attachable to or detachable from the electronic device 3001. For example, the display 3060 may include an interface which can be mechanically or physically connected with the electronic device 3001. According to an embodiment of the present disclosure, in case the display 3060 is detached (e.g., separated) from the electronic device 3001 by a user's selection, the display 3060 may receive various control signals or image data from the power control module 3080 or the processor 3020, e.g., through wireless communication.

The communication interface 3070 may establish communication between the electronic device 3001 and any external device (e.g., the first external electronic device 3002, the second external electronic device 3004, or the server 3006). For example, the communication interface 3070 may be connected with the network 3062 through wired or wireless communication 3064 and thereby communicate with any external device (e.g., the first external electronic device 3002, the second external electronic device 3004, or the server 3006).

According to an embodiment of the present disclosure, the electronic device 3001 may be connected with the first external electronic device 3002 and the second external electronic device 3004 without using the communication interface 3070. For example, based on at least one of a magnetic sensor, a contact sensor, a light sensor, and the like which equipped in the electronic device 3001, the electronic device 3001 may sense whether at least one of the first and second external electronic devices 3002 and 3004 is contacted with at least part of the electronic device 3001 or whether at least one of the first and second external electronic device 3002 and 3004 is attached to at least part of the electronic device 3001.

Wireless communication may use, as cellular communication protocol, at least one of long-term evolution (LTE), LTE Advanced (LTE-A), code division multiple access (CDMA), wideband CDMA (WCDMA), universal mobile telecommunications system (UMTS), wireless broadband (WiBro), global system for mobile communications (GSM), and the like, for example. Wired communication may include, for example, at least one of universal serial bus (USB), high definition multimedia interface (HDMI), recommended standard 232 (RS 232), plain old telephone service (POTS), and the like. The network 3062 may include telecommunication network, for example, at least one of a computer network (e.g., local area network (LAN) or wide area network (WAN), Internet, and a telephone network.

The first and second external electronic devices 3002 and 3004 may be identical to or different from the electronic device 3001. According to an embodiment of the present disclosure, the first and second external electronic devices 3002 and 3004 may include, for example, a plurality of electronic devices. According to an embodiment of the present disclosure, the server 3006 may include a single server or a group of servers. According to various embodiments of the present disclosure, all or part of operations executed in the electronic device 3001 may be executed in other electronic device(s) such as the first and second electronic devices 3002 and 3004 or the server 3006.

According to an embodiment of the present disclosure, in case the electronic device 3001 is required to perform a certain function or service automatically or by request, the electronic device 3001 may request other device (e.g., the electronic device 3002 or 3004 or the server 3006) to execute instead or additionally at least part of functions associated with the required function or service. The requested device may execute the requested function and deliver the result of execution to the electronic device 3001. Then the electronic device 3001 may offer the required function or service, based on the received result or by processing the received result. For the above, cloud computing technology, distributed computing technology, or client-server computing technology may be used for example.

The power control module 3080 may process at least part of information obtained from other elements (e.g., the processor 3020, the memory 3030, the I/O interface 3050, the display 3060, the communication interface 3070, etc.) and, through this, may offer various contents of other elements (e.g., the application program 3047, the application programming interface 3045, etc.). For example, the power control module 3080 may perform various operations (e.g., adjusting or regulating luminance, brightness, power, etc.) for controlling electric power of the at least one display 3060.

For example, the power control module 3080 may vary electric current consumption of the electronic device 3001, based on the number of displays 3060 functionally connected with the electronic device 3001 and activated. In this case, if the display that offers information under the control of the electronic device 3001 is singular, the power control module 3080 may execute the function of the display 3060 in the first power mode (e.g., a normal mode or a default mode of the electronic device 3001). Otherwise, if such displays are plural, the power control module 3080 may perform the function of the display 3060 in the second power mode (e.g., a low power mode having smaller current consumption than that of the normal mode). A further description about the power control module 3080 will be made below with reference to FIG. 4.

Figure 31:
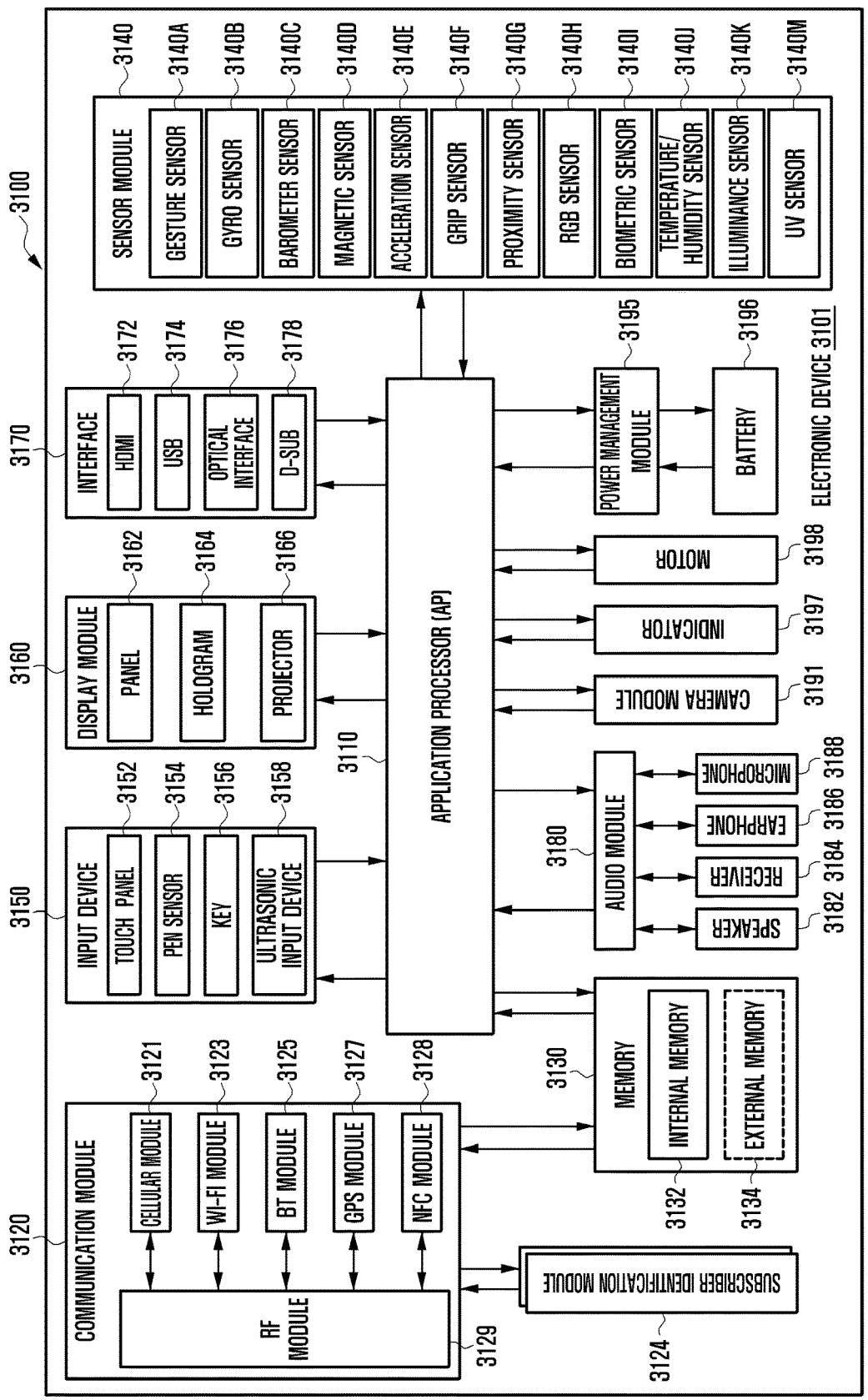
FIG. 31 is a block diagram 3100 of an electronic device 3101 according to various embodiments of the present disclosure.

FIG. 31 is a block diagram 3100 of an electronic device 3101 according to various embodiments of the present disclosure. The electronic device 3101 may configure, for example, a whole or a part of the electronic device 3001 illustrated in FIG. 30.

Referring to FIG. 31, the electronic device 3101 includes one or more application processors (APs) 3110, a communication module 3120, a subscriber identification module (SIM) card 3124, a memory 3130, a sensor module 3140, an input device 3150, a display 3160, an interface 3170, an audio module 3180, a camera module 3191, a power managing module 3195, a battery 3196, an indicator 3197, and a motor 3198.

The AP 3110 operates an OS or an application program so as to control a plurality of hardware or software component elements connected to the AP 3110 and execute various data processing and calculations including multimedia data. The AP 3110 may be implemented by, for example, a system on chip (SoC). According to an embodiment of the present disclosure, the processor 3110 may further include a graphics processing unit (GPU).

The communication module 3120 (for example, communication interface 3060) transmits/receives data in communication between different electronic devices (for example, the electronic device 3004 and the server 3006) connected to the electronic device 3101 (for example, electronic device 3001) through a network. According to an embodiment of the present disclosure, the communication module 3120 includes a cellular module 3121, a WiFi module 3123, a BT module 3125, a global positioning system (GPS) module 3127, a NFC module 3128, and a radio frequency (RF) module 3129.

The cellular module 3121 provides a voice, a call, a video call, a SMS, or an Internet service through a communication network (for example, LTE, LTE-A, CDMA, WCDMA, UMTS, WiBro, GSM or the like). Further, the cellular module 3121 may distinguish and authenticate electronic devices within a communication network by using a SIM (for example, the SIM card 3124). According to an embodiment of the present disclosure, the cellular module 3121 performs at least some of the functions which can be provided by the AP 3110. For example, the cellular module 3121 may perform at least some of the multimedia control functions.

According to an embodiment of the present disclosure, the cellular module 3121 may include a communication processor (CP). Further, the cellular module 3121 may be implemented by, for example, an SoC.

Although the components such as the cellular module 3121 (for example, communication processor), the memory 3130, and the power managing module 3195 are illustrated as components separate from the AP 3110, the AP 3110 may include at least some (for example, cellular module 3121) of the aforementioned components in an embodiment of the present disclosure.

According to an embodiment of the present disclosure, the AP 3110 or the cellular module 3121 (for example, communication processor) may load a command or data received from at least one of a non-volatile memory and other components connected to each of the AP 3110 and the cellular module 3121 to a volatile memory and process the loaded command or data. Further, the AP 3110 or the cellular module 3121 may store data received from at least one of other components or generated by at least one of other components in a non-volatile memory.

Each of the WiFi module 3123, the BT module 3125, the GPS module 3127, and the NFC module 3128 may include, for example, a processor for processing data transmitted/received through the corresponding module. Although the cellular module 3121, the WiFi module 3123, the BT module 3125, the GPS module 3127, and the NFC module 3128 are illustrated as blocks separate from each other, at least some (for example, two or more) of the cellular module 3121, the WiFi module 3123, the BT module 3125, the GPS module 3127, and the NFC module 3128 may be included in one integrated chip (IC) or one IC package according to an embodiment of the present disclosure. For example, at least some (for example, the communication processor corresponding to the cellular module 3121 and the WiFi processor corresponding to the WiFi module 3123) of the processors corresponding to the cellular module 3121, the WiFi module 3123, the BT module 3125, the GPS module 3127, and the NFC module 3128 may be implemented by one SoC.

The RF module 3129 transmits/receives data, for example, an RF signal. Although not illustrated, the RF module 3129 may include, for example, a transceiver, a power amp module (PAM), a frequency filter, a low noise amplifier (LNA) or the like. Further, the RF module 3129 may further include a component for transmitting/receiving electronic waves over a free air space in wireless communication, for example, a conductor, a conducting wire, or the like. Although the cellular module 3121, the WiFi module 3123, the BT module 3125, the GPS module 3127, and the NFC module 3128 share one RF module 3129 in FIG. 31, at least one of the cellular module 3121, the WiFi module 3123, the BT module 3125, the GPS module 3127, and the NFC module 3128 may transmit/receive an RF signal through a separate RF module according to an embodiment of the present disclosure.

The SIM card 3124 is a card including a SIM and may be inserted into a slot formed in a particular portion of the electronic device. The SIM card 3124 includes unique identification information (for example, integrated circuit card identifier (ICCID)) or subscriber information (for example, international mobile subscriber identity (IMSI)).

The memory 3130 (for example, memory 3030) may include an internal memory 3132 or an external memory 3134. The internal memory 3132 may include, for example, at least one of a volatile memory (for example, a RAM, a dynamic RAM (DRAM), a static RAM (SRAM), a synchronous DRAM (SDRAM), and the like), and a non-volatile memory (for example, a ROM, a one time programmable ROM (OTPROM), a PROM, an EPROM, an EEPROM, a mask ROM, a flash ROM, a NAND flash memory, an NOR flash memory, and the like).

According to an embodiment of the present disclosure, the internal memory 3132 may be a solid state drive (SSD). The external memory 3134 may further include a flash drive, for example, a compact flash (CF), a secure digital (SD), a micro-SD, a mini-SD, an extreme digital (xD), or a memory stick. The external memory 3134 may be functionally connected to the electronic device 3101 through various interfaces. According to an embodiment of the present disclosure, the electronic device 3101 may further include a storage device (or storage medium) such as a hard drive.

The sensor module 3140 measures a physical quantity or detects an operation state of the electronic device 3101, and converts the measured or detected information to an electronic signal. The sensor module 3140 may include, for example, at least one of a gesture sensor 3140A, a gyro sensor 3140B, an atmospheric pressure (barometric) sensor 3140C, a magnetic sensor 3140D, an acceleration sensor 3140E, a grip sensor 3140F, a proximity sensor 3140G, a color sensor 3140H (for example, red, green, and blue (RGB) sensor) 3140H, a biometric sensor 3140I, a temperature/humidity sensor 3140J, an illumination (light) sensor 3140K, and a ultra violet (UV) sensor 3140M. Additionally or alternatively, the sensor module 3140 may include, for example, a E-nose sensor, an electromyography (EMG) sensor, an electroencephalogram (EEG) sensor, an electrocardiogram (ECG) sensor, an infrared (IR) sensor, an iris sensor, a fingerprint sensor (not illustrated), and the like. The sensor module 3140 may further include a control circuit for controlling one or more sensors included in the sensor module 3140.

The input device 3150 includes a touch panel 3152, a (digital) pen sensor 3154, a key 3156, and an ultrasonic input device 3158. For example, the touch panel 3152 may recognize a touch input in at least one type of a capacitive type, a resistive type, an infrared type, and an acoustic wave type. The touch panel 3152 may further include a control circuit. In the capacitive type, the touch panel 3152 can recognize proximity as well as a direct touch. The touch panel 3152 may further include a tactile layer. In this event, the touch panel 3152 provides a tactile reaction to the user.

The (digital) pen sensor 3154 may be implemented, for example, using a method identical or similar to a method of receiving a touch input of the user, or using a separate recognition sheet. The key 3156 may include, for example, a physical button, an optical key, or a key pad. The ultrasonic input device 3158 is a device which can detect an acoustic wave by a microphone (for example, microphone 3188) of the electronic device 3101 through an input means generating an ultrasonic signal to identify data and can perform wireless recognition. According to an embodiment of the present disclosure, the electronic device 3101 receives a user input from an external device (for example, computer or server) connected to the electronic device 3101 by using the communication module 3120.

The display 3160 (for example, display 3050) includes a panel 3162, a hologram device 3164, and a projector 3166. The panel 3162 may be, for example, a LCD or an AM-OLED. The panel 3162 may be implemented to be, for example, flexible, transparent, or wearable. The panel 3162 may be configured by the touch panel 3152 and one module. The hologram device 3164 shows a stereoscopic image in the air by using interference of light. The projector 3166 projects light on a screen to display an image. For example, the screen may be located inside or outside the electronic device 3101. According to an embodiment of the present disclosure, the display 3160 may further include a control circuit for controlling the panel 3162, the hologram device 3164, and the projector 3166.

The interface 3170 includes, for example, a HDMI 3172, a USB 3174, an optical interface 3176, and a D-subminiature (D-sub) 3178. The interface 3170 may be included in, for example, the communication interface 3060 illustrated in FIG. 30. Additionally or alternatively, the interface 3190 may include, for example, a mobile high-definition link (MHL) interface, a SD card/multi-media card (MMC), or an IR data association (IrDA) standard interface.

The audio module 3180 bi-directionally converts a sound and an electronic signal. At least some components of the audio module 3180 may be included in, for example, the input/output interface 3040 illustrated in FIG. 30. The audio module 3180 processes sound information input or output through, for example, a speaker 3182, a receiver 3184, an earphone 3186, the microphone 3188 or the like.

The camera module 3191 is a device which can photograph a still image and a video. According to an embodiment of the present disclosure, the camera module 3191 may include one or more image sensors (for example, a front sensor or a back sensor), an image signal processor (ISP) (not shown) or a flash (for example, an LED or xenon lamp).

The power managing module 3195 manages power of the electronic device 3101. Although not illustrated, the power managing module 3195 may include, for example, a power management integrated circuit (PMIC), a charger IC (IC), or a battery or fuel gauge.

The PMIC may be mounted to, for example, an integrated circuit or an SoC semiconductor. A charging method may be divided into wired and wireless methods. The charger IC charges a battery and prevent over voltage or over current from flowing from a charger. According to an embodiment of the present disclosure, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 3196, or a voltage, a current, or a temperature during charging. The battery 3196 may store or generate electricity and supply power to the electronic device 3101 by using the stored or generated electricity. The battery 3196 may include a rechargeable battery or a solar battery.

The indicator 3197 shows particular statuses of the electronic device 3101 or a part (for example, AP 3110) of the electronic device 3101, for example, a booting status, a message status, a charging status and the like. The motor 3198 converts an electrical signal to a mechanical vibration.

Although not illustrated, the electronic device 3101 may include a processing unit (for example, GPU) for supporting a module television (TV). The processing unit for supporting the mobile TV may process, for example, media data according to a standard of digital multimedia broadcasting (DMB), digital video broadcasting (DVB), media flow or the like.

Each individual element set forth herein may be formed of one or more components, and the name of such an element may be varied according to types of electronic devices. In various embodiments of the present disclosure, the electronic device may be configured to include at least one of elements set forth herein. Namely, some elements may not be included, or any other element may be further included. Additionally, some of elements included in the electronic device may be integrated into a single entity while maintaining their inherent functions.

Figure 32:
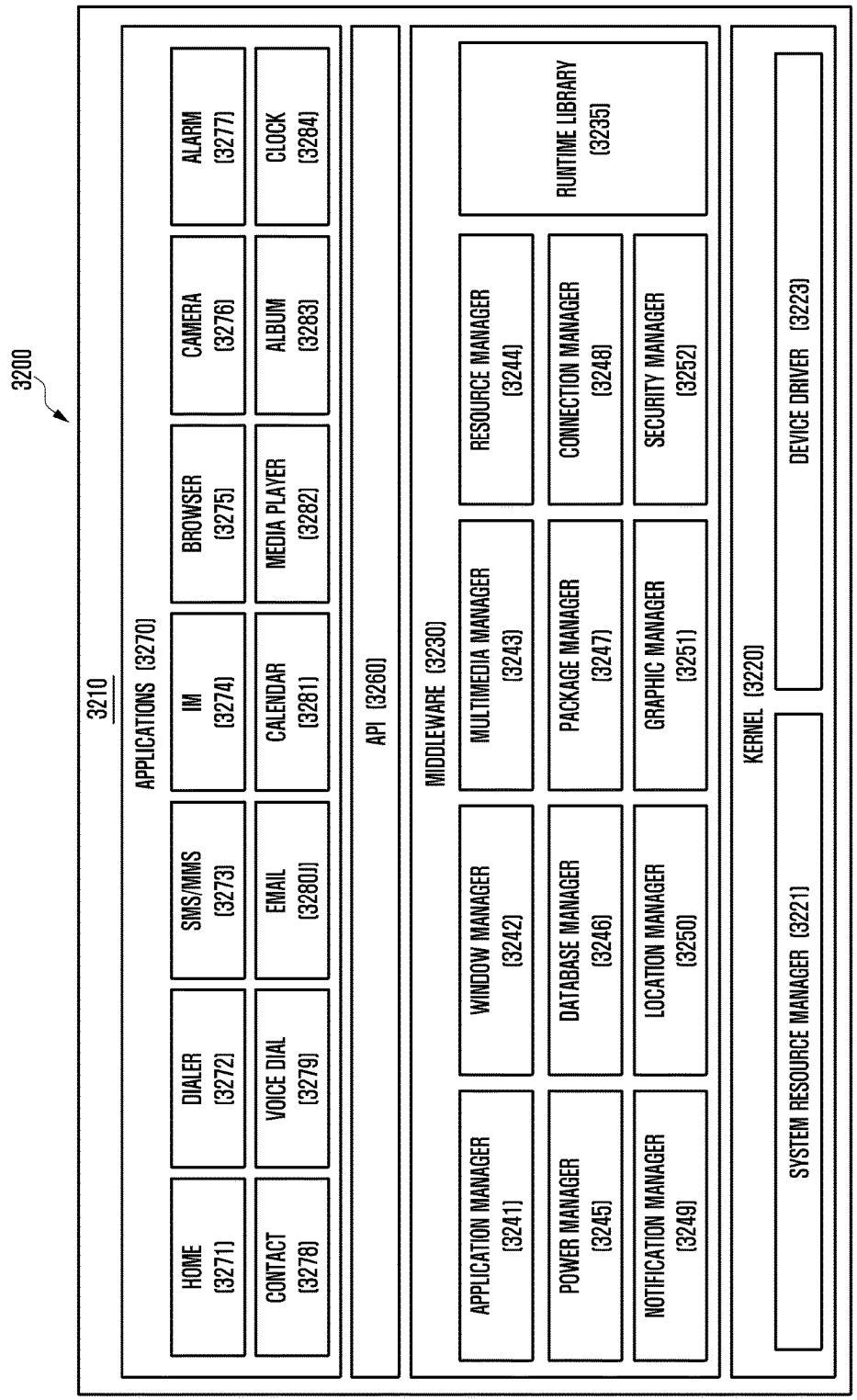
FIG. 32 is a block diagram 3200 of a program module according to various embodiments of the present disclosure.

FIG. 32 is a block diagram 3200 of a program module according to various embodiments of the present disclosure.

Referring to FIG. 32, according to an embodiment of the present disclosure, the program module 3210 (e.g., the program 3040) may include an OS for controlling resources associated with an electronic device (e.g., the electronic device 3001) and/or various applications (e.g., the application program 3047) running on the OS. The OS may be, for example, android, iOS, windows, symbian, tizen, bada, or the like.

The program module 3210 may include a kernel 3220, a middleware 3230, an API 3260, and/or an application 3270. At least part of the program module 3210 may be preloaded on the electronic device or downloaded from an external electronic device (e.g., the electronic device 3002 or 3004, the server 3006, etc.).

The kernel 3220 (for example, kernel 3041) includes a system resource manager 3221 and a device driver 3223. The system resource manager 3221 may include, for example, a process manager, a memory manager, and a file system manager. The system resource manager 3221 performs a system resource control, allocation, and recall. The device driver 3223 may include, for example, a display driver, a camera driver, a BT driver, a shared memory driver, a USB driver, a keypad driver, a WiFi driver, and an audio driver. Further, according to an embodiment of the present disclosure, the device driver 3223 may include an inter-process communication (IPC) driver.

The middleware 3230 includes a plurality of modules prepared in advance to provide a function required in common by the applications 3270. Further, the middleware 3230 provides a function through the API 3260 to allow the application 3270 to efficiently use limited system resources within the electronic device. For example, as illustrated in FIG. 32, the middleware 3200 (for example, middleware 3043) includes at least one of a runtime library 3235, an application manager 3241, a window manager 3242, a multimedia manager 3243, a resource manager 3244, a power manager 3245, a database manager 3246, a package manager 3247, a connection manager 3248, a notification manager 3249, a location manager 3250, a graphic manager 3251, and a security manager 3252.

The runtime library 3235 includes, for example, a library module used by a complier to add a new function through a programming language while the application 3270 is executed. According to an embodiment of the present disclosure, the runtime library 3235 executes input and output, management of a memory, a function associated with an arithmetic function and the like.

The application manager 3241 manages, for example, a life cycle of at least one of the applications 3270. The window manager 3242 manages graphical user interface (GUI) resources used on the screen. The multimedia manager 3243 detects a format required for reproducing various media files and performs an encoding or a decoding of a media file by using a codec suitable for the corresponding format. The resource manager 3244 manages resources such as a source code, a memory, or a storage space of at least one of the applications 3270.

The power manager 3245 operates together with a basic I/O system (BIOS) to manage a battery or power and provides power information required for the operation. The database manager 3246 manages generation, search, and change of a database to be used by at least one of the applications 3270. The package manager 3247 manages an installation or an update of an application distributed in a form of a package file.

The connection manager 3248 manages, for example, a wireless connection such as WiFi or BT. The notification manager 3249 displays or notifies a user of an event such as an arrival message, an appointment, a proximity alarm or the like, in a manner that does not disturb the user. The location manager 3250 manages location information of the electronic device. The graphic manager 3251 manages a graphic effect provided to the user or a user interface related to the graphic effect. The security manager 3252 provides a general security function required for a system security or a user authentication. According to an embodiment of the present disclosure, when the electronic device (for example, electronic device 3001 or 3101) has a call function, the middleware 3230 may further include a telephony manager for managing a voice of the electronic device or a video call function.

The middleware 3230 may generate a new middleware module through a combination of various functions of the aforementioned internal component modules and use the generated new middleware module. The middleware 3230 may provide a module specified for each type of OS to provide a differentiated function. Further, the middleware 3230 may dynamically delete some of the conventional components or add new components. Accordingly, some of the components described in the embodiment of the present disclosure may be omitted, replaced with other components having different names but performing similar functions, or other components may be further included.

The API 3260 (for example, API 3045) is a set of API programming functions, and may be provided with a different configuration according to an OS. For example, in Android or iOS, a single API set may be provided for each platform. In Tizen, two or more API sets may be provided.

The applications 3270, which may include an application similar to the application 3034, may include, for example, a preloaded application and/or a third party application. The applications 3270 may include a home application 3271 a dialer application 3272, a SMS/MMS application 3273, an instant messaging (IM) application 3274, a browser application 3275, a camera application 3276, an alarm application 3277, a contact application 3278, a voice dial application 3279, an email application 3280, a calendar application 3281, a media player application 3282, an album application 3283, and a clock application 3284. However, the present embodiment of the present disclosure is not limited thereto, and the applications 3270 may include any other similar and/or suitable application.

At least some of the programming module 3200 may be implemented by a command stored in a computer-readable storage medium. When the command is executed by one or more processors (for example, processor 3110), the one or more processors perform a function corresponding to the command. The computer-readable storage medium may be, for example, the memory 3160. At least some of the programming module 3200 may be implemented (for example, executed) by, for example, the processor 3110. At least some of the programming module 3200 may include, for example, a module, a program, a routine, sets of instructions, or a process for performing one or more functions.

The non-transitory computer-readable recording medium may include magnetic media such as a hard disk, a floppy disk, and a magnetic tape, optical media such as a compact disc ROM (CD-ROM and a digital versatile disc (DVD), magneto-optical media such as a floptical disk, and hardware devices specially configured to store and perform a program instruction (for example, e.g., programming module), such as a ROM, a RAM, a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or programming module according to this disclosure may include or exclude at least one of the above-discussed elements or further include any other element. The operations performed by the module, programming module or any other element according to this disclosure may be executed sequentially, in parallel, repeatedly, or by a heuristic method. Additionally, some operations may be executed in different orders or omitted, or any other operation may be added. The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method providing an improved user interface in an electronic device, the method comprising:
   detecting a first touch on a first edge of a screen of the electronic device;
   detecting a second touch on a second edge of a screen of the electronic device, wherein the second touch is detected concurrently with the first touch or within a threshold time after detecting the first touch;
   detecting at least one of a long press hold gesture, a squeeze gesture or a lift gesture, wherein the long press hold gesture is the first touch and the second touch are held during at least a predetermined time, the squeeze gesture is the first touch and the second touch are move toward a horizontal center of the screen, and the lift gesture is the first touch and the second touch move in an upward direction from the screen;
   in response to detecting the at least one of the long press hold gesture, the squeeze gesture or the lift gesture, selecting one of objects displayed on the screen and displaying visual effects including lifting the selected object in the upward direction;
   detecting a rail swipe gesture or a hover gesture which is that the first touch moves along the first edge and the second touch moves along the second edge in the same direction as the first touch moves;
   moving the selected object along the moving direction of the rail swipe gesture or the hover gesture; and
   in response to detecting a drop gesture on the first edge and the second edge, displaying visual effects including falling of the moved object, wherein the drop gesture is the first touch and the second touch are taken off from the first edge and the second edge,
   wherein the first edge and the second edge are on substantially opposite ends of the electronic device.

2. The method of claim 1, further comprising:
   detecting a third touch on the first edge;

detecting a fourth touch on the second edge, wherein the fourth touch is detected concurrently with the third touch or within a threshold time after detecting the third touch:

detecting an asymmetric swipe gesture indicating that the third touch moves along the first edge and the fourth touch moves along the second edge in the opposite direction as the third touch moves; and rotating a screen in response to detecting the asymmetric swipe gesture.

3. The method of claim 1, further comprising:

detecting a third touch on the first edge;

detecting a fourth touch on the second edge, wherein the fourth touch is detected concurrently with the third touch or within a threshold time after detecting the third touch;

detecting an asymmetric swipe gesture indicating that the third touch moves along the first edge and the fourth touch moves along the second edge in the opposite direction as the third touch moves; and setting a screen state to be rotatable in response to detecting the asymmetric swipe gesture.

4. The method of claim 1, further comprising:

detecting a third touch on the first edge;

detecting a fourth touch on the second edge, wherein the fourth touch is detected concurrently with the third touch or within a threshold time after detecting the third touch;

detecting an asymmetric swipe gesture indicating that the third touch moves along the first edge and the fourth touch moves along the second edge in the opposite direction as the third touch moves; and setting a screen state to be not rotatable in response to detecting the asymmetric swipe gesture.

5. The method of claim 1, further comprising:

detecting a third touch on the first edge;

detecting a fourth touch on the second edge, wherein the fourth touch is moved in the same direction as the third touch and detected concurrently with the third touch or within a threshold time after detecting the third touch;

computing a first movement distance of the third touch along the first edge and a second movement distance of the fourth touch along the second edge;

detecting a start of a swipe gesture if at least one of the first movement distance and the second movement distance is greater than a threshold value; and detecting an end of the swipe gesture if the third touch is removed from the first edge or the fourth touch is removed from the second edge;

wherein the an action performed in response to detecting the end of the swipe gesture comprises one of:

capturing a partial screen shot, changing a brightness of a screen of the electronic device based on a direction of the swipe gesture, terminating a running application corresponding to the item displayed on the screen by deleting the running application in a memory of the electronic device, forwarding or rewinding a video displayed on the screen based on a direction of the swipe gesture, and displaying a window of a background application.

6. The method of claim 1, further comprising:

detecting a third touch on the first edge;

detecting a fourth touch on the second edge, wherein the fourth touch is moved in the same direction as the third touch and detected concurrently with the third touch or within a threshold time after detecting the third touch;

computing a first movement distance of the third touch along the first edge and a second movement distance of the second touch along the second edge;

detecting a start of a swipe gesture if at least one of the first movement distance and the second movement distance is greater than a threshold value; and detecting an end of the swipe gesture if the third touch reaches a predetermined area of the first edge or the fourth touch reaches a predetermined area of the second edge;

wherein an action performed in response to detecting the end of the swipe gesture comprises one of:

capturing a partial screen shot, changing a brightness of a screen of the electronic device based on a direction of the swipe gesture, terminating a running application corresponding to the item displayed on the screen by deleting the running application in a memory of the electronic device, forwarding or rewinding a video displayed on the screen based on a direction of the swipe gesture, and displaying a window of a background application.

7. The method of claim 1, further comprising:

detecting a third touch on the first edge;

detecting a fourth touch on the second edge, wherein the fourth touch is moved in a opposite direction to the third touch and detected concurrently with the third touch or within a threshold time after detecting the third touch, computing a first movement distance of the first touch along the first edge and a second movement distance of the second touch along the second edge;

detecting a start of a swipe gesture if at least one of the first movement distance and the second movement distance is greater than a threshold value; and detecting an end of the swipe gesture if the third touch is removed from the first edge or the fourth touch is removed from the second edge, wherein an action performed in response to detecting the end of the swipe gesture comprises one of:

rotating a screen, setting a screen state to be rotatable, and setting the screen state to be not rotatable.

8. The method of claim 1, further comprising:

detecting a third touch on the first edge;

detecting a fourth touch on the second edge, wherein the fourth touch is moved in a opposite direction to the third touch and detected concurrently with the third touch or within a threshold time after detecting the third touch, computing a first movement distance of the third touch along the first edge and a second movement distance of the fourth touch along the second edge;

detecting a start of a swipe gesture if at least one of the first movement distance and the second movement distance is greater than a threshold value; and detecting an end of the swipe gesture if the third touch reaches a predetermined area of the first edge or the fourth touch reaches a predetermined area of the second edge, wherein an action performed in response to detecting the end of the swipe gesture comprises one of:

rotating a screen, setting a screen state to be rotatable, and setting the screen state to be not rotatable.

9. An electronic device providing an improved user interface, the electronic device comprising at least one processor configured to:

detect a first touch on a first edge of a screen of the electronic device;

detect a second touch on a second edge of a screen of the electronic device, wherein the second touch is detected concurrently with the first touch or within a threshold time after detecting the first touch;

detect at least one of a long press hold gesture, a squeeze gesture or a lift gesture, wherein the long press hold gesture is the first touch and the second touch are held during at least a predetermined time, the squeeze gesture is the first touch and the second touch are move toward a horizontal center of the screen, and the lift gesture is the first touch and the second touch move in an upward direction from the screen;

in response to detecting the at least one of the long press hold gesture, the squeeze gesture or the lift gesture, select one of objects displayed on the screen and displaying visual effects including lifting the selected object in the upward direction;

detect a rail swipe gesture or a hover gesture which is that the first touch moves along the first edge and the second touch moves along the second edge in the same direction as the first touch moves;

move the selected object along the moving direction of the rail swipe gesture or the hover gesture; and in response to detecting a drop gesture on the first edge and the second edge, display visual effects including falling of the moved object, wherein the drop gesture is the first touch and the second touch are taken off from the first edge and the second edge, wherein the first edge and the second edge are on substantially opposite ends of the electronic device.

10. The electronic device of claim 9, wherein the at least one processor is further configured to:

detect a third touch on the first edge;

detect a fourth touch on the second edge, wherein the fourth touch is detected concurrently with the third touch or within a threshold time after detecting the third touch:

detect an asymmetric swipe gesture indicating that the third touch moves along the first edge and the fourth touch moves along the second edge in the opposite direction as the third touch moves; and rotate a screen in response to detecting the asymmetric swipe gesture.

11. The electronic device of claim 9, wherein the at least one processor is further configured to:

detect a third touch on the first edge;

detect a fourth touch on the second edge, wherein the fourth touch is detected concurrently with the third touch or within a threshold time after detecting the third touch;

detect an asymmetric swipe gesture indicating that the third touch moves along the first edge and the fourth touch moves along the second edge in the opposite direction as the third touch moves; and set a screen state to be rotatable in response to detecting the asymmetric swipe gesture.

12. A computer program product providing an improved user interface in an electronic device, the computer program product comprising computer executable program code recorded on a non-transitory computer readable storage medium, the computer executable program code when executed causing actions including:

detecting a first touch on a first edge of a screen of the electronic device;

detecting a second touch on a second edge of a screen of the electronic device, wherein the second touch is detected concurrently with the first touch or within a threshold time after detecting the first touch;

detecting at least one of a long press hold gesture, a squeeze gesture or a lift gesture, wherein the long press hold gesture is the first touch and the second touch are held during at least a predetermined time, the squeeze gesture is the first touch and the second touch are move toward a horizontal center of the screen, and the lift gesture is the first touch and the second touch move in an upward direction from the screen;

in response to detecting the at least one of the long press hold gesture, the squeeze gesture or the lift gesture, selecting one of objects displayed on the screen and displaying visual effects including lifting the selected object in the upward direction;

detecting a rail swipe gesture or a hover gesture which is that the first touch moves along the first edge and the second touch moves along the second edge in the same direction as the first touch moves;

moving the selected object along the moving direction of the rail swipe gesture or the hover gesture; and in response to detecting a drop gesture on the first edge and the second edge, displaying visual effects including falling of the moved object, wherein the drop gesture is the first touch and the second touch are taken off from the first edge and the second edge, wherein the first edge and the second edge are on substantially opposite ends of the electronic device.

\* \* \* \* \*